(12) United States Patent
Van Den Berg et al.

(10) Patent No.: US 7,484,474 B2
(45) Date of Patent: **\*Feb. 3, 2009**

(54) ASSEMBLY FOR AND A METHOD OF FEEDING AND MILKING ANIMALS, A FEED PLATFORM, A MILKING PRE-TREATMENT DEVICE, A MILKING POST-TREATMENT DEVICE, A CLEANING DEVICE, A SEPARATION DEVICE AND A MILKING SYSTEM ALL SUITABLE FOR USE IN SUCH AN ASSEMBLY

(75) Inventors: Karel Van Den Berg, Bleskensgraaf (NL); Greorgius Rudolphius Bos, Bolsward (NL)

(73) Assignee: Lely Enterprises AG, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/889,510

(22) Filed: Aug. 14, 2007

(65) Prior Publication Data

US 2008/0017119 A1 Jan. 24, 2008

Related U.S. Application Data

(62) Division of application No. 10/962,601, filed on Oct. 13, 2004, now Pat. No. 7,270,078.

(30) Foreign Application Priority Data

Oct. 13, 2003 (NL) .................................. 1024518

(51) Int. Cl.
*A01K 1/12* (2006.01)
(52) U.S. Cl. ............... 119/14.02; 119/14.03; 119/14.18
(58) Field of Classification Search ............. 119/14.02, 119/14.03, 14.01, 14.04, 14.18, 843, 51.01
See application file for complete search history.

(56) References Cited

U.S. PATENT DOCUMENTS

| | | | | |
|---|---|---|---|---|
| 3,402,699 A | * | 9/1968 | Cain | 119/14.04 |
| 3,810,442 A | * | 5/1974 | Jacobs et al. | 119/14.03 |
| 7,055,458 B2 | * | 6/2006 | Guo | 119/14.04 |

\* cited by examiner

*Primary Examiner*—Yvonne R. Abbott
(74) *Attorney, Agent, or Firm*—David P. Owen

(57) ABSTRACT

A method of milking an animal uses a movable feed platform. The method involves setting the movable feed platform in motion; allowing the animal free access to board the feed platform; connecting a teat cup to a teat of the animal, the teat cup being arranged separately from the feed platform; milking the animal on the feed platform during a milking period; providing the animal a span of time on the feed platform in which the animal is not milked, said span of time having a magnitude amounting to at least approximately half the milking period; and subsequently allowing the animal exit from the feed platform.

17 Claims, 40 Drawing Sheets

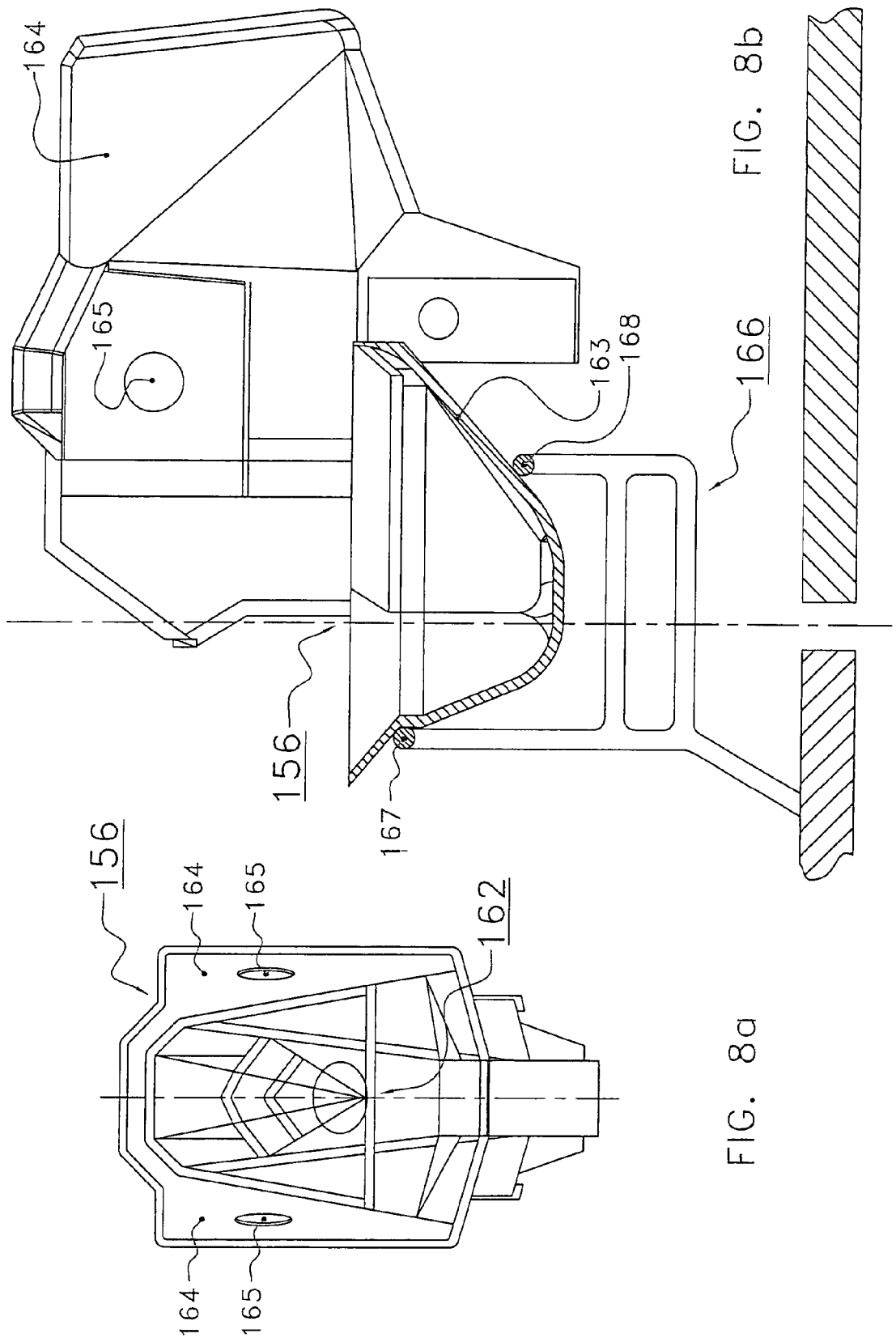

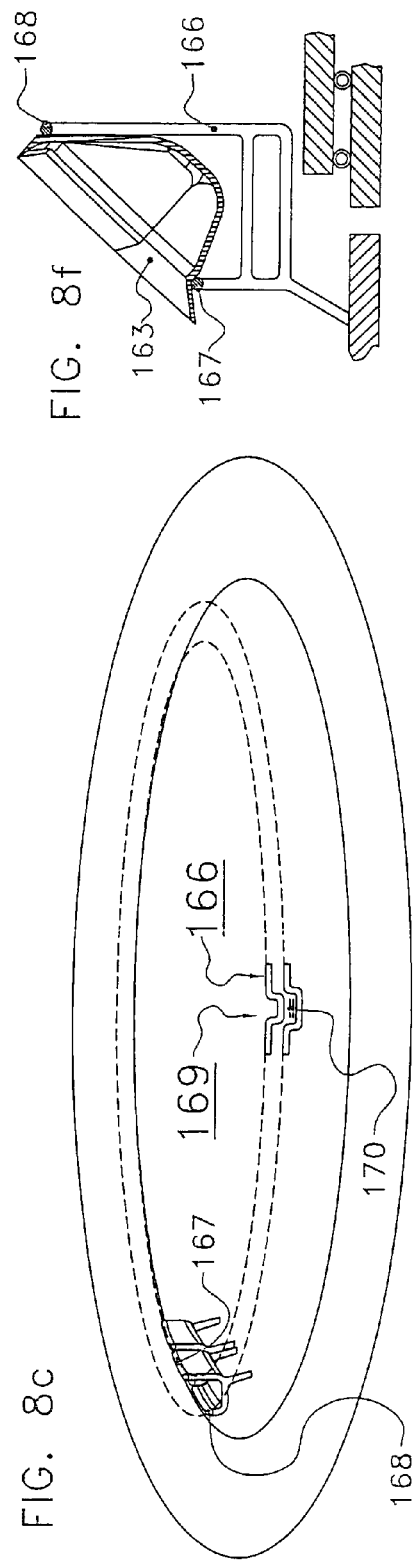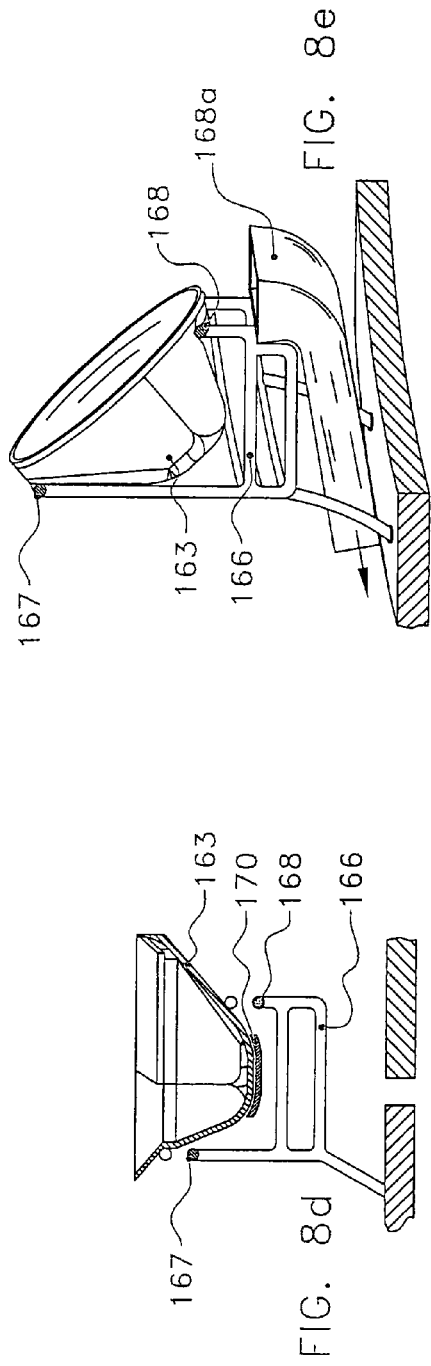

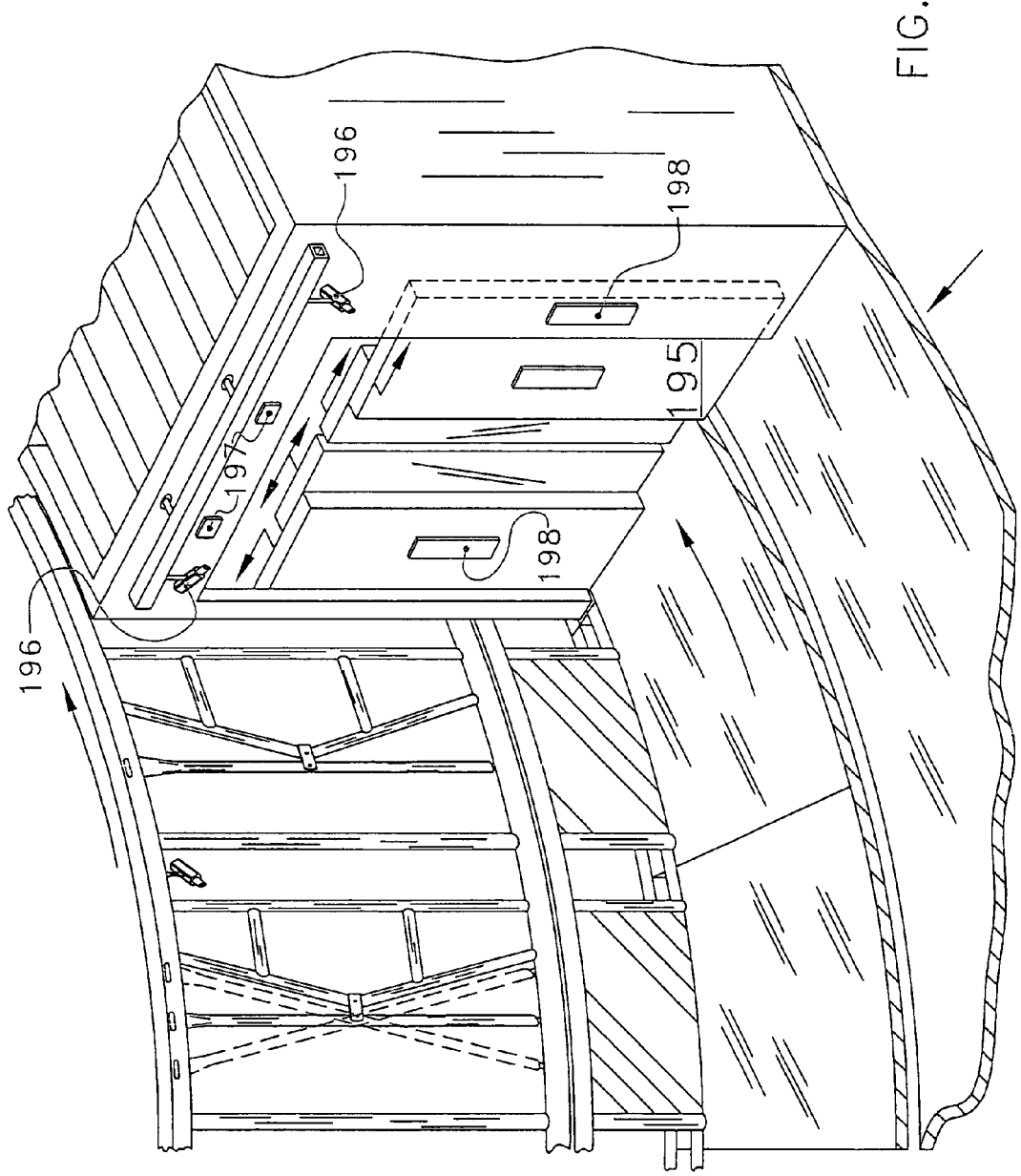

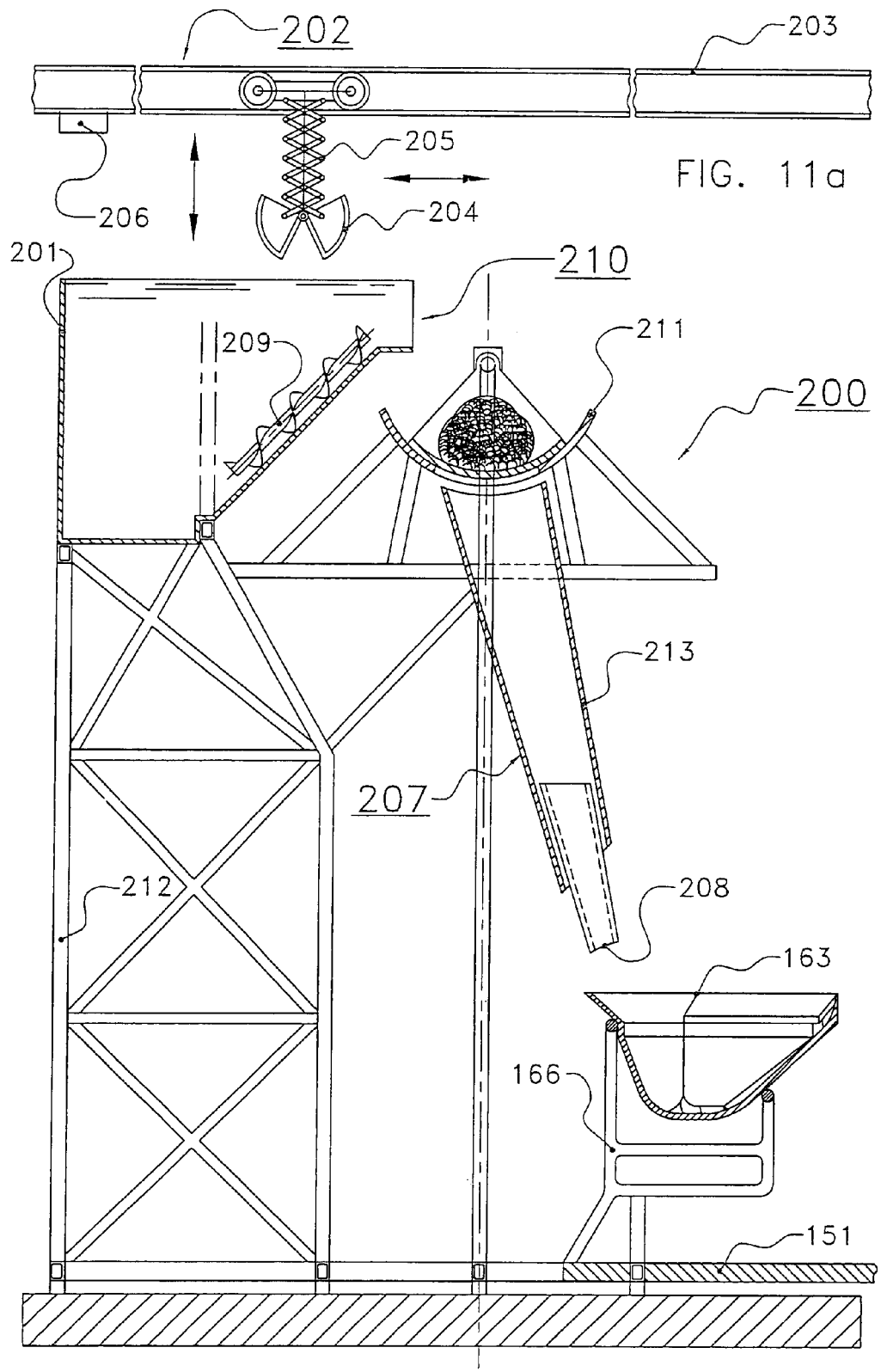

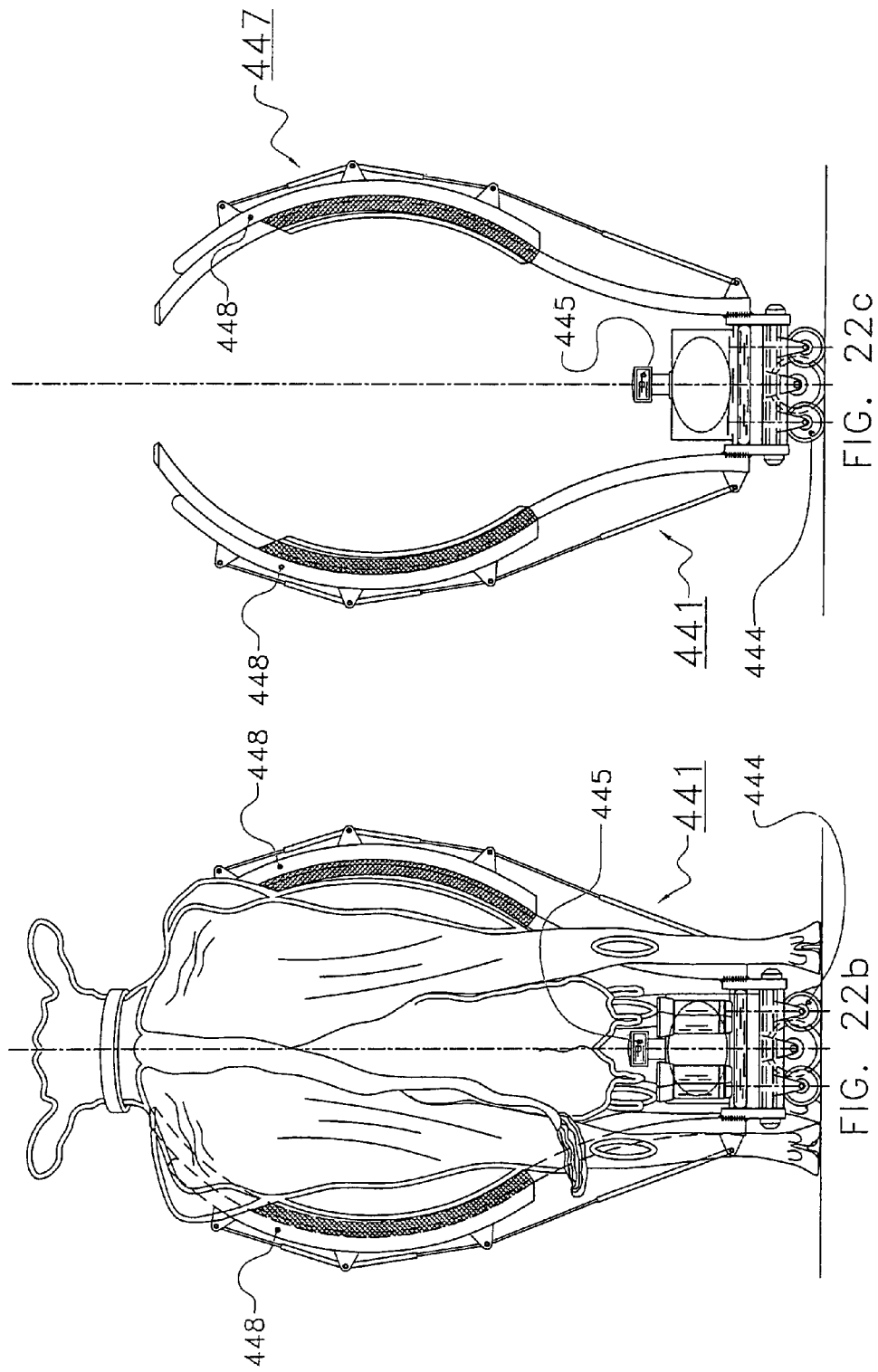

US 7,484,474 B2

ASSEMBLY FOR AND A METHOD OF FEEDING AND MILKING ANIMALS, A FEED PLATFORM, A MILKING PRE-TREATMENT DEVICE, A MILKING POST-TREATMENT DEVICE, A CLEANING DEVICE, A SEPARATION DEVICE AND A MILKING SYSTEM ALL SUITABLE FOR USE IN SUCH AN ASSEMBLY

CROSS REFERENCE TO RELATED APPLICATIONS

This application is a divisional application of U.S. patent Ser. No. 10/962,601 filed Oct. 13, 2004, now U.S. Pat. No. 7,270,078 the contents of which are hereby incorporated by reference in their entirety. It claims priority from Dutch application number 1024518 filed on 13th Oct. 2003, the contents of which are also hereby incorporated by reference in their entirety.

BACKGROUND OF THE INVENTION

1. Field of the Invention

The invention relates generally to an assembly for feeding and milking animals and furthermore to a feed platform, a milking pre-treatment device, a milking post-treatment device, a cleaning device, a separation device and a milking system for use in such an assembly. The invention also relates to a method of feeding and milking animals in particular animals located on a feeding platform.

2. Description of the Related Art

Feeding systems are known comprising a movable feed platform with a number of feeding places and a drive unit for driving the feed platform. Such systems may also be provided in combination with e.g. automatic milking systems for milking the animals on the feed platform.

A known assembly for automatically milking large herds of animals comprises a feed platform with individual stalls, each for at least partially confining one animal. Each stall also has its own teat cups and its own feed trough which move together with the platform. At the circumference of the platform there is provided a connection zone where teat cups are connected to the teats of an animal that is present on the platform. For the connection there may be used stationary connecting robots known per se or pivoting robots or robots moving along rails. There may further be provided zones for washing the udder of an animal or for washing the animal itself, and there may be provided a zone where feed is supplied to a feed trough. An assembly of this type is known from US-A1-2002/0033138. A similar devices is known from U.S. Pat. No. 4,508,058

Other assemblies are known in which sets of teat cups are arranged separately from a platform. In these known assemblies however, the animals are not allowed to move freely in an area and must be led to the feed platform. In general, the entrance to such platforms is restricted and the animals are also confined in individual milking stalls while on the platform. Dairy animals however find it unpleasant to be milked in a closed area, such as stalls provided on a platform which limit the freedom of movement of a dairy animal to a high extent. Furthermore, dairy animals appear to experience walking to and boarding such platforms as unpleasant and may therefore by very unwilling to be lead to or from the platform, which may result in problems to get an animal onto or from the platform, leading to insufficient occupation of the platform and thus reduced milk production. Additionally, assemblies are known in which animals may be housed on a rotatable platform. For the purpose of milking, the animals may be sequentially moved adjacent to a milking device comprising teat cups. Assemblies of the above mentioned types are known from U.S. Pat. Nos. 2,358,000 and 3,103,912

It is also known from FR-A-2,649,858 to dispose sets of teat cups separately from a platform. The housing system as used in FR-A-2,649,858 is not explicitly described, but since the animals have to enter the circular platform from within the platform it is most likely that the animals have to be led from the outside of the platform towards the inside. In addition the assembly known from FR-A-2,649,858 also suffers from the disadvantage that a dairy animal is to be milked in a closed area, such as the stalls provided on the platform disclosed therein which limit the freedom of movement of a dairy animal to a high extent. Each stall is closed by two gates, so that this also restricts the free movement of animals since an animal has to board the platform at a specific position. Furthermore, dairy animals appear to experience walking to and boarding the platform as unpleasant and may therefore by very unwilling to be lead to the platform, which may result in problems to get an animal onto or from the platform, leading to insufficient occupation of the platform and thus reduced milk production.

In addition an assembly is known from international patent application WO 02/19807 and the article "Rund und ohne Futtertisch", DLZ Agrarmagazin, of March 2002, pages 120 and 121. Herein a standard feed platform is described, provided with individual milking stalls, each milking stall comprising associated teat cups and its own feed trough. The access to and the exit from the feed platform is controlled by means of a number of controlled gates. When the animals are to be milked, automatic driving devices are used to drive the cows towards the feed platform. During milking the rotational speed of the feed platform is adjusted in such a way that an animal will spend approximately 10 to 15 minutes on the feed platform (i.e. one rotation of the platform takes 10 to 15 minutes). When there is no need for milking, the assembly is used as a feed platform. In this case the automatic driving devices are not used, but the controlled gates are. Moreover, the rotational speed of the platform is then adjusted in such a way that one rotation will take approximately 30 minutes. Although this known assembly may be expected to provide an enhanced efficiency upon milking large herds, this known assembly has a number of drawbacks limiting its efficiency. It has been found that the use of automatic driving devices leads to unrest with some of the dairy animals, and these animals may then be inclined to consider the feed platform as unpleasant. This unrest will not only result in a reduced milk yield with some animals, but these animals will also be inclined not to go to the feed platform voluntarily. Consequently, when there is no need for milking, and the platform is used as a feed platform, these animals will walk more slowly to the platform or even block the gates. This may lead to further unrest and to insufficient feed consumption, which is undesirable, of course. A further drawback of the known assembly is that the dairy animals are not able to go voluntarily to the platform for being milked. As it has been found with automatic milking robots that are freely accessible to dairy animals, a voluntary walk to the milking machine for being milked would improve the milk production and the animal health.

BRIEF SUMMARY OF THE INVENTION

According to the present invention there is provided an assembly for feeding and milking animals, the assembly comprising a feeding system comprising: a movable feed platform and a drive unit for driving the feed platform, a number of feeding places being provided on the feed platform; an area where the animals are allowed to move freely; an entrance from the area to the feed platform, the entrance having a width that is sufficiently large to enable simultaneous access of several animals to the feed platform; and a milking system comprising a plurality of sets of teat cups disposed substantially separately from the feed platform for milking animals on the feed platform during movement thereof.

The invention is based on the insight that a dairy animal finds it unpleasant to be milked in a closed area, in particular a closed area that limits the freedom of movement of a dairy animal to a high extent. Furthermore, dairy animals appear to experience walking to and boarding the platform as well as the mechanical way of milking as unpleasant, which may adversely affect the milk production and sometimes even the milk quality. The invention is furthermore based on the insight that, contrary to expectations, disposing at least a large number of the sets of teat cups separately from the feed platform, still leads to a higher feed consumption and milk production and a more animal-friendly milking process. Owing to the fact that at least a large number of the sets of teat cups are disposed separately from the platform, the platform will be called hereinafter feed platform.

In a preferred embodiment of an assembly according to the invention, all the sets of teat cups are disposed separately from the feed platform. This means that the feed platform is free from teat cups, which, moreover, implies more freedom in the constructional design of the feed platform. The teat cups may be disposed in or associated with a stationary reference frame. For performing the milking operation, the teat cups may be brought onto the moving platform for connection to the animal's teats. The remainder of the milking system may however remain at least partially stationary.

The movable feed platform may have a rectilinear form and be supported at its ends by reversing rollers as a result of which the movable feed platform constitutes a closed path. If the movable feed platform constitutes a closed path and has an edge on its outer side, and in particular if the movable feed platform is at least substantially circular, the effective standing-surface of the feed platform is increased.

Although the feed may be supplied manually or mechanically to the feeding places, it is advantageous if the feeding system is provided with a feeding system control unit. The milking system is preferably provided with a milking system control unit.

Although the feeding system control unit and the milking system control unit may be separate control units that are able to operate independently, these control units may be provided with transmitting/receiving devices for mutual communication, so that co-operation between the feeding system and the milking system is possible. In a favorable embodiment of an assembly according to the invention, the assembly is provided with a central control unit, the feeding system control unit and the milking system control unit being connectable to the central control unit. Such a central control unit may ensure the mutual co-operation of the feeding system and the milking system and possibly other systems provided with control units.

In an embodiment of an assembly according to the invention, the number of sets of teat cups is smaller than the number of feeding places. The invention is partially based on the insight that, in order to be able to milk efficiently a large number of animals, it is not necessary to provide one set of teat cups per feeding place. Consequently, a smaller number of sets of teat cups is required, which means a reduction of costs of the assembly.

It has been found that, even if the number of sets of teat cups is smaller than ¼ of the number of feeding places or even if the number of sets of teat cups is smaller than or equal to eight, efficient milking of a herd of animals is possible.

In an embodiment of an assembly according to the invention, the milking system is provided with a teat cup carrier for carrying a set of teat cups, which teat cup carrier is arranged stationarily. By "arranged stationarily" is meant that the teat cup carrier is arranged on the stationary world beside the feed platform. Such a stationary arrangement may take place by disposing the teat cup carrier on the floor or by suspending it from a ceiling or the like.

In an alternative embodiment of an assembly according to the invention, the milking system is provided with a teat cup carrier for carrying a set of teat cups, which teat cup carrier is movable.

In a further preferred embodiment of an assembly according to the invention, the milking system is provided with a movable connection device for, in particular automatically, connecting a set of teat cups to the teats of an animal. In order to be able to connect correctly a teat cup to a teat of an animal on the feed platform, the milking system is preferably provided with a teat position determining device for determining the position of a teat of an animal. Such a teat position determining device is known per se. Although such a teat position determining device may be arranged stationarily, for the sake of accuracy of the position determination it is advantageous if the teat position determining device is disposed on the connection device.

Said movable connection device is advantageously provided with a gripping device for gripping teat cups disposed on the teat cup carrier. When a particular animal is to be milked, it is thus possible for the movable connection device to take the teat cups from the teat cup carrier and to connect them to the teats of an animal. In this case it is possible to design the connection device in a manner known per se in such a way that the teat cups are connected one by one or at least substantially simultaneously. In this case the connection device preferably comprises a robot arm, in particular for carrying the gripping device.

In an embodiment of an assembly according to the invention, the milking system comprises a closed path for the movable teat cup carrier and the milking system is provided with a drive unit for moving the teat cup carrier along the closed path. This means that the area across which the teat cup carrier can move is limited to the closed path, which simplifies inter alia the collection of milk obtained and the maintenance of the sets of teat cups. Furthermore, in this manner a modular construction of the assembly is possible. A user of the assembly wishing to use the feed platform in the first instance only for feeding animals, may purchase at a later stage the milking system comprising a teat cup carrier in order to be able also to milk the animals.

The closed path of the milking system preferably comprises a rail. Such a rail may be disposed on a floor of the assembly or be suspended from a ceiling of the assembly. In this case it is possible that the rail is disposed at least partially above or below the feed platform.

In a further embodiment of an assembly according to the invention, the closed path of the milking system comprises a common, cylindrical support for teat cup carriers. This means that there is obtained a sort of cylindrical casing in which the teat cup carriers are accommodated. The shape and size of the cylindrical support may be attuned, on the one hand, to provide sufficient space for possible other components of the milking system and, on the other hand, to obtain an aesthetic exterior. It is also possible to select the shape of the rail or the cylindrical support in such a way that said rail or support, if disposed correctly, extends at least substantially parallel to a part of the feed platform. The common, cylindrical support is preferably rotatable.

A compact milking system, the milking system comprising at least one teat cup line that is connected to the set of teat cups, is obtained in an embodiment of an assembly according to the invention if the teat cup line extends towards an inner side of the closed path of the milking system. A further reduction of the size of the milking system, the milking system comprising a milking vacuum source, is obtained in an embodiment of an assembly according to the invention if the milking vacuum source is disposed on an inner side of the closed path of the milking system. A highly compact milking system, the milking system comprising a pulsation vacuum source, is obtained in an embodiment of an assembly according to the invention if the pulsation vacuum source is disposed on an inner side of the closed path of the milking system. The milking system preferably comprises a discharge line for discharging milk, which discharge line is connectable to the teat cup line and is disposed on an inner side of the closed path of the milking system. If the milking system comprises a measuring device for measuring milk parameters, it is advantageous for space-saving purposes to dispose said measuring device on an inner side of the closed path of the milking system. It is pointed out here that by the inner side of the closed path is meant the entire space surrounded by the closed path.

A particular embodiment of an assembly according to the invention is characterized in that the drive unit of the movable teat cup carrier is capable of being synchronized with the drive unit of the feed platform. This makes it possible to perform the milking of animals on the feed platform in a simple manner.

In order to be able to clean the teat cups, in an embodiment of an assembly according to the invention, the assembly is provided with a teat cup cleaning device for cleaning a teat cup. Such a teat cup cleaning device may be arranged stationarily, in particular in the proximity of the teat cup carrier. Alternatively, a teat cup cleaning device may be a movable teat cup cleaning device that is integrated for example in the teat cup carrier. It is pointed out that such a teat cup cleaning device may not only be suitable for cleaning teat cups, but also for disinfecting them.

In a further embodiment of an assembly according to the invention, the movable teat cup carrier is a self-propelled (autonomous) mobile teat cup carrying robot and there is provided a control unit for controlling the functioning of the mobile teat cup carrying robot for carrying a set of teat cups. By making use of a self-propelled, i.e. a freely movable, teat cup carrying robot, there is obtained more freedom in the construction of the assembly. In this case, space for disposing rails or a cylindrical support for the teat cup carrier has not to be taken into account. Moreover, the advantage of the possibility of a modular construction of the assembly is maintained.

In this case it is advantageous if the mobile teat cup carrying robot is provided with further milking means for milking an animal, the further milking means comprising at least a milk storage vessel for storing milk, a milking vacuum source and a pulsation vacuum source. This means that it is not necessary to convey the milk obtained to a milk collecting tank by means of transport lines, but that the mobile teat cup carrying robot can move automatically to said milk collecting tank when the milking of an animal has been finished. This may be determined in a manner known per se, for example when the milk flow measured by a flow meter has come below a particular threshold value.

To prevent possible infection of the milking means between the milkings of different animals, the assembly is provided with a cleaning device for cleaning the further milking means. Such a cleaning device may be a separate, stationarily arranged cleaning device, but may alternatively be integrated in the cleaning device for the teat cups. The mobile teat cup carrying robot is capable of moving autonomously to said cleaning device.

The assembly is preferably provided with a milk collecting tank and with a conveying device for conveying milk from the milk storage vessel in the teat cup carrying robot to the milk collecting tank, the milk storage vessel being preferably provided with a milk outlet. In an alternative embodiment, the milk storage vessel is an exchangeable milk storage vessel that may be transported for example as a whole to a milk factory.

In a preferred embodiment of an assembly according to the invention, the connection device and the teat cup carrier are integrated.

In an alternative embodiment of an assembly according to the invention, the movable connection device for connecting a set of teat cups to the teats of an animal is a separate self-propelled (autonomous) mobile teat cup connecting robot, the mobile teat cup connecting robot being provided with a control unit for controlling the mobile teat cup connecting robot. Since, for connecting the teat cups to the teats, the teat cup connecting robot is preferably provided with a teat position determining device, said teat cup connecting robot is relatively expensive. For efficiently milking a large herd, several teat cup connecting robots are required, which leads to relatively high costs for such an assembly. However, if a separate teat cup connecting robot is used, even in case of a large herd of animals one (relatively expensive) teat cup connecting robot and a number (for example four) of relatively cheaper teat cup carrying robots will suffice. The control unit of the teat cup carrying robot and the control unit of the teat cup connecting robot are then preferably provided with communication means for mutual communication or for communication with the central control unit in order to be able to co-operate in a correct manner.

In a further embodiment of an assembly according to the invention, the assembly is provided with a milking pre-treatment device for performing a milking pre-treatment on an animal on the feed platform, which milking pre-treatment device is provided with a pre-treatment tool carrier, with a pre-treatment tool carried by the pre-treatment tool carrier, and with a control unit for controlling the functioning of the milking pre-treatment device. Such a pre-treatment tool may be for example a cup or a brush for stimulating and/or cleaning and/or massaging a teat. The pre-treatment tool may also comprise a sprayer or the like.

Analogously to the teat cup carrier, the pre-treatment tool carrier is arranged stationarily in an embodiment of an assembly according to the invention. Alternatively, the pre-treatment tool carrier is movable. In order to be able to move correctly the pre-treatment tool to a teat, in an embodiment of an assembly according to the invention, the milking pre-treatment device is provided with a device for determining the position of a teat of an animal.

In a favorable embodiment of an assembly according to the invention, the milking pre-treatment device is provided with a movable contacting device for bringing a teat of an animal into contact with a pre-treatment tool. The movable contacting device is in particular provided with a gripping device for gripping a pre-treatment tool. The pre-treatment tool carrier and the contacting device are preferably integrated.

In a constructionally simple embodiment of an assembly according to the invention, the movable contacting device comprises a robot arm, in particular for carrying the gripping device.

Analogously to the teat cup carrier, in an embodiment of an assembly according to the invention, the pre-treatment tool carrier is movable, the milking pre-treatment device comprising a closed path for the movable pre-treatment tool carrier, and a drive unit being provided for moving the pre-treatment tool carrier along the closed path. Said closed path may comprise a rail. Analogously to the teat cup carrier, in an embodiment of an assembly according to the invention, the closed path may comprise a common, cylindrical support for several pre-treatment tool carriers.

If a pre-treatment tool is constituted by a spraying device for spraying and/or squirting a fluid on the teat, the milking pre-treatment device comprising at least one fluid line that is connected to the spraying device, an assembly according to the invention may be designed as a compact one in that the fluid line extends towards an inner side of the closed path.

In a preferred embodiment of an assembly according to the invention, the movable pre-treatment tool carrier is a self-propelled (autonomous) mobile pre-treatment tool carrying robot, thus providing more freedom in the construction of the assembly. In an embodiment of an assembly according to the invention, a pre-treatment is enabled in a simple manner if a drive unit of the movable pre-treatment tool carrier is capable of being synchronized with the drive unit of the feed platform.

In a further embodiment of an assembly according to the invention, the assembly is provided with a milking post-treatment device for performing a milking post-treatment on an animal on the feed platform, which milking post-treatment device is provided with a post-treatment tool carrier, with a post-treatment tool carried by the post-treatment tool carrier, and with a control unit for controlling the functioning of the milking post-treatment device. Analogously to the milking pre-treatment device, in an embodiment of an assembly according to the invention, the post-treatment tool carrier may be arranged stationarily. In an alternative embodiment, the post-treatment tool carrier is movable.

In order to be able to move correctly the post-treatment equipment, which may be for example a cup for disinfecting a teat or a cleaning device, to a teat to be treated, in an embodiment of an assembly according to the invention, the milking post-treatment device is provided with a device for determining the position of a teat of an animal.

The milking post-treatment device is preferably provided with a movable contacting device for bringing a post-treatment tool into contact with a teat of an animal. In this case it is advantageous if the movable contacting device is provided with a gripping device for gripping a post-treatment tool.

In an embodiment of an assembly according to the invention, the post-treatment tool carrier and the contacting device are integrated.

In a constructionally simple embodiment of an assembly according to the invention, the movable contacting device comprises a robot arm.

Analogously to the teat cup carrier, in an embodiment of an assembly according to the invention, the post-treatment tool carrier may be movable, the milking post-treatment device comprising a closed path for the movable post-treatment tool carrier, and a drive unit being provided for moving the post-treatment tool carrier along the closed path. In an embodiment of an assembly according to the invention, the closed path comprises a rail. For the purpose of obtaining a compact assembly, in an embodiment of an assembly according to the invention, the closed path comprises a common, cylindrical support for several post-treatment tool carriers. For the purpose of performing in a simple manner a post-treatment on an animal that is present on the feed platform, in an embodiment of an assembly according to the invention, the common, cylindrical support is rotatable, and there is provided a drive unit for rotating the common, cylindrical support.

If, in an embodiment of an assembly according to the invention, a post-treatment tool is constituted by a spraying device for spraying and/or squirting a fluid on the teat, the milking post-treatment device comprising at least one fluid line that is connected to the spraying device, a compact construction is obtained if the fluid line extends towards an inner side of the closed path.

In a further embodiment of an assembly according to the invention, the movable post-treatment tool carrier is a self-propelled (autonomous) mobile post-treatment tool carrying robot, thus providing more freedom in the construction of the assembly.

A post-treatment on an animal that is present on the feed platform may be performed in a simple manner if, in an embodiment of an assembly according to the invention, a drive unit of the movable post-treatment tool carrier is capable of being synchronized with the drive unit of the feed platform.

In an embodiment of an assembly according to the invention, the angular magnitude of the entrance is preferably greater than 90°. This will at least partially prevent an animal that is unwilling to board the platform from hindering other animals from getting access to the platform. This magnitude of the entrance enables simultaneous access of several animals to the feed platform.

Although the entrance may be provided with a closing device, such as for example a gate or fencing, this may lead, as described above, to discouraging certain animals from walking to the feed platform. In a particular embodiment of an assembly according to the invention, the entrance is free from a closing device. This means that animals are able to get free and voluntary access to the feed platform at all times without being hindered. Therefore, the assembly according to this embodiment is eminently suitable for being used instead of the customary feeding gate where for example roughage is supplied. A further advantage is that animals having a relatively low rank also have the possibility of easily boarding the feed platform, so that also these animals are able to consume sufficient feed, which may lead not only to a better animal health, but also to a higher milk yield.

In a further embodiment of an assembly according to the invention, the assembly is provided with an exit from the feed platform to said area where the animals are allowed to move freely, and, the width of the exit being sufficiently large to enable simultaneous exit of several animals to the area. This prevents an animal leaving the platform slowly or even refusing to leave the platform from hindering other animals from leaving the platform. In a particular embodiment of an assembly according to the invention, the exit is free from a closing device.

In an embodiment of an assembly according to the invention, the entrance and the exit may coincide. In an alternative embodiment of an assembly according to the invention, the entrance and the exit are remote from each other. In an embodiment of an assembly according to the invention, the assembly may be provided with several entrances and/or exits. In particular, there are provided one or more closable emergency exits that are controlled by a control unit, preferably the central control unit, which receives signals from a detection device detecting that an animal wishes to leave the platform earlier than usually. Such a detection device may be constituted by a camera detecting the number of times an animal lifts its head. When a threshold value has been exceeded, the control unit is capable of allowing the animal to leave the platform. As an alternative for a camera, there may be used a pressure sensor disposed at a certain level above a feeding place, or a step counter counting the number of steps made by an animal. Furthermore, an operating roller or brush may be disposed at a certain level immediately in front of the closable emergency exit, which operating roller or brush, when being touched by an animal passing below, activates the control unit of the closable emergency exit by means of a pressure contact. In this manner, animals experiencing too much stress or the like during their stay on the platform, which is expressed by an increased number of movements, are able to leave the platform at the closable emergency exits.

In a particular embodiment of an assembly according to the invention, the feed platform has a platform portion that is adjacent to the entrance or the exit, and, viewed in the direction of rotation of the feed platform and opposite to the direction of rotation of the feed platform, said platform portion has transitions at its ends, the assembly being provided with a deterring device for deterring an animal from crossing the transition. In this manner an animal is prevented from crossing the transition unintentionally. When, for example, an animal refuses to leave the feed platform at the exit zone, the deterring device is capable of ensuring that the animal does not cross the transition. In case an assembly according to the invention has a separate entrance and exit, such a deterring device at the transition located at the exit end located in the direction of rotation of the platform may be constituted for example by a stationary wall or a stationary fence that are provided immediately above the feed platform. Although an animal may continue to refuse to leave the feed platform, it will not get beyond the stationary wall or the stationary fencing. If a transition is intended for letting pass animals being present in a desired position on the feed platform, it is advantageous if the deterring device is designed in such a way that such a passage is made possible.

In a simple embodiment of an assembly according to the invention, the deterring device comprises a lowered ceiling. It has been found that such a lowered ceiling, which is for example somewhat higher than the highest dimension of an animal, has already a sufficiently deterring function to prevent animals from crossing the transition unintentionally.

In a further embodiment of an assembly according to the invention, the deterring device comprises a closing device. The closing device preferably comprises a curtain, or an equivalent element such as lamellas.

Such a closing device is preferably a controlled closing device, so that selected animals are allowed passage and other animals are refused passage.

In a further embodiment of an assembly according to the invention, the closing device comprises a rotatable door, a control unit and a drive unit for the rotatable door, which drive unit is controlled by the control unit and is capable of being synchronized with the drive unit of the feed platform.

In a particular embodiment of an assembly according to the invention, the closing device comprises a door whose size is variable, such as for example a sliding door. Such a sliding door may be designed in such a way that it opens sidewards or, alternatively, upwards. The operation of such a closing device may take place with the aid of detectors known per se, such as cameras and infrared sensors. These detectors may also be used to stop the drive of the feed platform and to supply an alarm signal in case of malfunction or unwillingness of an animal.

In a further embodiment of an assembly according to the invention, the assembly is provided with a cleaning device for cleaning the feed platform. During the use of the assembly by animals, in particular the upper surface on which the animals are standing is sensitive to contamination. However, other parts of the feed platform may be contaminated as well. By making use of a cleaning device it may be ensured that the feeding and milking of the animals take place hygienically, which may not only improve the animal health, but also the milk quality and the milk yield.

In an embodiment of an assembly according to the invention, the cleaning device is arranged stationarily. In an alternative embodiment, the cleaning device is movable.

In a particular embodiment of an assembly according to the invention, the cleaning device for the feed platform is disposed, viewed in the direction of rotation of the feed platform, between the exit and the entrance. This makes it possible for an animal always to enter a cleaned feeding place. Because of the absence of animals between the exit and the entrance, a cleaning device can be used in a highly efficient manner. Such a cleaning device may be operative continuously.

In a further embodiment of an assembly according to the invention, the cleaning device is provided with a cleaning control unit for controlling the functioning of the cleaning device. Although the cleaning device may be activated and deactivated manually, it is advantageous if the cleaning device is an automatic cleaning device. In order to prevent unnecessary cleaning of the feed platform, in an embodiment of an assembly according to the invention, the cleaning device comprises a device for determining the degree of contamination of the platform and for supplying degree-of-contamination signals to the cleaning control unit.

In an embodiment of an assembly according to the invention, the cleaning device comprises a manure slide, by means of which it is possible to remove big contamination parts, such as manure, from the feed platform in a simple manner. In a particularly favorable embodiment of an assembly according to the invention, the manure slide is capable of being arranged at an angle relative to the usual direction of movement of the feed platform. The manure slide is preferably movable in a direction transversely to the direction of rotation of the feed platform. In a further embodiment of an assembly according to the invention, the cleaning device comprises a rotatable cleaning brush. In an embodiment of an assembly according to the invention, the cleaning device may further comprise a sprayer for spraying and/or squirting a fluid on the platform. In this case it is advantageous if the sprayer is a high-pressure sprayer. The cleaning brush and the sprayer are preferably movable across the standing-surface of the feed platform.

In order to reduce the use of fluid, in an embodiment of an assembly according to the invention, the cleaning device is provided with a reuse device for making the fluid suitable for reuse.

In a further embodiment of an assembly according to the invention, an improved cleaning of the feed platform is obtained in that the cleaning device comprises a heating element for heating the fluid.

For removing fluid possibly remaining on the feed platform, in an embodiment of an assembly according to the invention, the cleaning device comprises a drying device for drying the feed platform. Such a drying device may function with the aid of compressed air and may possibly comprise a heating device for heating the compressed air.

In a further embodiment of an assembly according to the invention, the cleaning device is provided with an outlet for discharging impurities from the platform.

In an embodiment of an assembly according to the invention, the cleaning device is a self-propelled (autonomous) mobile cleaning robot, which mobile cleaning robot is provided with a control unit for controlling the mobile cleaning robot, thus providing more freedom in the construction of the assembly.

Although the mobile cleaning robot is capable of removing impurities from the feed platform by sliding or sweeping, it is advantageous if the mobile cleaning robot comprises a storage container for impurities. In this manner it is possible to discharge impurities directly from the feed platform into the storage container, without other parts of the feed platform coming into contact with those impurities, which occurs in the case of sliding or sweeping.

In a further embodiment of an assembly according to the invention, the assembly is provided with a storage place and/or an outlet for impurities, and the assembly is provided with a conveying device for conveying impurities from the storage container to the storage place and/or the outlet for impurities.

Although the storage container has a uniform opening both for letting in and letting out impurities, for providing more freedom of construction it is advantageous if the storage container is provided with a separate outlet for impurities.

In order to prolong the useful life of the storage container and to maintain an optimum effective capacity of the storage container, in an embodiment of an assembly according to the invention, the assembly is provided with a cleaning device for cleaning the storage container. The conveying device is in particular capable of being coupled automatically to the outlet. In an embodiment of an assembly according to the invention, a correct conveyance of impurities from the storage container to the storage place and/or the outlet for impurities is obtained in that the conveying device is provided with a coupling detector. In a particular embodiment, the conveying device is capable of being activated with the aid of data from the coupling detector.

In the above-described known assemblies, the feed platform is always provided with confining means for forming a stall which can only be occupied by one animal. Such a stall is considered necessary, because it should be possible also to milk an animal in the stall. Confinement then ensures that an animal will assume a reasonably defined position facilitating the connection of teat cups. An animal does not always experience such a confinement as pleasant, which may adversely affect the feed consumption and the milk yield. Moreover, such stalls hinder the animal boarding the platform from having the possibility of choosing only on the platform the feeding place where it wishes to eat. Free access of an animal to a feed platform is thus impeded. The invention is partially based on the insight that at least a sufficient milk yield and feed consumption can be obtained in an embodiment of an assembly according to the invention that is characterized in that the feed platform is at least for the greater part free from confining means for confining animals. Owing to the fact that the animals do not have a feeling of being confined, they will feel freer and calmer. There may be provided a few separation means on the platform to define a place on the platform where animals are not admitted, for example to create a crossing place on the feed platform for a farmer or a maintenance worker. As a result, in the case of an annular feed platform, the area inside the annular platform can be accessible to a farmer or a maintenance worker via the crossing place between the separation means. In a further embodiment of an assembly according to the invention, the feed platform is completely free from confining means.

In a favorable embodiment of an assembly according to the invention, each feeding place has an entrance opening for an animal, which entrance opening is tangential, i.e. parallel, to the usual direction of movement of the feed platform, so that an animal standing at a feeding place is positioned at least substantially transversely to the usual direction of movement of the feed platform. In this manner it is possible to reverse the direction of movement of the feed platform without the necessity of adaptations being applied for this purpose to the entrance or the exit. An animal is then able to board or to debark from the platform in the same manner, independently of the direction of movement of the feed platform.

In a preferred embodiment of an assembly according to the invention, the feed platform is provided with a locking device for locking an animal at a feeding place. This prevents an animal from leaving the platform unintentionally. Although being locked is sometimes experienced as unpleasant by an animal, it has been found that, when an animal is eating, being locked is experienced as less unpleasant than being confined.

In a preferred embodiment of an assembly according to the invention, the locking device comprises a neck-locking device. Alternatively or additionally, in an embodiment of an assembly according to the invention, the locking device comprises a locking feeding gate. In a particular embodiment of an assembly according to the invention, the assembly comprises a locking control unit for controlling the locking device, the locking device being capable of being activated and deactivated by the control unit. In a further embodiment of an assembly according to the invention, an eating indication device is provided for determining whether an animal is eating at a feeding place. In an embodiment of an assembly according to the invention, such an eating indication device may be constituted by a camera or a microphone that is capable of analysing eating sounds. In the case that the feeding place comprises a feed trough, the eating indication device may be constituted by a pressure sensor for measuring the pressure on the feed trough. Because an animal presses its nose against the feed trough when it is eating, said pressure is an eating indication. In a further embodiment of an assembly according to the invention, the locking device is controlled partially with the aid of data from the eating indication device. This makes it possible to lock an animal only when the animal is actually eating. The above-mentioned deterring device may also be controlled partially with the aid of data from the locking device. For this purpose, the relevant control units may be provided with communication means for mutual communication or communication with the central control unit. There is preferably provided a locking device at each feed trough.

In a further embodiment of an assembly according to the invention, the assembly is provided with a separation device for separating an animal standing on the platform and for leading the separated animal away from the platform. The separation device is in particular provided with a separation control unit.

Although the separation device may be constituted by a system of passages and gates located in the exit of the feed platform, said passages and gates have the disadvantage of adversely affecting the free movement of the animals. For this purpose, in an embodiment of an assembly according to the invention, the separation device comprises a cage and a cage displacing device for placing the cage over an animal, the displacing device comprising a drive unit. In an embodiment of an assembly according to the invention, a quick and correct separation may be obtained if the cage is displaceable by the displacing device transversely to a usual direction of movement of the feed platform. The cage is preferably displaceable by the displacing device in the usual direction of movement of the feed platform. In this case the displacing device is preferably provided with a suspension structure for suspending the cage above the feed platform.

Although the drive of the feed platform may be stopped for separating an animal, for the sake of efficiency of the use of the feed platform it is advantageous if, in an embodiment of an assembly according to the invention, the drive unit of the displacing device is capable of being synchronized with the drive unit of the feed platform.

In a further embodiment of an assembly according to the invention, the separation device is a self-propelled (autonomous) mobile animal gripping robot, which mobile animal gripping robot is provided with gripping means for gripping an animal, which, moreover, implies more freedom in the constructional design of the feed platform.

In a further embodiment of an assembly according to the invention, the control unit of the separation device is capable of being remotely controlled. As a result, it is not necessary for a farmer or an operator of the assembly to be physically present for controlling the separation device. In a particular embodiment of an assembly according to the invention, the separation device is provided with a transmitter for transmitting separation data. This makes it possible that the separation device sends a message to the farmer or the operator of the assembly, for example to the mobile telephone of said person, that a relevant animal has been separated and can be manually treated, examined or the like.

The feed platform may be constituted by a rotatable disc or ring. In a particular embodiment of an assembly according to the invention, the movable feed platform comprises an outer annular platform unit having an edge located on the outer side and having an inner edge, and an inner platform unit having an outer edge that is located at some distance from the inner edge of the outer platform unit, the outer platform unit and the inner platform unit being synchronously rotatable. This makes it possible to dispose, in a constructionally simple manner, possible treatment equipment, lines and the like in the space between the outer and inner annular platform units. Said treatment equipment is preferably provided with displacing means for displacing the treatment equipment from a first position, in which the treatment equipment is located below the plane formed by the inner and outer annular platform units, to a second position, in which the treatment equipment is located above the plane formed by the inner and outer annular platform units.

In a further embodiment of an assembly according to the invention, the assembly is provided with bridging elements for forming a bridge between the outer platform unit and the inner platform unit. By means of said bridging elements it is possible to get access in a simple manner to the inner annular platform unit.

The bridging elements are preferably arranged at the entrance and/or exit, so that animals are able to board the feed platform without problems.

Although the feeding system may comprise the manual supply of feed to the feeding places, in an embodiment of an assembly according to the invention, the feeding system comprises a feed supply station for supplying feed, in particular mechanically, pneumatically, hydraulically or automatically, to a feeding place. In a further embodiment of an assembly according to the invention, the feed supply station is suitable for supplying fluid, such as water, to a feeding place.

It is possible that, by gravitational force, feed from a storage bin disposed above a feeding place falls freely downwards onto the feeding place. However, in this case it may occur that not always the correct amount of feed falls onto the feeding place. In order to obtain a more accurate feed supply to the feeding place, in an embodiment of an assembly according to the invention, the feed supply station is provided with a feed storage container and with a conveying device for conveying the feed from the feed storage container to a feeding place. In an embodiment of an assembly according to the invention, the conveying device is preferably movable by a drive unit, so that, for example by the movement of the conveying device, feed can be supplied to several feeding places. In this case it is particularly advantageous if the drive unit of the conveying device is capable of being synchronized with the drive unit of the feed platform.

Analogously to the teat cup carrier, in an embodiment of an assembly according to the invention, the feed supply station may be arranged stationarily. In a further embodiment of an assembly according to the invention, there are arranged several feed supply stations distributed over an inner edge and/or an outer edge of the feed platform.

In a further embodiment of an assembly according to the invention, the feed supply station comprises a self-propelled (autonomous) mobile feed supplying robot, thus providing more freedom in the construction of the assembly.

In a preferred embodiment of an assembly according to the invention, the assembly is provided with navigation means for navigating the mobile robot. This enables a correct displacement of the mobile robot in the assembly. In this case it is advantageous if the navigation means are capable of being brought into contact with the central control unit. For the purpose of achieving a highly accurate displacement of a mobile robot, in an embodiment of an assembly according to the invention, the navigation means are disposed at least partially on the mobile robot. In this case, in a further embodiment of an assembly according to the invention, it is advantageous if the navigation means comprise position determining means for determining the position of the mobile robot and for supplying position information to the control unit.

The mobile robot is preferably provided with its own energy supply, a rechargeable energy supply being in particular suitable for the purpose. In the latter case, in an embodiment of an assembly according to the invention, it is advantageous if the assembly is provided with a charger device for recharging the energy supply. In order to enable a high degree of automation of the assembly, in an embodiment of an assembly according to the invention, the rechargeable energy supply is provided with a charging port and the charger device is capable of being coupled automatically to the charging port. In order to enhance the safety and the accuracy of recharging, in an embodiment of an assembly according to the invention, the charger device is provided with a coupling detector. In an embodiment of an assembly according to the invention, the charger device is capable of being activated with the aid of data from the coupling detector. This makes it possible only to recharge when the coupling detector indicates that the coupling has taken place.

In order to improve the functioning and the safety of the assembly, in an embodiment it is advantageous if the mobile robot is provided with a malfunction detector for detecting an internal malfunction. The assembly is preferably provided with an alarm-signal-issuing device for issuing an alarm signal with the aid of data from the malfunction detector. Said alarm signal may be sent for example to the farmer or the operator of the assembly to enable the person in question to take the necessary measures for repairing the malfunction.

The safety of the assembly is further improved in an embodiment in which the mobile robot is capable of being deactivated with the aid of data from the malfunction detector.

Since an improved functioning may be obtained if the mobile robot is also capable of moving across the feed platform, in a favorable embodiment of an assembly according to the invention, the mobile robot is dimensioned in such a way that it is capable of being placed as a whole under an animal between the forelegs and hind legs of said animal. Separation means, if any, or a locking feeding gate or the like that may be disposed on the feed platform, may be designed in such a way that they comprise a passage opening for the mobile robot.

In order to prevent the mobile robot inter alia from colliding with objects, in an embodiment of an assembly according to the invention, the mobile robot is characterized in that it is provided with a proximity detector for detecting the proximity of an object. In an embodiment of an assembly according to the invention, the mobile robot and/or other objects may be prevented from being damaged as a result of undesired contacts with the mobile robot if the assembly is characterized in that the mobile robot is provided with a protecting device for protecting at least a part of the mobile robot, the protecting device being capable of being brought from an inactive position into an active protecting position. Such a protecting device may be a protecting cap, an airbag or the like. The protecting device is in particular capable of being brought from an inactive position into an active protecting position with the aid of data from the proximity detector. In an embodiment the proximity detector comprises a camera. Alternatively or additionally, the proximity detector may comprise an approach sensor.

In an embodiment of an assembly according to the invention in which the mobile robot is provided with a signal-issuing device for issuing a perceptible signal, the mobile robot is capable of signalling its presence to its environment. Besides, said signal-issuing device may be used for making sounds audible or perceptible to an animal. In a preferred embodiment, the signal-issuing device is capable of being activated with the aid of data from the proximity detector. The proximity detector is in particular connectable to the navigation means in order to make it possible for the mobile robot to navigate around an obstacle.

Since a mobile robot may be contaminated by being used in an assembly according to the invention, which might adversely affect the functioning of the mobile robot or lead to less hygiene, an embodiment of an assembly according to the invention is characterized in that the assembly is provided with a cleaning device for cleaning the exterior of the mobile robot.

Although animals will go to the feed platform because of the feed to be obtained there, the use of the feed platform may be optimized if an embodiment of an assembly according to the invention is characterized in that the feeding system is provided with only one feeding area that is freely accessible to the animals, said single feeding area being constituted by the feed platform. The invention is partially based on the insight that the place where roughage is supplied to animals, which is usually provided in a stable, is in fact superfluous. As a result, an animal will visit the feed platform voluntarily at least three to four times per 24 hours.

In an embodiment of an assembly according to the invention that is characterized in that the feeding system comprises a feeding place controlled by a control unit for supplying feed in a controlled manner, an individual additional feeding of an animal is possible. In an embodiment of an assembly according to the invention, this controlled feeding place may be arranged on the feed platform. Alternatively or additionally, a controlled feeding place may be arranged separately from the feed platform.

In a further embodiment of an assembly according to the invention, the conveying device comprises a first conveyor for conveying feed from the feed storage container in upward direction, the first conveyor having a supply end for supplying feed to be conveyed to the feeding place. Due to the fact that the first conveyor conveys the feed in upward direction, there appears to be obtained a highly accurate metering as well as a quick supply of the feed.

Although the feed may be conveyed directly from the first conveyor to the feeding place, it is advantageous, inter alia for the purpose of mixing feed, if the assembly is provided with a receptacle, the first conveyor conveying an amount of feed from the feed storage container to the receptacle.

A further embodiment of an assembly according to the invention is characterized in that the receptacle is provided with a weighing device for weighing feed present in the receptacle. This makes it possible to determine the amount of feed to be supplied to the feeding place. Thus, it is also possible to realize an accurate composition of the feed.

Although the feed may be taken from the receptacle by means of a separate taking-out device, for the sake of simplicity of the construction it is advantageous if there is not used a separate device for taking out. There may be used a tiltable receptacle, feed falling from the receptacle after the latter has been tilted. However, in order to improve the hygienic use of the assembly, the receptacle preferably comprises a bottom which is adapted to be opened. An embodiment of an assembly according to the invention is preferably characterized in that the control unit controls the opening of the bottom of the receptacle.

Although the amount of feed may be conveyed directly from the receptacle to the feeding place, it is constructionally advantageous if the conveying device comprises a second conveyor for conveying the amount of feed from the receptacle to the feeding place.

In a further embodiment of an assembly according to the invention, the second conveyor is a tube-shaped chute or a channel-shaped chute. As a result, a separate drive mechanism for conveying the feed is not required, the gravitational force causing the feed to flow towards the feeding place.

In a further embodiment of an assembly according to the invention, a compact construction of a feed supply station of the assembly is obtained if the feed storage container comprises a number of storage bins, the storage bins being disposed on a framework located around a central axis. In this case storage bins may contain different sorts of feed, so that the composition of feed to be supplied to a feeding place can each time be varied. Each storage bin preferably comprises a discharge end, said discharge end corresponding with the relevant supply end of the first conveyor.

A compact construction may be obtained if the discharge ends of the storage bins alternately stagger in height, the arrangement being such that the discharge ends of juxtaposed storage bins partially overlap each other in a projective view. The second conveyor is preferably disposed rotatably about the central axis, so that a small number of second conveyors, preferably one, will suffice.

In order to obtain insight in the eating behavior of an animal and to be able to take into account feed still present in the feeding place at a possible further supply of feed, in an embodiment of an assembly according to the invention, the feeding system comprises a weighing device for weighing feed present in a feeding place. Said weighing device may be connectable to the control unit of the feeding system and may additionally be connectable to the central control unit.

Although, in an embodiment of an assembly according to the invention, the feeding place constitutes part of the feed platform itself, in other words comprises an at least substantially horizontal plane, for reasons of hygiene it is advantageous if a feeding place comprises a feed trough.

A further embodiment of an assembly according to the invention is characterized in that the feed trough has an entrance opening for an animal, the feed trough having a shape that widens from the entrance opening. A feed trough having a shape that widens from the entrance side appears to have unexpected advantages in relation to the feed consumption of animals. In this case the degree of widening is in particular such that an animal, for example a cow, has relatively much lateral freedom with the front part of the head.

In an embodiment of an assembly according to the invention, a compact construction is obtained if a feed trough is fastened to the feed platform in a way in which it is capable of being tilted about a horizontal axis. Such a tiltable feed trough offers major advantages. It is preferably possible for example that the weighing device comprises a tilt measuring device for determining the degree of tilt of the feed trough, and that the weight of the feed present in the feed unit is deduced from the degree as determined. The tilt measuring device preferably comprises a measuring roll that is in contact with the feed trough. Additionally or alternatively, the weighing device comprises a torque meter, the feed trough being adapted to be brought into contact with the torque meter.

In a further embodiment of an assembly according to the invention, the feeding system is provided with closing means for closing an entrance opening to the feed trough. This makes it possible to prevent access to particular feed troughs, for example because these feed troughs have to be cleaned, or when maintenance has to be performed. Moreover, closing a feed trough may ensure that an animal is sooner inclined to leave the platform. Consequently, the entrance opening to the feed trough is in particular closed when or immediately before the feed trough has reached the exit.

In an embodiment of an assembly according to the invention, the closing means comprise a closing device that is movable across the entrance opening. In order to reduce the number of components, an embodiment of an assembly according to the invention is characterized in that the closing means are constituted by the feed trough.

If, in an embodiment of an assembly according to the invention, a feed trough is designed in such a way that it is sound-proof when an animal has put its head in the feed trough, an animal is at least almost not disturbed by environmental sounds, so that the feed consumption and possibly the milk yield can be improved. If desired, calming sounds or sounds stimulating the milk secretion may be supplied to a feeding place if a loudspeaker that is connectable to a sound-generating device is disposed at each feeding place.

An assembly functioning at a high degree of automation is obtained if, in an embodiment of an assembly according to the invention, the feeding system is provided with a provisioning system for automatically provisioning the feed storage container.

Such a provisioning system may comprise a tunnel passing under the feed platform. Alternatively or additionally, the provisioning system may comprise a rail system with feed grippers that is suspended above the feed platform.

In a preferred embodiment of an assembly according to the invention, the assembly is provided with position beacons and the assembly is provided with detection means for detecting the surroundings of the position beacons. In this manner it is possible to determine the position of in particular moving objects in an area surrounding the position beacons relative to the position beacons. In a particular embodiment of an assembly according to the invention, the position beacons comprise marks made on the feed platform. In this manner it is possible to determine accurately the position and orientation of moving units, such as animals and possibly mobile robots, on the feed platform, in particular if the detection means are suitable for establishing the position of an animal on the feed platform.

In a further embodiment of an assembly according to the invention, the assembly is provided with a camera system for monitoring the feeding system and/or the milking system, the detection means preferably comprising the camera system. In combination with position beacons and picture processing and analyzing software, a camera system is a highly suitable system for determining the position of objects.

In a favorable embodiment of an assembly according to the invention, the detection means and/or the camera system are/is connectable to a control unit.

In a further embodiment of an assembly according to the invention, the assembly is provided with an animal-recognition device for recognizing an animal. The information is supplied by the animal-recognition device and may be used in an advantageous manner for the control of certain actions in the assembly and for monitoring the animal traffic through the assembly.

Analogously to the teat cup carrier, the animal-recognition device may be arranged stationarily. The animal-recognition device is preferably arranged at a transition. This makes it possible to determine in which area or zone an animal is present.

In a further embodiment of an assembly according to the invention, the animal-recognition device comprises at least one movable animal-recognition unit. The movable animal-recognition device is in particular disposed on the feed platform, it being highly advantageous if the animal-recognition device comprises an animal-recognition unit per feeding place. Thus it is possible not only to adapt the amount and sort of feed to be supplied per animal.

The animal-recognition device may be used in particular to determine whether or not an animal is to be milked. In this case the animal-recognition device, as is usual with automatic milking, is capable of co-operating with a control unit in which a milking criterion is included. In particular if the feed platform is freely accessible to an animal, it may occur that an animal is present on the feed platform more frequently than required for being milked. Using the animal-recognition device thus provides the possibility for the animals to move freely to the feed platform, it still remaining possible to milk the animals automatically if the milking criterion has been fulfilled. Consequently, the animals do not need to be driven towards the feed platform for being milked. Of course, the same holds for other treatments than milking.

In an embodiment of an assembly according to the invention, the animal-recognition device comprises an animal-recognition unit disposed on a mobile robot. This makes it possible that a mobile robot performs a treatment or an action in dependence on the identity of an animal established by the animal-recognition unit.

In an embodiment of an assembly according to the invention, the animal-recognition device is in particular connectable to a control unit, in particular the central control unit, for supplying it with recognition information. In an embodiment of an assembly according to the invention, the control unit is programmed in such a way that the control of the assembly or the relevant component takes place partially with the aid of the recognition information.

In order to prevent undesirable contamination of the assembly, in an embodiment the assembly is provided with a stationarily arranged manure collecting device. When the feeding place is arranged on the inner side of the feed platform, which is usually the case, it is advantageous if the manure collecting device is adjacent to the outer edge of the platform. It is obvious, of course, that, if the construction of the assembly is such that the feeding place is arranged at the outer edge of the feed platform, the manure collecting device will be arranged on the other side, i.e. the inner side.

Although the manure collected by the manure collecting device may be discharged by a separate device, it is advantageous if, in an embodiment of an assembly according to the invention, the manure collecting device is provided with means for discharging manure. It is in particular advantageous if the manure collecting device is provided with means for analysing manure. In this manner it is not only possible to examine the health of the animals, but also to check whether particular environmental requirements have been fulfilled.

Although it has been found that the animals leave the feed platform voluntarily, it may occur that an animal leaves the feed platform too slowly or does not want to leave the feed platform at all. This is prevented in an embodiment of an assembly according to the invention, in which the assembly is provided with removing means for removing animals from the platform.

In a preferred embodiment of an assembly according to the invention, the assembly is provided with weighing means for weighing animals.

When an animal leaves the feed platform, there may still be feed present in the feeding place. Although this remaining feed may be left in the feeding place for the next animal to visit the feeding place, in an embodiment of an assembly according to the invention, it is advantageous, in particular if it is possible to supply a different amount or sort of feed per animal, if the assembly is provided with processing means for collecting and further processing feed left in a feeding place.

In an embodiment of an assembly according to the invention, it is advantageous if the feed trough has a content of at least approximately 20 dm3 in order to be able to contain a sufficient amount of basic feed, such as roughage or ensilaged grass or the like. It is pointed out here that with known automatic milking systems in a milking stall, whether or not on a platform, only a limited amount of concentrate is supplied to animals, so that the maximum content of these known feed troughs only amounts to approximately 15 dm3.

In a specific embodiment of an assembly according to the invention, the feed platform is capable of being driven by the drive unit at an angular speed of approximately 0.05 °/s to approximately 0.15 °/s, which, at a feed platform diameter of 16 m, corresponds to a speed of movement at the outer edge of the feed platform of approximately 0.007 to approximately 0.021 m/s. This results in a length of stay of an animal on the feed platform that amounts to at least 35 minutes. In other words, the speed of movement of the feed platform is adapted (beforehand or during the movement) in such a way that a length of stay of an animal on the feed platform is obtained that amounts to at least 35 minutes. It is pointed out here that with known milking carrousels said speed of movement is set in such a way that the time an animal spends on the platform is determined by the milking duration (approximately 10 to 15 minutes) so that the rotational speed of the known platforms amounts to at least 0.3 °/s. It is pointed out here that the invention is partially based on the insight that, despite of the fact that an animal is present on a feed platform at any rate during a long dead time, the assembly still allows to feed and milk animals efficiently. In fact, according to the invention, the time an animal spends on the feed platform is not determined by the milking time, but rather by the time an animal needs to consume feed.

An embodiment of an assembly according to the invention is thus characterized in that the feeding system control unit comprises a memory for containing feed-consumption-duration data, and in that the feeding system control unit controls the drive partially with the aid of the feed-consumption-duration data.

In a favorable embodiment of an assembly according to the invention, the feed platform is capable of being driven by the drive unit optionally in opposite directions of movement.

The invention further relates to a feed platform that is in particular suitable for use in an assembly according to the invention, the feed platform being free from teat cups and a feed trough being fastened to the feed platform in a way in which it is capable of being tilted about a horizontal axis. As already described in the foregoing, this implies more freedom in the constructional design of the feed platform. In a preferred embodiment of a feed platform according to the invention, the feed platform constitutes a closed path and has an edge on its outer side. The feed platform is preferably substantially circular.

In a further favorable embodiment of a feed platform according to the invention, the feed platform is at least for the greater part free from confining means for confining animals. The feed platform is preferably completely free from confining means.

In a particular embodiment of a feed platform according to the invention, each feeding place comprises a feed trough, said feed trough having an entrance opening for an animal, which entrance opening is tangential, i.e. parallel, to the usual direction of movement of the feed platform, so that an animal standing at a feed trough is positioned at least substantially transversely to the usual direction of movement of the feed platform.

In a further embodiment of a feed platform according to the invention, the feed platform is provided with a locking device for locking an animal at a feeding place. The locking device comprises in particular a neck-locking device. The locking device preferably comprises a locking feeding gate.

Although the locking or securing may take place mechanically, it is advantageous if the feed platform comprises a locking control unit for controlling the locking device and if the locking device is capable of being activated and deactivated by the control unit. A locking device is in particular disposed at each feeding place.

In a particular embodiment of a feed platform according to the invention, the feed platform is provided with an outer annular platform unit having an edge located on the outer side and having an inner edge, and with an inner platform unit having an outer edge that is located at some distance from the inner edge of the outer platform unit.

In a further embodiment of a feed platform according to the invention, the feed platform is provided with position marks. It is advantageous if, in an embodiment of a feed platform according to the invention, an animal-recognition device is disposed on the feed platform.

The invention further relates to a milking system suitable for use in an assembly according to the invention, the milking system comprising a movable teat cup carrier and a closed path for the movable teat cup carrier, the milking system being provided with a drive unit for moving the teat cup carrier The closed path of the milking system in particular comprises a rail. In an embodiment of a milking system according to the invention, the closed path of the milking system comprises a common, cylindrical support for teat cup carriers. The common, cylindrical support is preferably rotatable.

In a further embodiment of a milking system according to the invention, the milking system comprises at least one teat cup line that is connected to the set of teat cups, which teat cup line extends towards an inner side of the closed path of the milking system. If the milking system comprises a milking vacuum source, the latter is preferably disposed on an inner side of the closed path of the milking system. If the milking system comprises a pulsation vacuum source, the latter is preferably disposed on an inner side of the closed path of the milking system. If the milking system comprises a discharge line for discharging milk, which discharge line is connectable to the teat cup line, said discharge line is preferably disposed on an inner side of the closed path of the milking system. If the milking system comprises a measuring device for measuring milk parameters, said measuring device is preferably disposed on an inner side of the closed path of the milking system.

The invention also relates to a milking pre-treatment device for performing a milking pre-treatment on an animal and suitable for use in an assembly according to the invention, the milking pre-treatment device being provided with a pre-treatment tool carrier, with a pre-treatment tool carried by the pre-treatment tool carrier, and with a control unit for controlling the functioning of the milking pre-treatment device. In a preferred embodiment of a milking pre-treatment device according to the invention, the pre-treatment tool carrier is movable. In a further embodiment of a milking pre-treatment device according to the invention, the milking pre-treatment device is provided with a device for determining the position of a teat of an animal. The milking pre-treatment device is preferably provided with a movable contacting device for bringing a pre-treatment tool into contact with a teat of an animal. The movable contacting device is in particular provided with a gripping device for gripping a pre-treatment tool. It is advantageous if the pre-treatment tool carrier and the contacting device are integrated.

In a further embodiment of a milking pre-treatment device according to the invention, the movable contacting device comprises a robot arm.

In again another embodiment of a milking pre-treatment device according to the invention, the pre-treatment tool carrier is movable, the milking pre-treatment device comprising a closed path for the movable pre-treatment tool carrier, and a drive unit being provided for moving the pre-treatment tool carrier along the closed path. The closed path preferably comprises a rail.

In a favorable embodiment of a milking pre-treatment device according to the invention, the closed path comprises a common, cylindrical support for several pre-treatment tool carriers.

In an embodiment of a milking pre-treatment device according to the invention, a pre-treatment tool is constituted by a spraying device for spraying and/or squirting a fluid on the teat, and the milking pre-treatment device comprises at least one fluid line that is connected to the spraying device. In this case it is advantageous if the fluid line extends towards an inner side of the closed path.

The invention also relates to a milking post-treatment device for performing a milking post-treatment on an animal and suitable for use in an assembly according to the invention, the milking post-treatment device being provided with a post-treatment tool carrier, with a post-treatment tool carried by the post-treatment tool carrier, and with a control unit for controlling the functioning of the milking post-treatment device. In an embodiment, the post-treatment tool carrier is movable. In a further embodiment, the milking post-treatment device is provided with a device for determining the position of a teat of an animal. The milking post-treatment device is preferably provided with a movable contacting device for bringing a post-treatment tool into contact with a teat of an animal. In this case it is advantageous if the movable contacting device is provided with a gripping device for gripping a post-treatment tool. The post-treatment tool carrier and the contacting device are preferably integrated. In a still further embodiment of a milking post-treatment device according to the invention, the movable contacting device comprises a robot arm.

In an embodiment of a milking post-treatment device according to the invention, the post-treatment tool carrier is movable, the milking post-treatment device comprising a closed path for the movable post-treatment tool carrier, and a drive unit being provided for moving the post-treatment tool carrier along the closed path. The closed path preferably comprises a rail.

In an embodiment of a milking post-treatment device according to the invention, the closed path comprises a common, cylindrical support for several post-treatment tool carriers. The common, cylindrical support is preferably rotatable and there is provided a drive unit for rotating the common, cylindrical support.

In an embodiment of a milking post-treatment device according to the invention, a post-treatment tool is constituted by a spraying device for spraying and/or squirting a fluid on the teat, the milking post-treatment device comprising at least one fluid line that is connected to the spraying device. The fluid line preferably extends towards an inner side of the closed path.

The invention further relates to a cleaning device suitable for cleaning a feed platform of an assembly according to the invention, the cleaning device being provided with a cleaning control unit for controlling the functioning of the cleaning device, and the cleaning device comprising a device for determining the degree of contamination of the platform and for supplying contamination-degree-signals to the cleaning control unit. The cleaning device is preferably an automatic cleaning device. In an embodiment of a cleaning device according to the invention, the cleaning device comprises a manure slide. The orientation of the manure slide is preferably adjustable.

In a still further embodiment of a cleaning device according to the invention, the cleaning device comprises a rotatable cleaning brush.

In an embodiment of a cleaning device according to the invention, the cleaning device comprises a sprayer for spraying and/or squirting a fluid on the platform. The sprayer is preferably a high-pressure sprayer. In a favorable embodiment, the cleaning device is provided with a reuse device for making the fluid suitable for reuse. The cleaning device comprises in particular a heating element for heating the fluid. Moreover, it is advantageous if, in an embodiment of a cleaning device according to the invention, the cleaning device comprises a drying device for drying the feed platform. The cleaning device is preferably provided with an outlet for discharging impurities.

The invention further relates to a separation device for separating an animal, which separation device is suitable for use in an assembly according to the invention in which the separation device is provided with a separation control unit, the separation device comprising a cage and a cage displacing device for placing the cage over an animal, the displacing device comprising a drive unit. The displacing device is in particular provided with a suspension structure for suspending the cage. In an embodiment of a separation device according to the invention, the separation device is provided with a transmitter for transmitting separation data.

The invention further relates to a feeding system suitable for use in an assembly according to the invention, the feeding system comprising a feed supply station for supplying feed to a feeding place, the feed supply station being provided with a feed storage container and with a conveying device for removing feed from the feed storage container, and the feeding system being provided with a control unit for controlling the functioning of the feeding system. The conveying device is preferably movable by a drive unit. In an embodiment of a feeding system according to the invention, the conveying device comprises a first conveyor for conveying feed from the feed storage container in upward direction, the first conveyor having a supply end for supplying feed. In a further embodiment of a feeding system according to the invention, the feed supply station is provided with a receptacle, the first conveyor conveying an amount of feed from the feed storage container to the receptacle. The receptacle is preferably provided with a weighing device for weighing feed present in the receptacle. In an embodiment, the receptacle has a bottom which is adapted to be opened, the control unit preferably controlling the opening of the bottom of the receptacle.

In a further embodiment of a feeding system according to the invention, the conveying device comprises a second conveyor for conveying an amount of feed from the receptacle. The second conveyor is preferably a tube-shaped chute or a channel-shaped chute.

In a still further embodiment of a feeding system according to the invention, the feed storage container comprises a number of storage bins, the storage bins being disposed on a framework located around a central axis. Each storage bin preferably comprises a discharge end, said discharge end corresponding with the relevant supply end of the first conveyor. The discharge ends of the storage bins in particular alternately stagger in height, the arrangement being such that the discharge ends of juxtaposed storage bins partially overlap each other in a projective view. It is advantageous if the second conveyor is rotatably disposed about the central axis.

The invention further relates to a milking system suitable for use in an assembly according to the invention, the milking system comprising a movable teat cup carrier and a movable connection device for connecting a set of teat cups to the teats of an animal, the movable teat cup carrier being a self-propelled (autonomous) mobile teat cup carrying robot, which mobile teat cup carrying robot is provided with milking means for milking an animal on the feed platform, the milking means comprising at least a milk storage vessel for storing milk, a milking vacuum source and a pulsation vacuum source, and with a control unit for controlling the functioning of the mobile teat cup carrying robot, and the movable connection device for connecting a set of teat cups to the teats of an animal is a separate self-propelled (autonomous) mobile teat cup connecting robot, the mobile teat cup connecting robot being provided with a control unit for controlling the mobile teat cup connecting robot.

In an embodiment of a milking system according to the invention, the control unit of the teat cup carrying robot and the control unit of the teat cup connecting robot are provided with communication means for mutual communication.

The invention further relates to a method of automatically milking an animal, in which method is used an assembly with a movable feed platform according to the invention, and which method comprises the following steps: setting the movable feed platform in motion, allowing an animal access to the feed platform, subsequently allowing the animal exit from the feed platform, milking the animal on the feed platform during a milking period, the method further comprising the step of providing the animal a span of time on the feed platform in which the animal is not milked, said span of time having a magnitude amounting to at least approximately half the milking period, and the milking of the animal comprising the connection of a teat cup, the teat cup being arranged separately from the feed platform, and the animal being allowed free access to the feed platform. The invention is partially based on the insight that dairy animals sometimes experience the mechanical way of milking as unpleasant, and consequently experience walking to and boarding the platform and the time spent on the platform as unpleasant, which may adversely affect the milk production and sometimes even the milk quality. By providing on the feed platform a span of time in which the animal is not milked it may be ensured that the animal will experience boarding the platform and the time spent on the platform as less unpleasant. This span of time, which may also be called period of rest, is a deliberately provided span of time, and it has been found that this span of time should not be too short, but should amount to at least half a milking period to produce a noticeable effect on the animal, which will then feel more at ease, and consequently to improve the milk production. It is pointed out that the span of time as meant in the method according to the invention should not be confused with the above-mentioned dead time. This dead time, occurring in the known assemblies, is the time an animal spends on the platform without undergoing a treatment that is usually associated with the milking process, and, for the purpose of efficiently using the known assemblies, this dead time will be reduced to a minimum. Such a dead time occurs between the moment the animal enters the platform and the connection of the teat cups and may occur between the disconnection of the teat cups and the moment the animal leaves the platform. Contrary to the state of the art, according to the invention, there is provided on the contrary an extra long 'dead time' resulting, contrary to the expectations, in an improved milk yield. An unexpected improvement of the milk production will be provided in particular in combination with the teat cup being disposed separately from the feed platform; in other words, if the platform is at least for the greater part free from teat cups, this will result in more freedom in the construction of the feed platform and freedom of movement for an animal.

In an embodiment of a method according to the invention, the span of time has a magnitude lying between approximately one time the milking period and approximately five times the milking period. A span of time having such a magnitude has appeared to be able to provide an improved milk production for all the animals, in particular in relation to quantity and quality.

In a further embodiment of a method according to the invention, the method comprises the step of determining the identity of an animal present on the feed platform. The magnitude of the span of time is then preferably selected in dependence on the identity of the animal. It will be obvious that, if several animals are present on the feed platform, it will be possible to give a certain priority to one animal for determining the magnitude of the span of time, inter alia by means of a computer provided with a memory containing data in relation to spans of time per animal and a suitable program (possibly with priority algorithms) for selecting the span of time on the basis of the determined identity.

In a favorable embodiment of a method according to the invention, at least a part of the span of time on the feed platform in which the animal is not milked is provided after the animal has been milked on the feed platform. In this manner an animal will be able to recover at least partially from the milking.

In a further embodiment of a method according to the invention, at least a part of the span of time on the feed platform in which the animal is not milked is provided before the milking of the animal on the feed platform. Owing to this, after boarding the feed platform, an animal is not immediately confronted with a milking related treatment, so that the boarding of the feed platform is not immediately associated with the milking process that is sometimes experienced as unpleasant.

In a further embodiment of a method according to the invention, the movable feed platform is moved continuously. Owing to this, the span of time in which an animal is not milked corresponds to a particular distance covered by the animal on the feed platform relative to the stationary world. Such a distance or area or zone may be designated as resting zone or resting station. Owing to this, the milking period in which an animal is milked corresponds to a particular distance covered by the animal on the feed platform relative to the stationary world. Such a distance or area or zone may be designated as milking zone or milking station. The animal on the feed platform thus passes different stations or zones that are arranged as it were beside the feed platform.

In an alternative embodiment of a method according to the invention, the movable feed platform is set in motion intermittently. In this case it is advantageous if the feed platform is immobile during the span of time in which the animal is not milked. In this manner it is possible to reduce the size of the feed platform. In a further embodiment of a method according to the invention, the feed platform may be immobile during the milking of the animal on the feed platform.

In a further embodiment of a method according to the invention, the method comprises the step of setting the feed platform in motion between the milking of the animal on the feed platform and the part of the span of time on the feed platform after the milking, in which part of the span of time the animal is not milked. In a still further embodiment of a method according to the invention, the method comprises the step of setting the feed platform in motion between the part of the span of time before the milking on the feed platform, in which part of the span of time the animal is not milked, and the milking of the animal on the feed platform.

In a particular embodiment of a method according to the invention, the magnitude of the part of the span of time after the milking is selected in such a way that the orifice of at least one teat of the animal will be closed after the span of time has elapsed. In a further embodiment of a method according to the invention, the magnitude of the part of the span of time after the milking is selected in such a way that the orifices of all the teats of the animal will be closed after the span of time has elapsed. In this manner it is prevented that an animal that leaves the platform and lies down somewhere will get one or more contaminated teat orifices that increase the risk of infection and declined milk production.

In an embodiment of a method according to the invention in which it is prevented that the animal lies down in the part of the span of time after the milking, it is also prevented that the teat orifices get contaminated on the feed platform.

In a further embodiment of a method according to the invention, a leg-treatment is performed in the part of the span of time after the milking. This makes it possible to improve the health of an animal, the leg-treatment being in particular desirable for improving the milk production of an animal. If desired, it is possible to perform treatments on the animal which are experienced by the animal as pleasant, such as back-brushing, cooling and the like.

In a further embodiment of a method according to the invention, in the span of time on the feed platform no treatment is performed on the animal. Refraining from such an active action on an animal ensures that the animal will experience a pleasant period of rest on the feed platform, which may improve the milk production. It is pointed out here that feeding and watering an animal should not be considered as a treatment, because an animal decides itself on consuming offered feed and drink.

In an embodiment of a method according to the invention, the milking comprises the performance of a milking pre-treatment. In a further embodiment of a method according to the invention, the milking comprises the performance of a milking post-treatment.

In an embodiment of a method according to the invention, the method comprises the step of locking the animal on the feed platform. The locking of the animal is preferably discontinued for allowing exit from the feed platform.

In a further embodiment of a method according to the invention, the method further comprises the steps of deciding with the aid of a computer, on the basis of the established identity, what treatment(s) the animal will undergo, and of treating the identified animal on the feed platform. In this manner it is possible to treat each animal as desired or required.

In a particular embodiment of a method according to the invention, a speed of movement of the feed platform is selected partially on the basis of the established animal identity.

In particular if the feed platform is designed as an at least substantially circular one, it is advantageous if the animal is allowed access to the feed platform over an angle greater than 90°.

In particular if the feed platform comprises several feeding places, it is further advantageous if the feed platform is designed in such a way that the animal boarding the feed platform is able to walk freely to any feeding place.

In an embodiment of a method according to the invention, the method comprises the step of supplying a sort of feed to a feeding place.

A simple method is obtained if a uniform sort of feed is selected for all the animals. Such a sort of feed may be supplied for example when or immediately before the animal boards the platform.

In order to divert the animal from the milking, in an embodiment of a method according to the invention, it is advantageous if the supply of the sort of feed immediately precedes the milking of the animal. The sort of feed is preferably supplied when the animal is being milked.

A particularly favorable method according to the invention is characterized in that the sort of feed to be supplied is determined in dependence on the established identity of the animal. In this manner it is possible to provide an optimum feed consumption for an animal for obtaining an optimum milk yield.

In particular if the sort of feed is supplied during the span of time on the feed platform in which the animal is not milked, the animal will be put at ease, which will not only result in an increased milk yield, but also in a more animal-friendly method.

An embodiment of a method according to the invention is characterized in that different sorts of feed are supplied to the animal on the feed platform at different points of time. It is thus possible, for example, to supply roughage or ensilaged grass upon boarding the platform, to supply concentrate during or immediately before the milking, and subsequently to supply brewer's grains or the like in a resting zone after the milking.

In order to ensure that an animal is allowed to realize a sufficient feed consumption during its stay on the feed platform, an embodiment of a method according to the invention is characterized in that the speed of movement of the feed platform is selected partially on the basis of a feed consumption duration of an animal present on the feed platform.

BRIEF DESCRIPTION OF THE DRAWINGS

The invention will be explained hereinafter in further detail with reference to a number of exemplary embodiments shown in the drawings, in which:

FIG. 7b is a diagrammatic, perspective and partially cutaway view of a part of the locking feeding gate of FIG. 7a;

FIG. 8a is a diagrammatic front view of an embodiment of a feed trough of a platform of an assembly according to the invention;

FIG. 8b is a diagrammatic, partially cross-sectional side view of the feed trough of FIG. 8a;

FIG. 8c is a diagrammatic, perspective view of a guide structure for supporting feed troughs of a feed platform in an embodiment of an assembly according to the invention;

FIG. 8d is a diagrammatic, cross-sectional view of a feed trough in a weighing area in the embodiment according to FIG. 8c;

FIG. 8e is a diagrammatic, cross-sectional view of a feed trough that is supported by the guide structure in such a way that feed can slide from the feed trough;

FIG. 8f is a diagrammatic, cross-sectional view of a feed trough that is supported by the guide structure in such a way that the feed trough is inaccessible to an animal;

FIG. 10b is a diagrammatic, perspective view of a third embodiment of a deterring device of an assembly according to the invention;

FIG. 11a is a diagrammatic, partially cross-sectional view of a part of a first embodiment of a feeding system of an assembly according to the invention;

FIG. 11b is a diagrammatic, perspective view of the feeding system according to FIG. 11a;

FIG. 16b shows diagrammatically in side view the cleaning device as shown in FIG. 16a;

FIG. 22b shows diagrammatically in rear view the animal gripping robot of FIG. 22a with animal;

FIG. 22c shows diagrammatically in rear view the animal gripping robot of FIG. 22a without animal;

DESCRIPTION OF ILLUSTRATIVE EMBODIMENTS

Figure 1:
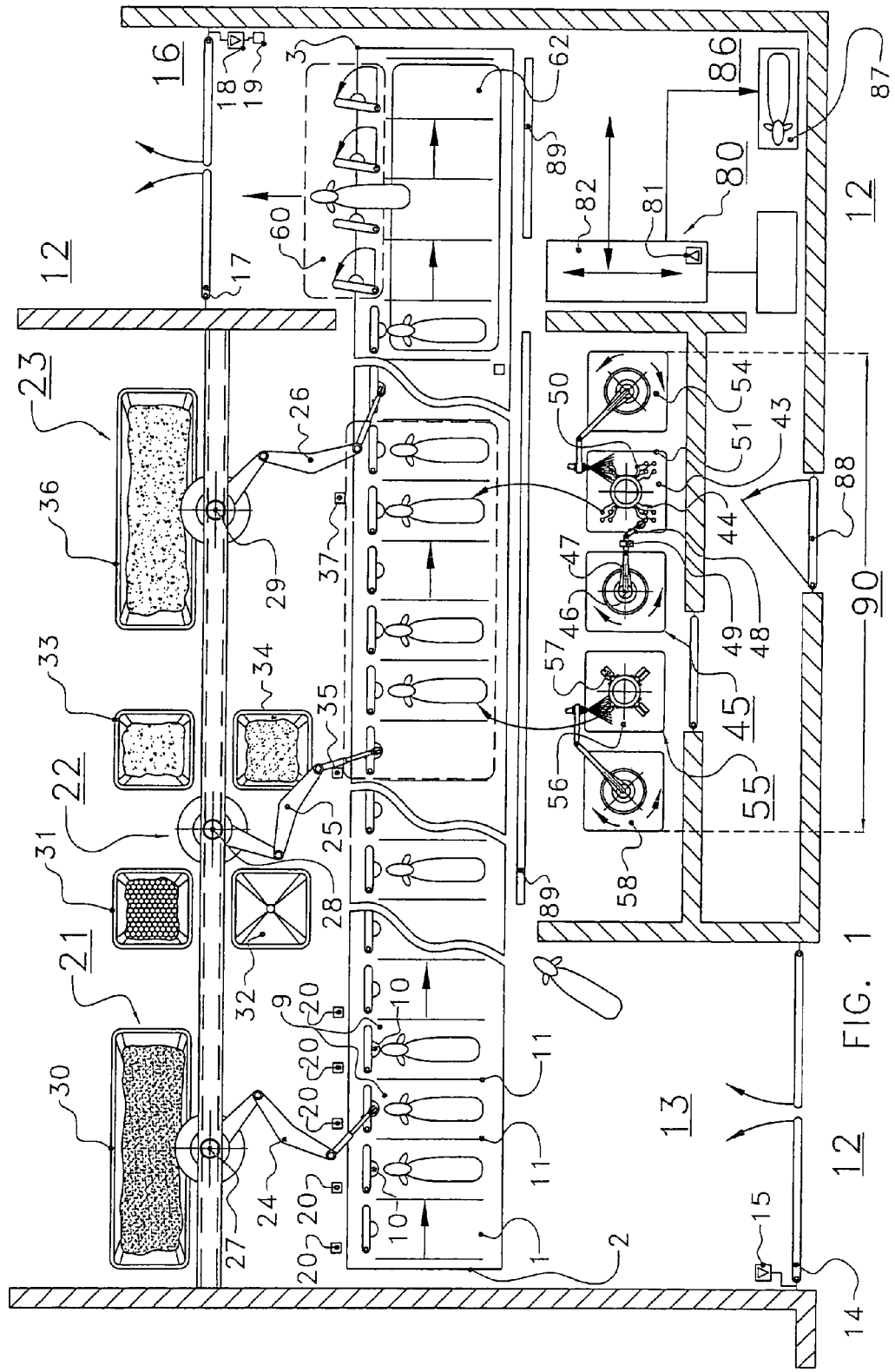
FIG. 1 is a diagrammatic plan view of a first embodiment of an assembly according to the invention, comprising a movable platform that constitutes a straight path and is provided with reversing rollers and with confining means for confining animals, the assembly having a wide entrance and exit that are adapted to be closed by a respective gate.
Figure 2:
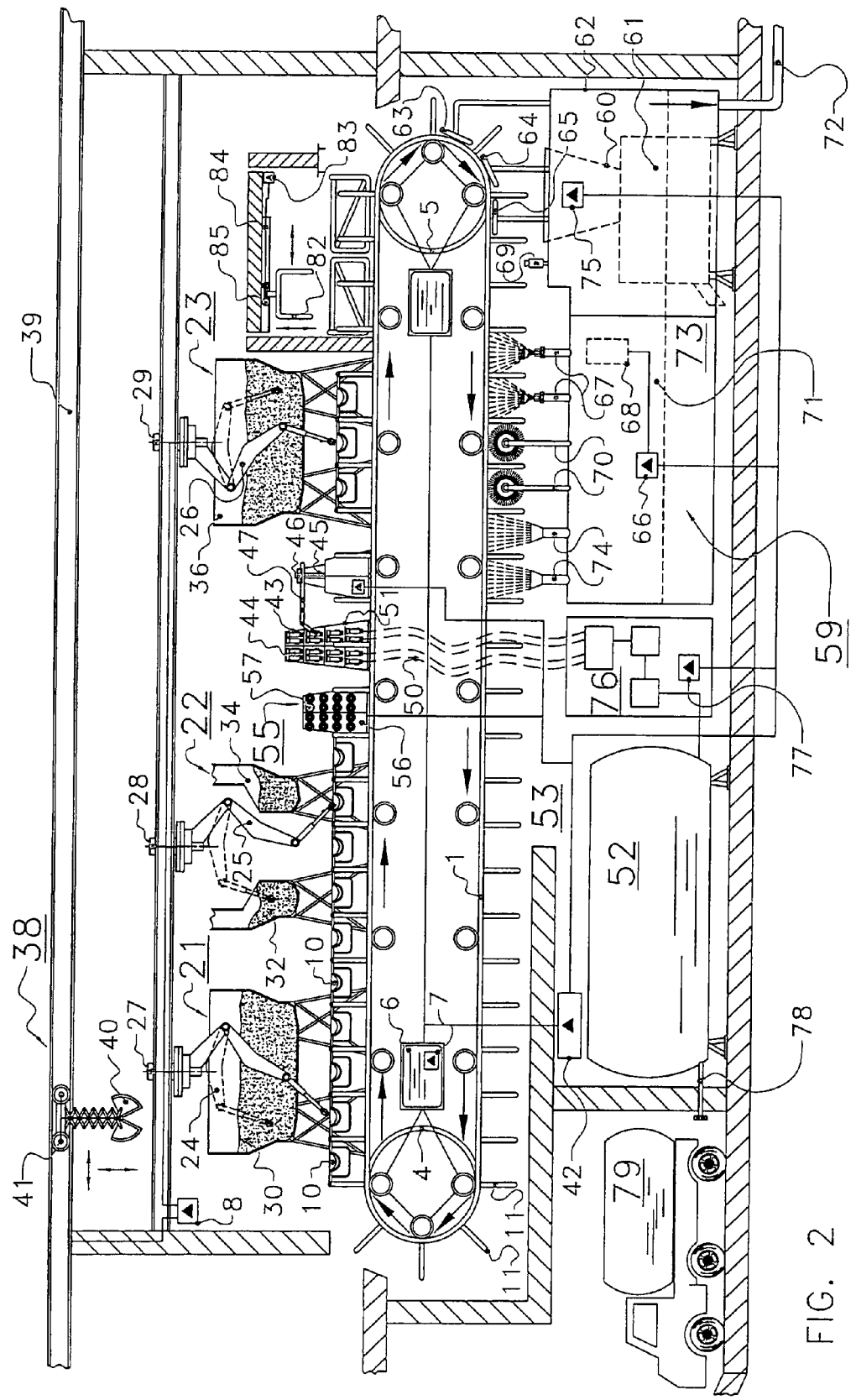
FIG. 2 is a diagrammatic, partially cross-sectional side view of the assembly of FIG. 1.

FIG. 1 shows diagrammatically in plan view and FIG. 2 shows diagrammatically in side view a first embodiment of an assembly for feeding and milking animals, such as for example goats or cows, according to the invention. The invention will be described hereinafter with reference to cows, although it is obvious that the invention is not limited thereto, but may also be applied to all other dairy animals.

In the first embodiment, the assembly comprises a feeding system with a movable feed platform 1. The movable platform 1 constitutes a straight path with an initial end 2 and a final end 3. As shown in FIG. 2, reversing rollers 4, 5 are disposed at the initial end 2 and at the final end 3, so that the movable platform 1 forms a closed path.

It will be obvious that the movable platform 1 may also assume other forms than a straight path. As will be described hereinafter with reference to other embodiments, the movable platform may be disc-shaped or annular. However, the movable platform may also assume a meandering form.

As shown in FIG. 2, there is provided a drive unit 6 for driving the movable feed platform 1. The driving may be performed in a manner known per se. Although the drive may be a continuous drive, it is advantageous if the drive unit 6 is controlled by a control unit 7. Said control unit 7 may be a separate control unit, but is preferably connectable to a feeding system control unit 8 that is connectable to other control units of the feeding system, as will be explained hereinafter in further detail. Such a connection may take place in a wireless manner with the aid of transmitters and receivers or by means of cables.

The feed platform 1 is provided with a number of feeding places 9. In the embodiment shown, the movable feed platform 1 is dimensioned in such a way that maximally 24 cows can be present simultaneously on the movable feed platform 1. However, it will be obvious that any other size will be possible as well.

Although a feeding place 9 does not need extra facilities for carrying feed—the feed may be disposed on the surface of the feed platform 1 itself—in the embodiment shown, each feeding place 9 comprises a feed trough 10 with an entrance opening for a cow. The feed trough 10 is arranged in such a way that the entrance opening is orientated transversely to the usual direction of movement of the feed platform 1, which direction of movement is indicated by means of arrows in FIGS. 1 and 2. Because of this arrangement, a cow standing in a feeding place 9 will be positioned at least substantially transversely to the usual direction of movement of the feed platform 1. It will be obvious that the feeding places 9 may also be arranged in such a way that cows boarding the feed platform 1 will assume an oblique position on the feed platform 1.

In the embodiment shown in FIGS. 1 and 2, the feeding places 9 are separated by confining means 11 for confining cows. The confining means 11 are disposed in such a way that each feeding place 9 can be occupied by only one cow.

Cows are able to reach the feed platform 1 from an area 12 where they are allowed to move freely. Such an area 12 may be a stable or a meadow. In the embodiment shown in FIGS. 1 and 2, an entrance 13 between the area 12 and the feed platform 1 is wide enough to enable simultaneous access of several cows to the feed platform 1. In the embodiment shown, the entrance 13 covers five feeding places 9, although a wider entrance will be possible as well. It is also pointed out that hereinafter embodiments will be described in which the entrance has such a width that cows are able to get access to the platform only one by one.

A closing device 14 is disposed between the area 12 where the cows are allowed to move freely and the entrance 13 to the feed platform 1. The closing device 14 is for example a gate that is adapted to be opened only in the direction towards the feed platform 1. In the embodiment shown, the closing device 14 is controlled by a control unit 15 that opens the closing device 14 for example periodically.

The cows are able to leave the feed platform 1 via an exit 16 located remotely from the entrance 13 and leading to the area 12 where the cows are allowed to move freely. Also in this case, the exit 16 is sufficiently wide to enable simultaneous exit of several cows to the area 12. In the embodiment shown, the width of the exit 16 is equal to four feeding places 9. A closing device 17 is disposed in the exit 16. The closing device 17 is for example a gate that is adapted to be opened only in the direction away from the feed platform 1. In the embodiment shown, the closing device 17 is controlled by a control unit 18 that opens the closing device 17 for example periodically. In addition to a periodic opening of the closing device 17, the control unit 18 is capable of controlling the closing device 17 with the aid of data from an animal-recognition unit 19 that is capable of detecting the presence of a cow between feed platform 1 and closing device 17.

As shown in FIG. 1, at the exit 16 the feed troughs 10 are moved in the direction away from the platform 1, so that the cows are stimulated to leave the feed platform 1. Since the cows are able to leave the feed platform 1 walking forwards, leaving the feed platform 1 takes place very efficiently. If desired, there may be provided additional removing means, such as a movable gate portion, a squirt of air or water or the like, for removing cows from the platform.

Beside the feed platform 1, between the entrance 13 and the exit 16, at the edge where the rear sides of the cows are located, there is disposed a back wall 89 or a gate or the like, so that it is impossible for the cows to leave the feed platform 1 backwards.

Although only one entrance and one exit are shown in the exemplary embodiment, it will be obvious that the feed platform 1 is dimensioned in such a way that several entrances and exits may be provided.

When a cow is present in a feeding place 9, she is confined by the feed trough 10, the confining means 11 and the back wall 89, but she is not locked or the like. It has been found that, owing to the fact that the cows are eating during at least the greater part of their stay on the feed platform 1, it is not problematic for them to stay in the feeding place 9 for a rather long time. It has been found that a rotational speed of the feed platform from approximately 0.05°/s to approximately 0.15°/s provides for a complete feed consumption for at least almost all the cows during their stay on the feed platform 1.

In the embodiment shown, the feeding system control unit 8 is provided with a memory for containing feed-consumption-duration data per cow. The feeding system control unit 8 controls the control unit 7 of the drive unit 6 with the aid of said feed-consumption-duration data. This makes it possible to adapt the speed of movement of the feed platform 1 to the cow having the fastest feed consumption, so that it may be expected that this cow, and consequently also the other cows, will be eating throughout their stay on the feed platform 1. In order to find out which cows are present on the feed platform 1, animal-recognition units 20 are disposed opposite the entrance 13 beside the feed platform 1. These animal-recognition units 20 and the animal-recognition unit 19 are connectable to the feeding system control unit 8 for supplying it with animal-recognition information.

In the embodiment shown in FIGS. 1 and 2, the feeding system comprises three feed supply stations 21, 22, 23 for supplying feed to a feeding place 9. It will be obvious that a feed supply station may also be suitable for supplying, in addition to feed, water or an other fluid, to a feeding place 9.

The feed supply stations 21, 22, 23 are arranged stationarily at the side of the movable feed platform 1 opposite the entrance 13. In the embodiment shown, each feed supply station 21, 22, 23 is provided with a conveying device in the form of a gripping arm 24, 25, 26 for conveying feed from one or more feed storage containers to a feeding place 9 (as will be explained hereinafter in further detail). A gripping arm 24, 25, 26 is rotatably mounted about an axis of rotation 27, 28, 29 extending substantially vertically. A gripping arm is further provided with arm portions that are pivotably interconnected.

The gripping arms 24, 25, 26 are controlled in a proper manner by the feeding system control unit 8 which, upon conveying feed, takes the drive unit 6 of the feed platform 1 into account, the drive of the gripping arm 24, 25, 26 being in particular such that the gripping arm 24, 25, 26 moves temporarily synchronously with the feed platform 1. It will be obvious that conveying means other than gripping arms may be used as well within the scope of the invention. A few alternative embodiments will be explained hereinafter in further detail. It is also possible to supply the feed manually to the feeding places 9.

The feed supply station 21 is disposed opposite the entrance 13 and comprises one feed storage container 30 for containing one sort of feed, such as roughage or other basic feed. The feeding system control unit 8 is capable of controlling the feed supply station 21 in such a way that in each feed trough 10 a minimum amount, for example 1 kg, of roughage is supplied. Consequently, each feeding place 9 will be equally interesting for a cow, and a cow will not be inclined to leave a feeding place because of the absence of feed. When a feeding place 9 appears to be occupied by a cow, as may be detected by the animal-recognition units 20, the feeding system control unit 8 will control the feed supply station 21 in such a way that a complete amount of roughage will be supplied to the feed trough 10. In order to be able to contain sufficient roughage, each feed trough 10 has a content of at least approximately 20 dm3.

In order to entice cows to the feed platform 1, in the embodiment shown, the feed platform 1 is the only device in the assembly where the cows can freely obtain feed (it is pointed out here that within the scope of the invention a meadow is not considered as a device for supplying feed).

The feed supply station 22 is suitable for supplying per cow a different amount and sort of feed, owing to the fact that it is provided with several feed storage containers 31, 32, 33, 34. In this case the feed supply station 22 is disposed immediately before a milking zone 90 (as described in what follows). Controlled by the feeding system control unit 8 and with the aid of data from the stationarily arranged animal-recognition unit 35, the feed supply station 22 is capable of supplying, immediately before the milking, an amount and sort of feed that differs per cow. To give the gripping arm 25 sufficient time to convey the desired sorts of feed, the animal-recognition unit 35 is disposed at a suitable distance before the milking zone 90. The feed storage containers 31, 32, 33 and 34 are disposed on a framework located around a central axis extending in line with the axis of rotation 28.

The feed supply station 23 is disposed immediately after the milking zone 90 and is, analogously to the feed supply station 21, provided with a single feed storage container 36 for containing for example roughage. An animal-recognition unit 37 is suitable for determining whether a feeding place 9 is occupied and sends signals to the feeding system control unit 8 for supplying roughage to an occupied feeding place 9.

The gripping arms 24, 25, 26 may be provided with sensors (not shown but known per se) or the like for weighing the amount of feed taken by the gripping arms 24, 25, 26. Each feed trough 10 may also be provided with a weighing device for weighing feed present in a feed trough 10. The weighing signals obtained may be supplied to the feeding system control unit 8. Some embodiments of a feed trough 10 with weighing device and other features will be described hereinafter with reference to further embodiments of an assembly according to the invention, but it will be obvious that those embodiments of a feed trough may also be applied in the embodiment as shown in FIGS. 1 and 2.

In the embodiment shown in FIG. 2, the feeding system is further provided with a provisioning system 38 for automatically provisioning the feed storage containers 31, 32, 33, 34, 36. The provisioning system 38 comprises a rail system 39 that is suspended above the feed platform 1 and comprises at least one feed gripper 40 that is driven in a controlled manner. The feed gripper 40 is movable by means of wheels 41 along the rail system 39 to above the feed storage containers. Each feed storage container may be provided with a device for determining the contents of the feed storage container. Such a device may be a weighing device or a device for determining the height of the feed present in the feed storage container.

The latter device may be provided with ultrasonic sensors that are disposed for example on the feed gripper 40. Alternatively, a camera system for monitoring the feeding system, in particular the interior of a feed storage container, may be used, which camera system is provided with suitable picture-recognition equipment and is connectable to the feeding system control unit 8.

Upon detection that a feed storage container contains insufficient feed and consequently has to be replenished, the device for determining the contents of the feed storage container supplies a signal to the feeding system control unit 8 that causes the feed gripper 40 to move to non-shown storage bins, for example arranged outside the stable, where the feed gripper 40 grips an amount from the relevant storage bin and conveys it to the relevant feed storage container. Such a feed provisioning system may be a fully automatically operating system.

As shown in the embodiment of FIGS. 1 and 2, the assembly further comprises a milking system for automatically milking cows on the feed platform 1. It is pointed out here that the presence of a milking system does not necessarily mean that a cow has to be milked each time when she is present on the feed platform 1. For actually milking a cow may be used the animal-recognition unit 35 that recognizes a cow immediately before the milking zone 90. In a milking system control unit 42 may be included a milking criterion that determines when a cow is to be milked. Such a milking criterion may be for example a predetermined period that should have elapsed since the last milking of the relevant cow. Other criteria known per se may be applied as well within the scope of the invention. The milking system control unit 42 preferably controls all the milking related processes. In the embodiment shown, the milking system control unit 42 is separate from the feeding system control unit 8, but these control units may alternatively be interconnectable for mutual co-operation or be connectable to a central control unit.

The milking system as shown in FIGS. 1 and 2 is provided with a stationary teat cup carrier 43 arranged beside the feed platform 1 for carrying at least one set of teat cups 44. To set out clearly the position of the teat cup carrier 43, the latter is shown in FIG. 2 at the side of the feed platform 1 opposite its actual position. The same holds for the other milking related components. It will be obvious that, within the scope of the invention, other embodiments of teat cup carriers, some of which will be explained hereinafter in further detail, may be applied as well.

In this embodiment, no sets of teat cups at all are disposed on the feed platform 1 itself, so that the feed platform 1 is free from teat cups. In the embodiment shown, only eight sets of teat cups 44 are disposed separately from the feed platform 1, which is considerably less than the number of feeding places 9.

For connecting a set of teat cups 44 to the teats of a cow, the milking system is provided with a movable connection device 45 which, in the embodiment shown, comprises a robot arm 47 that is rotatable about an axis 46. The robot arm 47 has a gripping device 48 (FIG. 2) for gripping teat cups disposed on the teat cup carrier 43. In order to be able to connect the teat cups correctly to the teats of a cow, in the embodiment shown, a teat position determining device 49 (FIG. 2) for determining the position of a teat of a cow is disposed on the robot arm 47. Such a teat position determining device 49 is known per se and may be provided with one or more lasers, ultrasonic sensors, camera with picture-recognition software and the like. It will be obvious that, within the scope of the invention, also teat position determining devices may be applied that are not disposed on the robot arm 47, but on other components of the assembly, it also being possible that the teat position determining device is a separate unit that is arranged stationarily or movably beside or on the feed platform 1.

The teat cup carrier 43 comprises a common, cylindrical support 51 for the sets of teat cups 44. It is pointed out here that, within the scope of the invention, cylindrical is not limited to a shape having a uniform round cross-section, but that other cross-sectional shapes, possibly varying in size, may be applied in the invention as well.

Each set of teat cups 44 is connected to a teat cup line 50 that extends towards an inner side of the cylindrical support 51. In the embodiment shown, the teat cup lines 50 extend to a milk tank 52 (FIG. 2) disposed in a cellar space 53 below the feed platform 1. It will be obvious that the milk tank 52 may be located alternatively in another place, for example at equal level with the feed platform 1. The teat cup lines 50 may also be connected to and debouch into a common discharge line for discharging milk, which discharge line leads to the milk tank 52 and is preferably disposed inside the cylindrical support 51.

Although, for the sake of simplicity of the drawing, not shown in FIGS. 1 and 2, a milking vacuum source, a pulsation vacuum source and a measuring device for measuring milk parameters are disposed inside the cylindrical support 51. Owing to the fact that these sources are disposed close to the teat cups, an energy-saving assembly is obtained. The measuring device, which preferably comprises a measuring unit per set of teat cups 44 and most advantageously comprises a measuring unit per teat cup, may ensure that milk already yielded at an early stage and not meeting the desired requirements is conveyed in such a way that it does not get into the milk tank 52.

The functioning of the assembly may be set optionally on intermittent movement or on continuous movement of the feed platform 1. If the feed platform 1 is driven intermittently by the drive unit 6 under the control of the control unit 7, it may be ensured that the feed platform 1 is immobile at the moment of connecting the teat cups. It is thus possible to move the movable robot arm 47 in a simple manner for the connection of the teat cups. If the feed platform 1 is moved continuously, the drive of the movable robot arm 47 is capable of being synchronized with the drive unit 6 of the feed platform 1. For this purpose, the feeding system control unit 8 and the milking system control unit 42 are interconnectable.

There is provided a teat cup cleaning device 54 (FIG. 2) for cleaning teat cups. In the embodiment shown, the teat cup cleaning device 54 is constituted by a robot arm which is rotatable about an axis and which is provided at its end with a spraying device. It will be obvious that, within the scope of the invention, other devices, known per se, for cleaning teat cups may be applied. The assembly is analogously provided with a (non-shown) cleaning device for cleaning the further milking means, such as for example the milk tank, teat cup lines and the like.

The embodiment of the assembly as shown in FIGS. 1 and 2 is provided with a milking pre-treatment device 55 for performing a milking pre-treatment on a cow on the feed platform 1. The milking pre-treatment device 55 has a stationary, cylindrical pre-treatment tool carrier 56 for carrying a pre-treatment tool 57, in this case constituted by eight pairs of brushes. The milking system control unit 42 controls the functioning of the milking pre-treatment device 55.

In the embodiment shown, the connection device 45 for connecting the teat cups to the teats of a cow is also used for gripping a pair of brushes and for bringing the pair of brushes into contact with a teat of a cow. In this case the teat position determining device 49 for determining the position of a teat of a cow is advantageously used. In the milking pre-treatment device 55, the movable robot arm 47 is thus used as a movable contacting device for gripping a brush and bringing a pair of brushes into contact with the teats of a cow.

In the embodiment shown, each pair of brushes 57 is provided with a (non-shown) spraying device for spraying and/or squirting a fluid on the teat. The spraying device is connected to a fluid source via a fluid line that extends towards an inner side of the brush carrier.

It will be obvious that, within the scope of the invention, other pre-treatment devices, known per se, may be used.

As clearly shown in FIG. 1, the assembly comprises a cleaning device 58 for cleaning the pairs of brushes. In this embodiment, said cleaning device 58 is analogous to the teat cup cleaning device 54.

In the embodiment shown, the assembly is also provided with a milking post-treatment device for performing a milking post-treatment on a teat of a cow on the feed platform 1. In the embodiment shown, the milking post-treatment device is constituted by the teat cup cleaning device 54, the spraying device for the post-treatment being connectable to another fluid, for example a disinfecting fluid. In order to direct the spraying device correctly to the teat of a cow, the robot arm carrying the spraying device may be provided with a teat position determining device. The milking system control unit 42 controls the functioning of the milking post-treatment device. It will be obvious that, within the scope of the invention, other milking post-treatment devices may be applied as well. There may be applied for example a milking post-treatment device which, analogously to the milking pre-treatment device 55, is provided with pairs of brushes possibly comprising a spraying device.

As is in particular apparent from FIG. 2, the assembly is provided with a cleaning device 59 for cleaning the feed platform 1. Said platform cleaning device 59 is arranged stationarily in the cellar space 53 below the feed platform 1 and is located, viewed in the direction of movement of the feed platform 1, between the exit 16 and the entrance 13.

When the feed platform 1 rotates downwards at the reversing roller 5, material will fall down from the feed platform 1. In a suitable place below the feed troughs 10 there is arranged a feed receptacle 60 for collecting feed falling from the feed troughs 10. The feed receptacle 60 is provided with a device 61 for mixing and crushing the collected feed. This processed feed may be reused, if desired.

Contamination occurs in particular on the part of the feed platform 1 that is located at the rear side of the cows. In a suitable place below this part of the feed platform 1 there is arranged a manure receptacle 62 for collecting manure and other impurities falling from the feed platform 1. The manure receptacle 62 is provided with a manure analysing device 75 for analysing manure, which manure analysing device 75 transfers the analysis results to the milking system control unit 42.

In the embodiment shown, the cleaning device 59 further comprises three manure slides 63, 64, 65 for removing manure and the like from the surface of the feed platform 1. The manure slides 63, 64, 65 may be arranged stationarily. In this case the confining means 11 have such a shape that the confining means 11 and the manure slides 63, 64, 65 do not hinder each other. The manure slides 63, 64, 65 are each arranged under an angle relative to the usual direction of movement of the feed platform 1. It will be obvious that a number of manure slides other than three may be used within the scope of the invention. Moreover, there may also be used movable manure slides, the movement being performed preferably in the direction away from the feed troughs 10. Such a movement may be controlled with the aid of a cleaning control unit 66. Said cleaning control unit 66 is connected to the milking system control unit 42. This makes it possible for example to perform a specific cleaning when the milking system control unit 42 receives information from a measuring device for the milk parameters that a particular cow is ill. Of course, the cleaning control unit 66 also controls the other components of the device 59, so that an automatic cleaning device 59 can be obtained.

Viewed in the direction of movement of the feed platform 1, in the embodiment of the assembly according to the invention shown in FIG. 2, the cleaning device 59 is provided, after the manure slides 63, 64, 65, with two high-pressure sprayers 67 for squirting a fluid on the feed platform 1. By way of fluid may be used water, complemented, if desired, with the usual detergents, cleansing agents and/or disinfecting means. There is provided a heating element 68 for heating the fluid. The heating element 68 is controlled by the cleaning control unit 66 and is capable of heating the water to maximally approximately 95° C. for obtaining a better cleaning. In the embodiment shown, the high-pressure sprayers 67 comprise rows of spray nozzles that are arranged stationarily over the width of the feed platform 1 in such a way that they squirt the fluid under an angle in a direction away from the feed trough 10. It will be obvious that different numbers and sorts of sprayers for spraying and/or squirting may be applied as well within the scope of the invention. It is also possible to use a row of spray nozzles that is movable in a direction away from the feed troughs 10.

The cleaning device 59 is additionally provided with a device 69 for determining the degree of contamination of the platform 1, such as for example a camera. The camera 69 supplies contamination signals to the cleaning control unit 66, which is capable of activating the sprayers 67 in such a way that the places having the highest degree of contamination will be sprayed most thoroughly.

Viewed in the direction of movement of the feed platform 1, in the embodiment of the assembly according to the invention shown in FIG. 2, the cleaning device 59 is provided, after the sprayers 67, with two rotatable cleaning brushes 70. The cleaning brushes 70 are arranged stationarily and extend over almost the entire width of the feed platform 1. Alternatively, the cleaning brushes 70 may be designed as movable ones, the movement being preferably controlled by the cleaning control unit 66. It will be obvious that any other number than the number of cleaning brushes shown in the drawing may be applied within the scope of the invention. Moreover, in a non-shown embodiment, cleaning brushes and sprayers may alternate.

The impurities with the spraying fluid will, of course, fall down from the feed platform 1 by gravitational force. These impurities are collected in a storage container 71 for impurities, which is disposed below the feed platform 1, and are discharged via an outlet 72. A purification device 73 for at least partially purifying the fluid/impurities mixture is integrated in the storage container 71 for impurities. Such a purification device is generally known and will not be described here in further detail. Said purification device 73 may be used for making the fluid suitable for reuse.

Viewed in the direction of movement of the feed platform 1, in the embodiment of the assembly according to the invention shown in FIG. 2, the cleaning device 59 is provided, after the cleaning brushes 70, with a drying device 74 for drying the feed platform 1. The drying device 74 comprises blow nozzles for blowing air under pressure on the feed platform 1, which air may have been heated, if desired, under the control of the cleaning control unit 66 for accelerating the drying process. In the embodiment shown, the drying device 74 comprises stationary rows of blow nozzles that are arranged over almost the entire width of the feed platform 1. In a non-shown alternative embodiment, the drying device may comprise a row of blow nozzles that is movable across the feed platform 1 in the direction away from the feed troughs 10.

As described in the foregoing, in the embodiment shown, the teat cup lines 50 extend to the milk tank 52 (FIG. 2) disposed in the cellar space 53 below the feed platform 1. In the embodiment shown, the assembly comprises a cooling unit 76 for cooling the milk obtained before it is conveyed to the milk tank 52. The cooling unit 76 is controlled by a cooling control unit 77 that is connected to the milking system control unit 42.

When the milk tank 52 has to be emptied, this may take place in a customary manner by means of a milk tank outlet 78 that extends in the embodiment shown to outside the cellar space 53, so that exhaust gases of a milk tank truck 79 do not get into the cellar space 53.

In the embodiment shown in FIGS. 1 and 2, the assembly is provided with a separation device 80 for separating a cow standing on the platform 1 and for leading the separated cow away from the platform 1. It is pointed out that in FIG. 2, for the sake of clearness, the separation device 80 is shown mirrorwise relative to the feed platform 1 in comparison with its actual position. The separation device 80 is an automatic separation device that is controlled by a separation control unit 81. The separation device 80 comprises a cage 82 and a displacing device comprising in the embodiment shown a motor 83 as a drive unit and a rail system 84 for placing the cage 82 over a cow. The cage 82 is suspended above the feed platform 1 by means of a suspension structure comprising wheels 85. The rail system 84 is arranged in such a way that the cage 82 is capable of being displaced both transversely to the usual direction of movement of the feed platform 1 and along with the usual direction of movement of the feed platform 1.

For a correct displacement of the cage 82, the motor 83 is capable of being driven synchronously with the drive unit 6 of the feed platform 1 by means of the separation control unit 81.

A transmitter/receiver installation is integrated in the separation control unit 81 and serves for remotely receiving separation commands and for transmitting a message that a particular cow has been separated. This makes it possible for a farmer to order remotely that a particular cow is to be separated and subsequently to receive a message when that cow has actually been separated. After having been separated, a cow will stay in the separation area 86 until she will be removed by a farmer. The farmer may perform a particular treatment on the cow in this separation area 86. It is possible, of course, that the separation is controlled automatically for example by the central control unit for determining periodically the weight of a cow. For this purpose, the separation area 86 is provided with a weighing device 87 for weighing the cow. After the weighing, the central control unit is capable of allowing the cow exit from the separation area 86 by opening a gate 88.

Hereinafter the functioning of the embodiment of the assembly as shown in FIGS. 1 and 2 will be described briefly.

The control unit 15 opens the closing device 14 every 9 minutes and closes it when maximally 5 cows have been counted by a (non-shown) counting device, or when a particular threshold time, such as for example 1 minute, has elapsed. The counting device may be constituted for example by a camera with suitable software. Hereafter the cows present in the entrance 13 are able to board the, in principle continuously, moving feed platform 1. Each feed trough 10 contains a minimum amount of basic feed and, when a cow is detected at a feed trough 10 by an animal-recognition unit 20, the first feed supply station 21 is controlled in such a way that a complete portion of basic feed is supplied to the feed trough 10.

When a cow present on the feed platform 1 leaves the entrance zone 13 by the movement of the feed platform 1, she will be confined at her rear side by the back wall 89. As indicated by the interrupted lines, a cow spends on the feed platform 1 a certain span of time in which she is able to consume the basic feed until she reaches the milking zone 90. In this span of time the cow is not milked. In the embodiment shown, this span of time amounts to approximately 10 minutes, which is comparable in order of magnitude to the average milking period. However, it will be obvious that within the scope of the invention spans of time having other magnitudes may be applied as well, the span of time having a magnitude that amounts to at least approximately half the milking period and maximally approximately five times the milking period.

In the embodiment shown, the magnitude of the span of time is selected in dependence on the identity of the cow, so that she may be expected to be able to consume the complete amount of basic feed. Consequently, the feeding system control unit 8 controls the drive unit 6 of the feed platform 1 in such a way that the cow having the longest feed-consumption-duration, as recorded in a memory in the feeding system control unit 8, will have sufficient time to consume feed. The drive unit 6 is thus capable of decelerating or accelerating the speed of movement of the feed platform 1. It is possible, if desired, by determining the weight of the feed trough 10 immediately before reaching the milking zone 90, to stop the drive unit 6 of the feed platform 1 under the control of the feeding system control unit 8, which receives weight determination data, to ensure that the cow will consume the remaining feed.

When the cow reaches the milking zone 90, it is decided on the basis of the milking criterion whether or not the cow is to be milked. When a cow is eligible for milking, the feed supply station 22 supplies concentrate attuned to that particular cow and the teats of the cow are first cleaned, massaged and stimulated with the aid of the brushes with sprayers. Hereafter, the teat cups 44 that are disposed separately from the feed platform 1 are connected automatically. After a cow has been milked out sufficiently, the teat cups are disconnected automatically and the teats are post-treated by disinfecting them with a spray. The total milking time, including pre-treatment and post-treatment, amounts to approximately 8 to 15 minutes in dependence on the cow. When a cow needs not to be milked, the feed supply station 22 supplies an amount of basic feed to the feed trough 10.

After the post-treatment has been finished, the feed supply station 23 supplies again basic feed to the cow. As indicated by the interrupted lines, the cow spends on the feed platform 1 a certain second span of time in which she is able to consume the basic feed until she reaches the exit 16. In this span of time the cow is not milked. In the embodiment shown, the span of time is selected in such a way (for example by properly selecting the length of the feed platform 1) that the orifices of the teats of the cow will be closed when the cow reaches the exit 16. In the embodiment shown, for this second span of time a duration of approximately 20 minutes is selected. In this second resting zone there may be performed, if desired, a leg-treatment or a back-brushing of the cow. When a cow reaches the exit 16, the feed trough 10 is moved in the direction away from the feed platform 1 and the cow leaves the feed platform 1. The total time the cow has spent on the feed platform 1 amounts to approximately 40 minutes.

It will be obvious that, in addition to a continuous movement, an intermittent movement of the feed platform may be applied as well within the scope of the invention.

Figure 3:
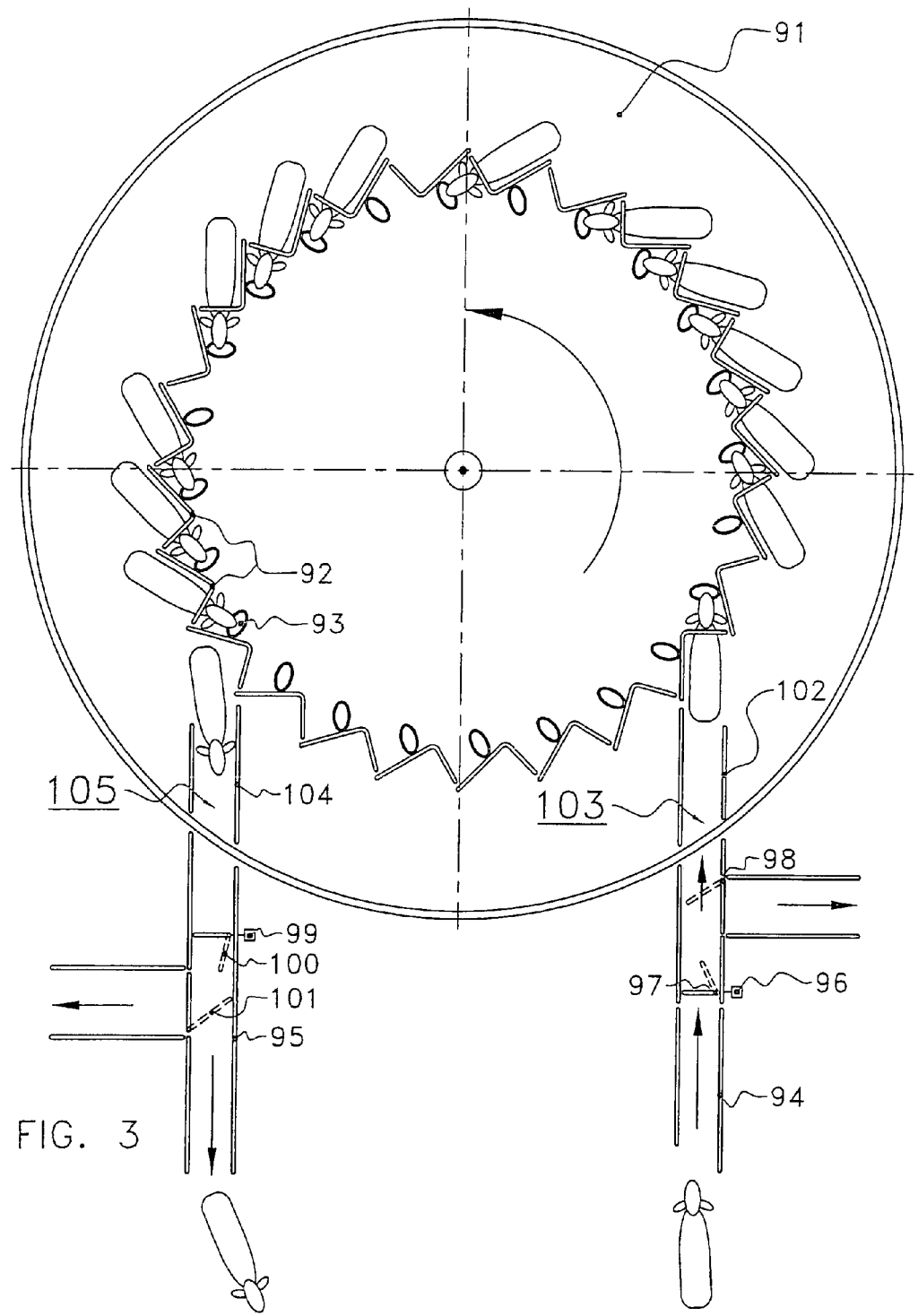
FIG. 3 is a diagrammatic plan view of a second embodiment of an assembly according to the invention, comprising a movable, substantially disc-shaped platform, the platform being provided with separation means for partially separating animals, the assembly having an entrance and an exit for only one animal, which are adapted to be closed by a respective gate, the animals standing on the platform under an angle relative to the radial.

FIG. 3 is a diagrammatic plan view of a part of a second embodiment of an assembly according to the invention. In this embodiment, the movable feed platform 91 is substantially disc-shaped. The feed platform 91 is provided with separation means 92 for partially separating cows. The separation means 92 adjoin a cow only on one side, so that a cow is not confined by the separation means 92. The feed platform 91 comprises feeding places, each having a feed trough 93 that is arranged in such a way that a cow is standing on the feed platform 91 under an angle with the radial. Owing to this, rotation of the shown feed platform 91 is only possible in one direction.

Via an entrance 94 and an exit 95 the cows are able to board or to debark from the feed platform 91 only one by one. At the entrance 94 there is arranged an animal-recognition device 96 by means of which the identity of a cow in the entrance 94 can be determined. An assembly of two gates 97, 98 may be controlled by means of a feeding system control unit (not shown in the drawing) in such a way that a cow will possibly leave the entrance 94 sidewards without having boarded the feed platform 91.

Analogously, in the exit 95 there is disposed an assembly of two gates 100, 101, controlled by an animal-recognition device 99, for separating cows.

Although not shown in FIG. 3, all components of the feeding system (feed storage and the like) and the milking system (teat cups and the like) are located beside the edge of the feed platform 91 that is free from teat cups. Between the exit 95 and the entrance 94 there may be arranged a cleaning device, as will be described hereinafter.

Since the feed platform 91 is provided with separation means 92 that adjoin a cow only partially, a cow is able to walk freely to any feed trough 93 upon boarding the feed platform 91. It has been found that a cow usually chooses the most nearby feed trough 93. In the embodiment shown, however, there is disposed a deterring device 102 for deterring a cow in order to prevent a cow from moving freely across the feed platform 91. In the embodiment shown, the deterring device 102 is constituted by guiding gates that are disposed stationarily, relative to the entrance 94, above the feed platform 91. A cow is thus prevented from crossing the transition of the feed platform portion 103 that is adjacent to the entrance 94 at the ends of the platform portion 103 in the direction of rotation of the feed platform 91 or in opposite direction. Analogously, there is provided such a deterring device 104 at the platform portion 105 that is adjacent to the exit 95.

Figure 4:
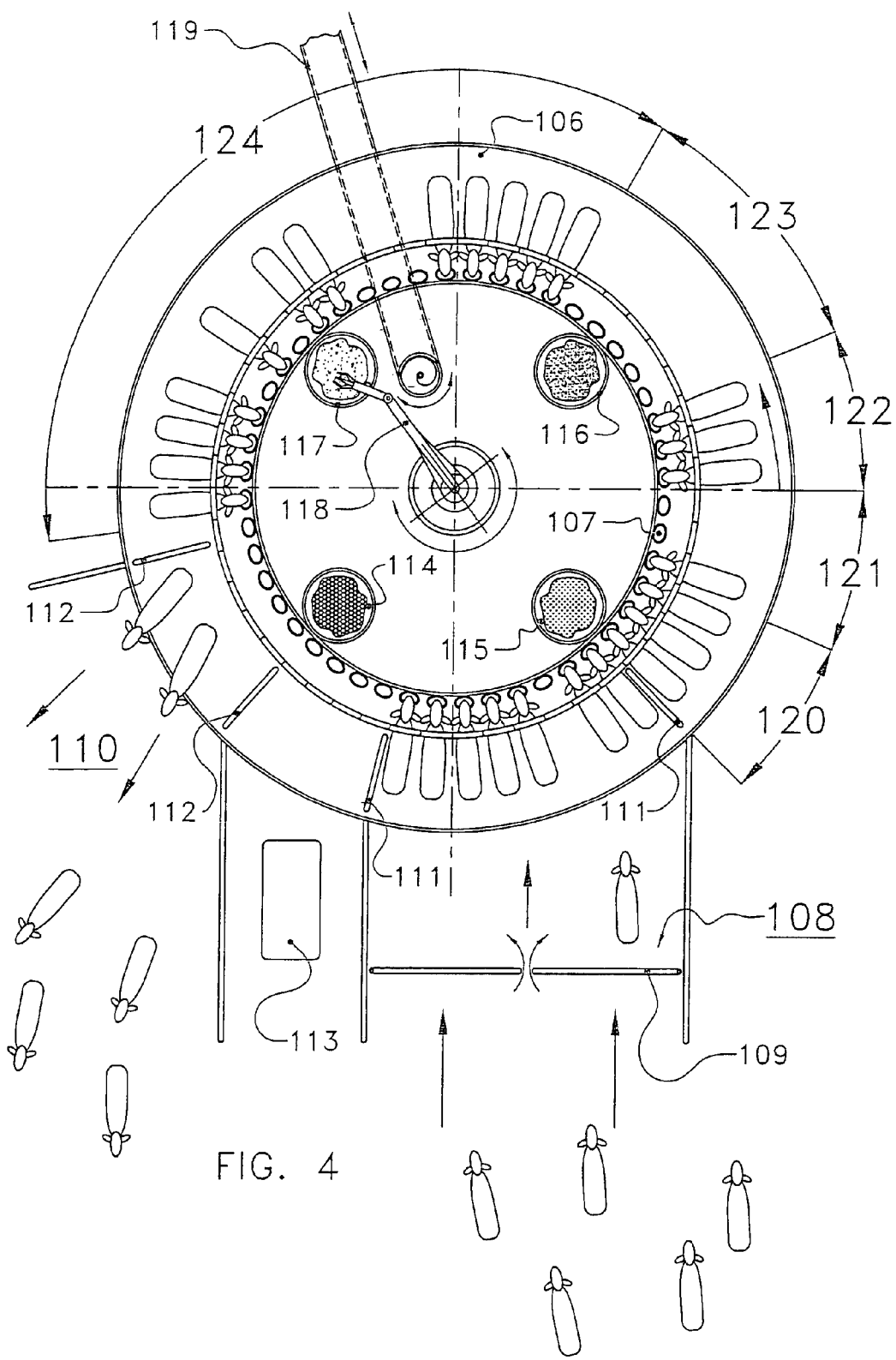
FIG. 4 is a diagrammatic plan view of a third embodiment of an assembly according to the invention, comprising a movable, substantially annular platform, the platform being free from confining means for confining animals and free from separation means for separating animals, the assembly having an entrance and an exit for several animals, the entrance being adapted to be closed by a respective gate, the exit being free from a gate, and the animals standing radially on the platform.

FIG. 4 is a diagrammatic plan view of a part of a third embodiment of an assembly according to the invention. In this case the movable feed platform 106 is substantially annular. The feed platform 106 has a number of feeding places, each provided with its own feed trough 107 that is disposed in such a way that cows, when eating from the feed trough 107, are standing substantially radially on the feed platform 106.

Analogously to the embodiment according to FIG. 1, the embodiment according to FIG. 4 has an entrance 108 that is sufficiently wide to enable simultaneous access of several cows to the feed platform 106. The entrance 108 is adapted to be closed by a gate 109, which is under the control of a non-shown control unit.

The exit 110 also has a width that suffices to enable simultaneous exit of several cows from the feed platform 106. In contrast with the entrance 108, the exit 110 is free from a closing device, so that cows are able to leave freely the feed platform 106.

The feed platform 106 is free from confining means for confining cows, so that the cows are able to walk freely to one of the feed troughs 107 via the entrance 108. Analogously to the embodiment of FIG. 3, there is provided a deterring device 111, 112 to prevent cows from crossing freely the transition of the platform portion adjacent to the entrance, respectively the exit.

Between the exit 110 and the entrance 108, there is arranged a cleaning device 113 (to be described hereinafter) for the feed platform 106.

In the embodiment shown, inside the annular feed platform 106 four feed storage containers 114, 115, 116, 117 are arranged stationarily. A rotatable feed gripping arm 118 is controlled by a (non-shown) feeding system control unit to convey feed from one (or more) of the feed storage containers 114, 115, 116, 117 to a feed trough 107. The feed storage containers 114, 115, 116, 117 are provided with feed via a provisioning system 119 that extends above the feed platform 106.

When a cow has boarded the feed platform 106, she will successively pass through the following zones, which are shown in FIG. 4 at the outer edge of the annular feed platform 106: a brushing zone 120, a feeding zone 121, a milking pre-treatment zone 122, a main milking zone 123, and a feeding zone 124. Analogously to the embodiment as described with reference to FIGS. 1 and 2, the feed gripping arm 118 conveys a particular minimum amount of feed to the feed troughs 107 before the feed troughs become accessible via the entrance 108. It is detected by (non-shown) animal-recognition units whether a cow is present at a particular feed trough 107 and, if this is the case, a complete amount of feed is supplied to the relevant feed trough 107.

After the entrance zone a cow enters the brushing zone 120 where the back of the cow is brushed by a (non-shown) cow brush, in order to make the cow feel at ease. Then the cow enters a feeding zone 121 where no treatment is performed on the cow and where she can eat quietly. The teats of a cow are cleaned in the milking pre-treatment zone 122, analogously to the embodiment according to FIGS. 1 and 2, then the teat cups are connected in the main milking zone 123, after which the milking can take place. In this embodiment, no milking post-treatment takes place and, therefore, the milking of a cow consists of the milking pre-treatment and the main milking. Also in this case the teat cups are not located on the feed platform 106, but are arranged beside the outer edge of the feed platform 106.

The feeding zone 124 is dimensioned in such a way that the orifices of the teats of a cow will close, and in this embodiment no treatment is performed on the cow in said zone. In said feeding zone 124 the cow can eat quietly, after which she can leave the feed platform 106 via the exit 110.

Figure 5:
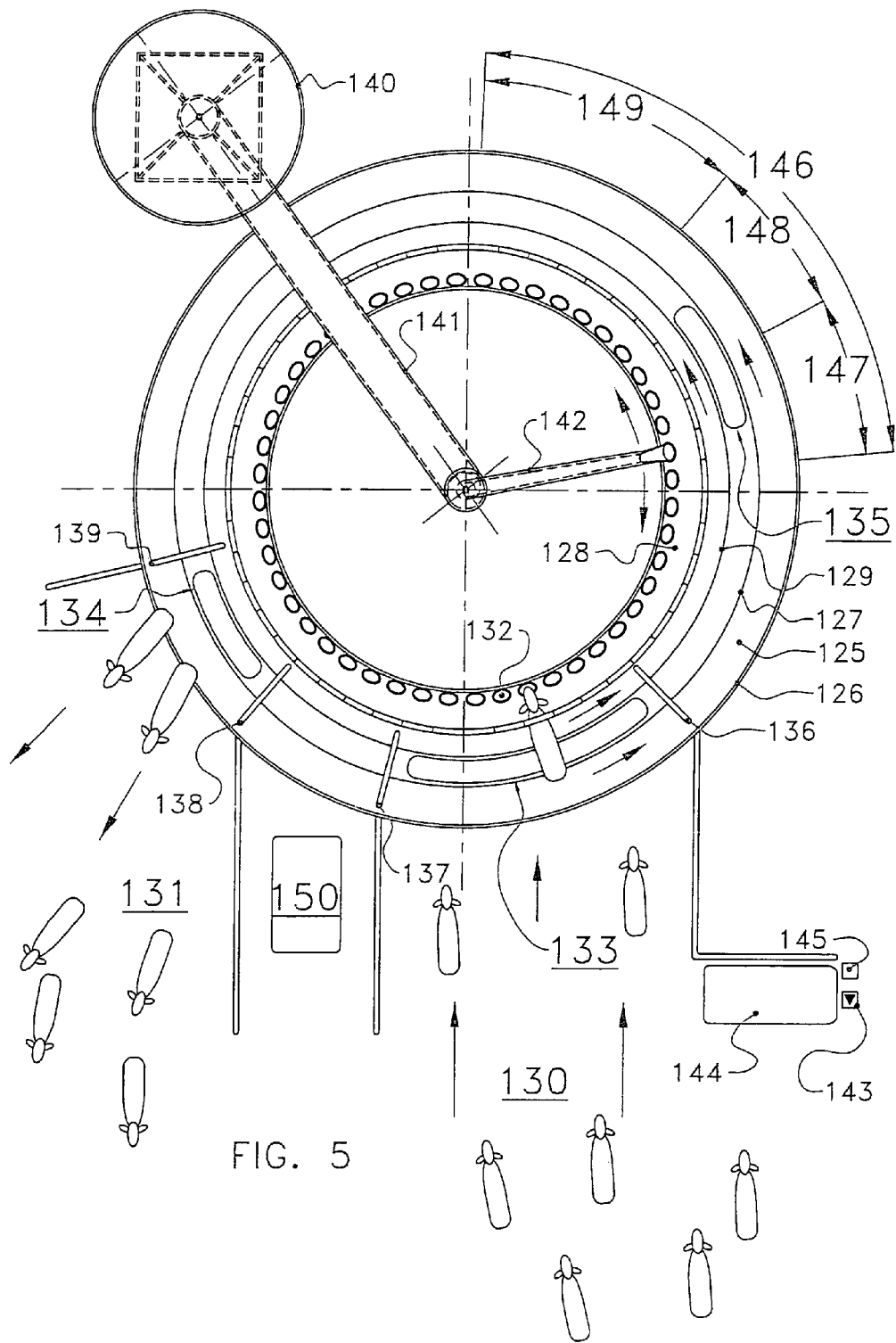
FIG. 5 is a diagrammatic plan view of a fourth embodiment of an assembly according to the invention, comprising a movable platform that comprises two annular platform units, the platform being free from confining means for confining animals, the assembly having an entrance and an exit for several animals, which are free from a closing device, and the animals standing radially on the platform.

FIG. 5 is a diagrammatic plan view of a part of a fourth embodiment of an assembly according to the invention. The movable feed platform comprises an outer annular platform unit 125 having an edge 126 located on the outer side and having an inner edge 127, and an inner platform unit 128 having an outer edge 129 that is located at some distance from the inner edge 127 of the outer platform unit 125. The feed platform is arranged in such a way that, when a cow is eating at a feeding place, her front legs are standing on the inner platform unit 128 and her hind legs are standing on the outer platform unit 125. The outer platform unit 125 and the inner platform unit 128 are synchronously rotatable. Although the inner platform unit 128 is annular in this embodiment, it will be obvious that in an alternative, non-shown embodiment the inner platform unit may also be designed as a disc-shaped one. Owing to the fact that the outer platform unit 125 and the inner platform unit 128 are disposed remotely from each other, it is possible to dispose components of in particular the milking system between the platform units 125, 128, as will be explained hereinafter in further detail. Other devices, such as for example a leg-treatment device, may also be arranged between the platform units 125, 128.

Analogously to the embodiment of FIG. 4, the feed platform 125, 128 as shown in FIG. 5 is free from confining means for confining cows, although this embodiment of the invention may also be applied with confining means being provided. In this embodiment the assembly has an entrance 130 respectively an exit 131 that are both sufficiently wide to allow simultaneous access respectively exit of several cows. Both the entrance 130 and the exit 131 are free from a closing device, such as a gate, so that the cows are allowed freely to board and to debark from the feed platform 125, 128. The feeding places 132 on the feed platform are arranged in such a way that the cows are standing at least substantially radially on the feed platform during eating.

In the embodiment shown in FIG. 5, the assembly is provided with a first bridging element 133 for forming a bridge between the outer platform unit 125 and the inner platform unit 128, which first bridging element 133 is arranged at the entrance 130. A second bridging element 134 is arranged at the exit 131. The bridging elements 133, 134 ensure that a cow can normally board and debark from the feed platform. Outside the entrance 130 and the exit 131, between the platform units, there may be arranged a screen declining towards the outer edge 129, so that impurities, if any, will not fall between the feed platform units 125, 128.

In the embodiment shown in FIG. 5, there is provided a third bridging element 135, which functions as a support for an autonomous teat cup connecting robot to be described hereinafter.

Also in this embodiment, the assembly is provided with deterring devices 136, 137, 138, 139 preventing cows from walking on the platform beyond the entrance and the exit when boarding the feed platform and debarking from the feed platform.

In the embodiment as shown in FIG. 5, only one sort of feed is supplied on the feed platform. For this purpose, there is provided a silo 140 as a feed storage container, and a conveyor 141 whose end 142 is rotatable in order to supply feed to feeding places 132 on the feed platform. In the embodiment shown, the feed platform 125, 128 is the only feeding area that is freely accessible to cows. The feeding system further comprises a feeding place 144, such as for example a feeding column, controlled by a control unit 143 which, with the aid of an animal-recognition unit 145, decides on whether or not admitting a cow to the controlled feeding place 144. Said controlled feeding place 144 is arranged separately from the feed platform and is used to supply additional feed to cows, and, if desired, to supply certain additives, such as medicines and the like, mixed with the feed, to particular cows.

Analogously to the embodiment as described with reference to FIG. 4, before reaching the milking zone 146 and after having left the milking zone 146, a cow has a span of time on the feed platform in which she is not milked and is able freely to consume feed. In the embodiment shown, the total span of time of these resting zones is approximately twice the time a cow spends in the milking zone 146. In this embodiment, the milking zone 146 is subdivided into a pre-treatment zone 147, a main milking zone 148 and a post-treatment zone 149 in which the teats of a cow are disinfected.

Between the exit 131 and the entrance 130 there is arranged an automatic cleaning device 150 for cleaning the feed platform, as will be explained hereinafter in further detail.

Figure 6:
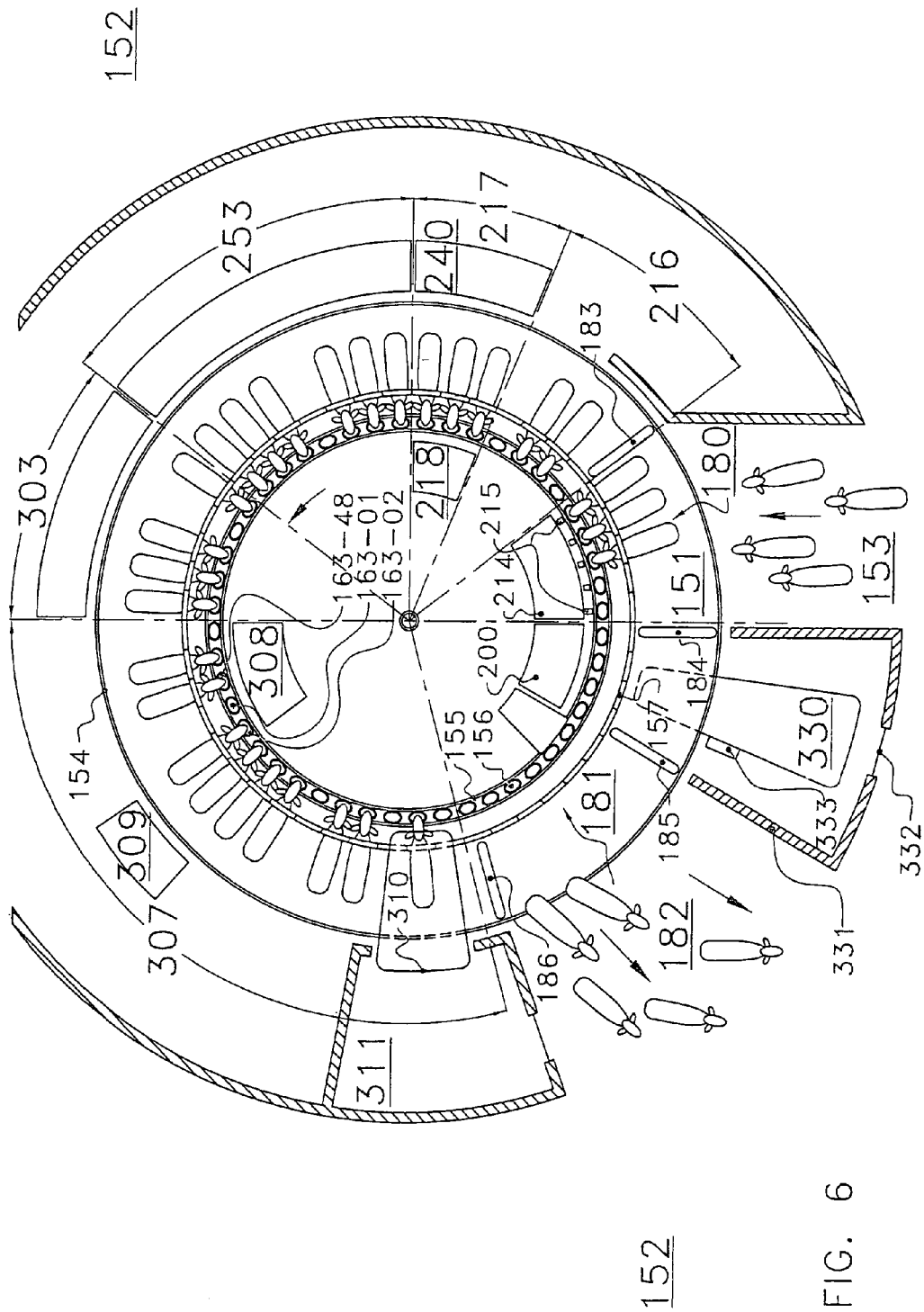
FIG. 6 is a diagrammatic plan view of a fifth embodiment of an assembly according to the invention, provided with a movable, substantially annular platform, the platform being free from confining means for confining animals, the assembly having an entrance and an exit for several animals, which are free from closing means, and the animals standing radially on the platform.

A fifth embodiment of an assembly according to the invention is shown diagrammatically in plan view in FIG. 6. In this embodiment, the movable feed platform 151 is annular and has an outer edge 154 and an inner edge 155. The feed platform 151 comprises feeding places 156 with feed troughs 163 located at the inner edge 155 of the feed platform 151. The feed platform 151 is free from confining means for confining cows.

In an area 152 the cows are allowed to move freely. Via an entrance 153 the cows are allowed to walk from the area 152 to the feed platform 151. The entrance 153 has a width that is sufficiently large to enable simultaneous access of several cows to the feed platform 151, and is free from a closing device. The feed platform 151 is free from sets of teat cups.

In the embodiment shown in FIG. 6 there is provided a locking feeding gate 157 for locking a cow at a feeding place 156. Although the locking feeding gate 157 may be a self-closing locking feeding gate known per se, the locking feeding gate 157 according to this embodiment is controlled by a locking control unit 158 (see FIG. 7b) for controlling the locking feeding gate 157. The locking function of the locking feeding gate 157 is capable of being activated and deactivated by the locking control unit 158. The locking control unit 158 obtains data from cameras 159 (see FIG. 7a) which detect whether a cow is eating at a feed trough 163. Alternatively, the locking control unit 158 may obtain information for activating the locking function from animal-recognition units which are disposed per feed trough 163 and which are capable of determining whether a cow is present at a feed trough 163. Furthermore, a weighing device for weighing feed in the feed trough, which weighing device is capable of supplying information about whether or not feed is consumed from a feed trough, may be applicable within the scope of the invention for supplying information to the locking control unit. It will be obvious that within the scope of the invention other forms of locking a cow at a feeding place may be applied as well, a neck-locking being in particular preferable for the purpose.

Figure 7A:
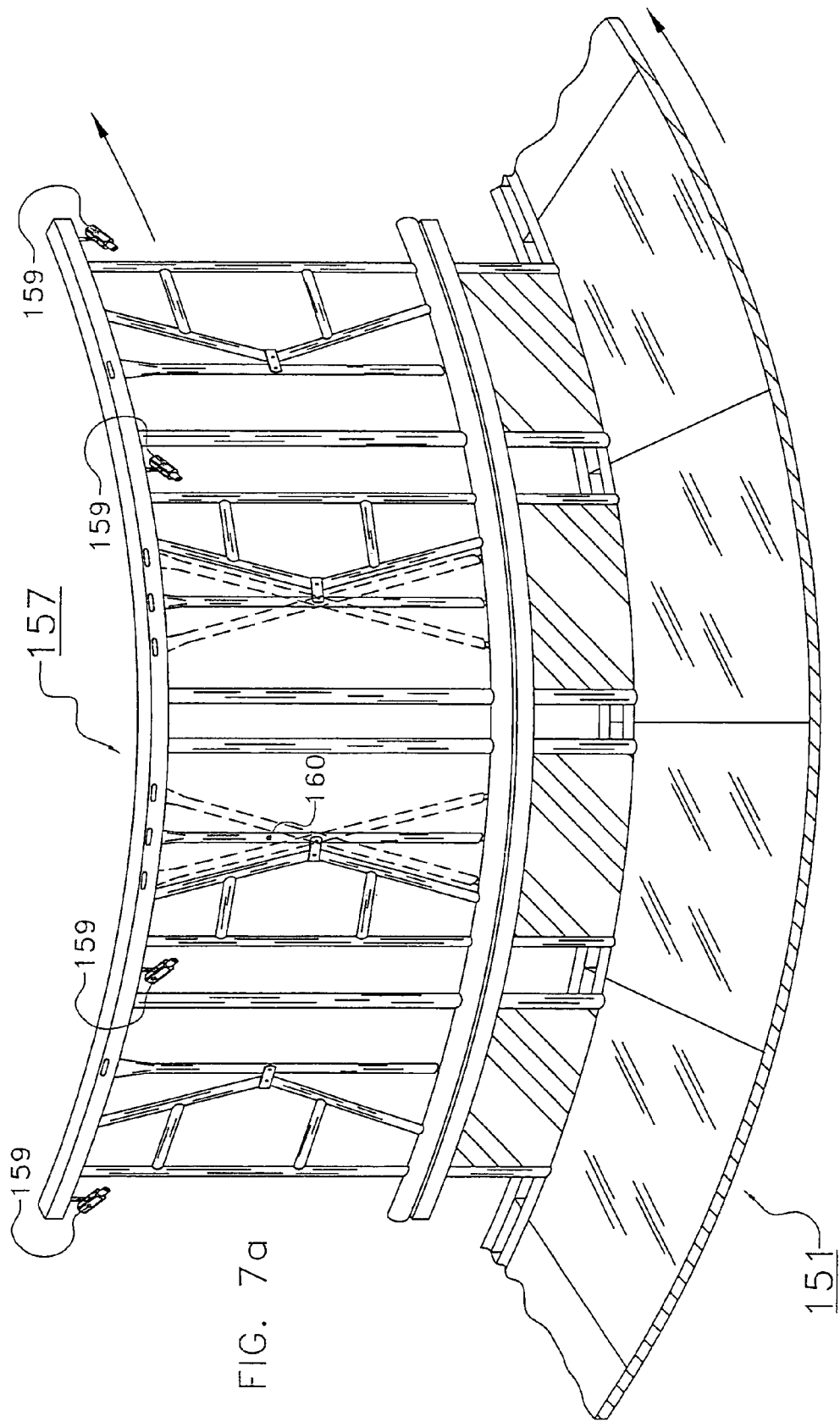
FIG. 7a is a diagrammatic, perspective view of a locking feeding gate on an annular platform of an assembly according to the invention.
Figure 7B:
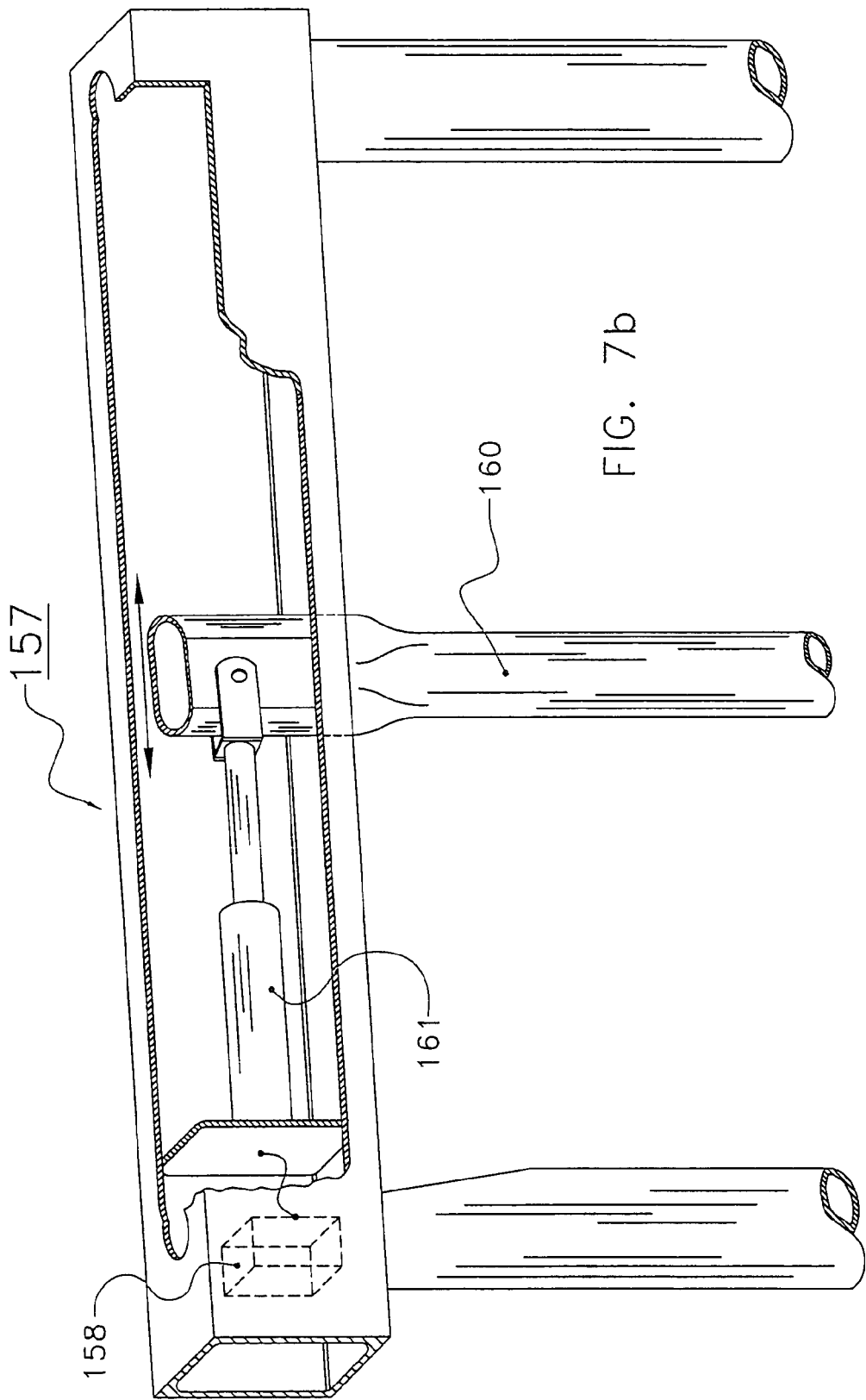

The locking feeding gate 157 will be explained in further detail with reference to FIGS. 7a and 7b. The locking feeding gate 157 extends near the inner edge 155 over all juxtaposed feeding places 156. The locking is realised by a bar 160 that is movable into different positions. In the various positions of the bar 160 a cow is either locked or released (in one of these positions the head of a cow is "forced" upwards, and in a vertical position of the bar the cow is released without being "forced" in a particular direction). FIG. 7b shows a control device 161 (in the form of a cylinder piston) for controlling the bar 160 into a relevant position. As described briefly in the foregoing, it is advantageous if the locking control unit 158 for activating or deactivating the locking obtains information from an animal position determining device, such as for example a camera. This animal position determining device is capable of determining the position of the cow relative to the bar 160. With the aid of this information the bar 160 may then be moved into the relevant position.

FIGS. 8a to 8g show diagrammatically an embodiment of a feeding place to be used in the embodiment of the assembly as shown in FIG. 6. The feeding place 156 comprises an entrance opening 162 for a cow and comprises a feed trough 163 having a shape that widens from the entrance opening 162.

With the aid of side flaps 164 the feeding place 156 is designed in such a way that the ears of a cow are covered when she is eating from the feed trough 163, thus rendering the feed trough 163 soundproof. This prevents the cow from perceiving disturbing ambient sounds. In each side flap 164 there is disposed a loudspeaker 165 that is connectable to a (non-shown) sound generating device. Via the loudspeakers 165 calming sounds or sounds stimulating the milking process may be offered to the cow.

A feed trough 163 is supported by a supporting structure 166 which is stationarily arranged inside the feed platform 151 and which comprises an inner annular guide bar 167 and an outer annular guide bar 168 by which the feed trough 163 is supported. The feed trough 163 is confined by the feeding place 156 in such a way that the feed trough 163 moves along the guide bars 167, 168 when the feed platform 151 is moving. In order to prevent unnecessary wear, both the guide bars and the feed trough are made of wear-resistant material having a low coefficient of friction, such as for example Teflon or the like. Alternatively, the feed trough 163 may be provided with wheels or roller bearings promoting the displacement of the feed trough 163 along the guide bars.

In the embodiment shown in FIGS. 8c and 8d, there is provided a weighing area 169 at the circumference of the supporting structure 166. In the case of said weighing area 169 both the inner and the outer guide bars 167, 168 extend downwards as far as the point where the feed trough 163 is supported by a balance 170 for weighing the feed trough 163 including its contents. The balance 170 may be of any known type and supplies weighing information that is sent to a non-shown feeding system control unit. It is pointed out that for the balance any form of torque meter may be used, the feed trough 163 being capable of being brought into contact with the torque meter.

The distance between the guide bars 167, 168 may change in certain places at the circumference, so that the feed trough 163 is tiltable about a horizontal axis. In FIG. 8e the inner guide bar 167 has been moved in height relative to the outer guide bar 168 to increase their mutual distance. Feed can thus slide downwards from the feed trough 163 and be collected in a device 168a for collecting remaining feed. Of course, in the mechanical reversal the outer guide bar 168 may be lowered to increase the distance from the inner guide bar 167.

FIG. 8f shows the situation in which the outer guide bar 168 is in a higher position than the inner guide bar 167. This makes the feed trough 163 tilt in such a way that a cow has no longer access to the feed that may be present therein. This position may be used to stimulate cows to leave the feeding place.

It will be obvious that within the scope of the invention other closing means for closing the feed trough for cows may be applied as well. A separate closing device that is movable across the entrance opening, such as a cover or the like, may for example be applied.

Furthermore, it will be obvious that the invention is not limited to feed troughs that are tiltable by means of guide bars, but that other embodiments of tiltable feed troughs may be applied as well within the scope of the invention. Such an alternative embodiment is shown diagrammatically in FIG. 8h.

Figure 8G:
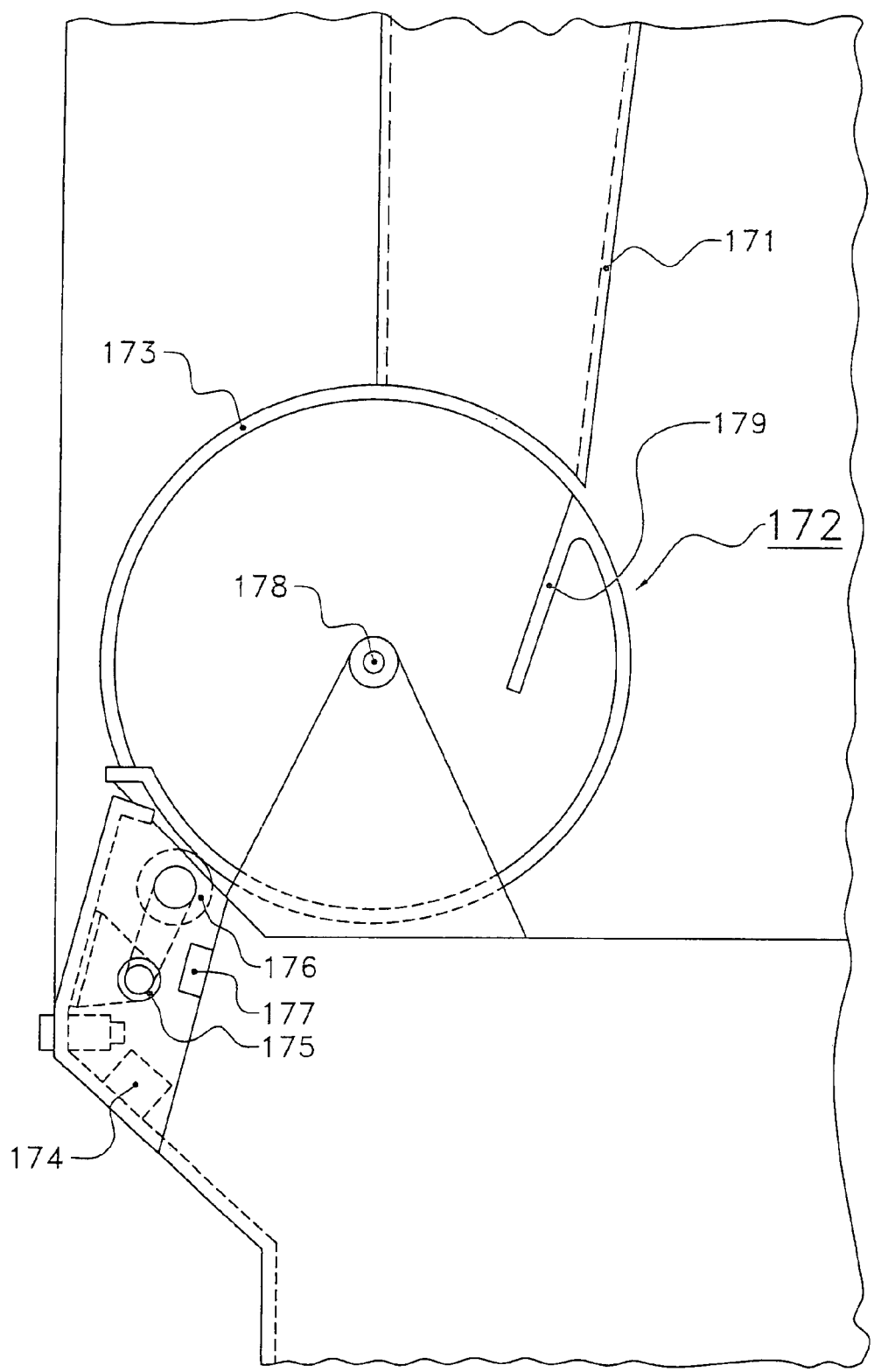
FIG. 8g is a diagrammatic side view of an alternative embodiment of a tiltable feed trough of a feed platform of an assembly according to the invention.

This FIG. 8g shows diagrammatically a feed conveying device 171 that conveys feed and/or drink (the term feed will be used hereinafter for the sake of simplicity, although it will be obvious that feed and/or drink is meant) in metered portions to a feed trough 172. An entrance opening 173 allows a cow access to the feed trough 172. An animal-recognition unit 174 is integrated in the feeding place and recognizes a particular cow that is present at the feed trough 172 and supplies a signal to a non-shown feeding system control unit that controls the feed conveying device 171 in such a manner that a correct amount is supplied to the feed trough 172. The feeding place is provided with means for weighing the feed present in the feed trough 172. With the aid of said means it is possible to determine how much feed is consumed by a particular cow, and at the same time whether remaining feed is present in the feed trough 172. In the embodiment of a feed trough 172 as shown diagrammatically in FIG. 8g, the means for weighing the feed present in the feed trough comprise a movable feed trough 172. The feed trough 172 is moved in a reciprocating manner by a motor 175 driving a roll 176, so that the feed trough 172 is tiltable, in particular rotatable, about an axis 178. This movement generates a torque whose magnitude is determined by a device 177 for measuring the magnitude of the torque. From the torque determined the device 177 deduces the weight of the feed present in the feed trough 172. The exact correlation between torque and amount of feed may previously be determined by means of simple calibration tests. The motor 175 for moving the feed trough 172, the device 177 for measuring the magnitude of the torque during moving, and the animal-recognition unit 174 are disposed immediately below the entrance opening 173. Owing to the fact that the feed trough 172 is movable, the feed trough 172 is able to function itself as closing device for the entrance opening 173. In order to prevent that, in the position in which the feed trough 172 closes the entrance opening 173, feed will fall from the feed trough 172, the feed unit 172 is provided with a wall portion 179 for catching remaining feed. The motor 175 drives the roll 176, which roll 176 contacts the feed trough 172. Although for the roll 176 a separate torque roll may be used, the roll 176 preferably performs both the function of driving the feed trough 172 and the function of torque roll or measuring roll. Of course, in an alternative embodiment, the torque may be measured by means of said motor 175 itself. By a proper selection of the axis of rotation 178, the degree of tilt of the feed trough 172 is determined by the amount of feed in the feed trough 172. The roll 176 may then be used for measuring the degree of tilt of the feed trough 172.

Figure 9:
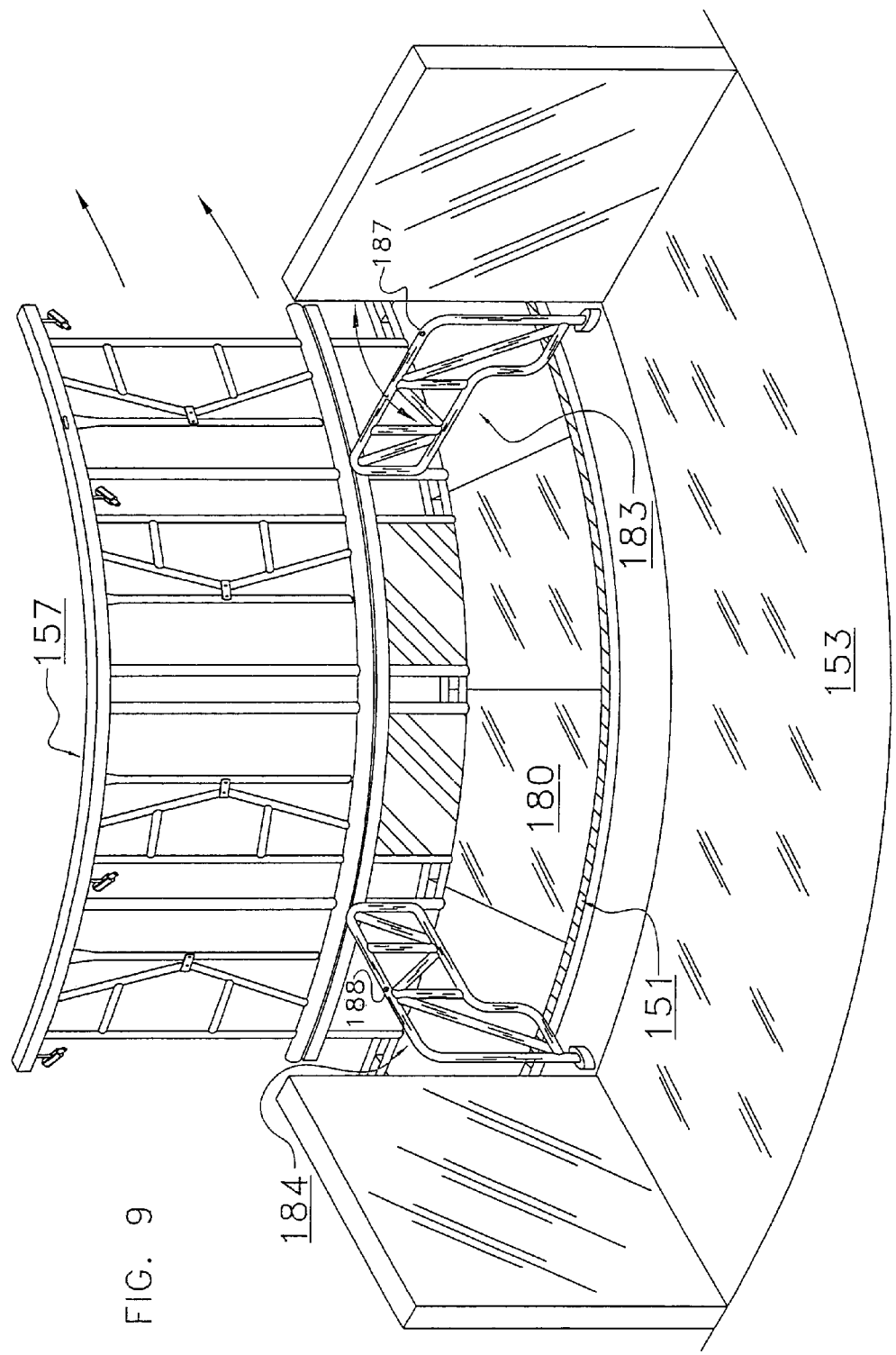
FIG. 9 is a diagrammatic, perspective view of a first embodiment of a deterring device of an assembly according to the invention.

As shown in FIG. 6, the feed platform 151 has platform portions 180, 181 that are each time adjacent to the entrance 153 or the exit 182. Said platform portions 180, 181 are no fixed portions on the feed platform 151, but are those portions of the feed platform 151 that are adjacent to the entrance 153 and the exit 182. Viewed in the direction of rotation of the feed platform 151 and opposite to the direction of rotation of the feed platform 151, said platform portions 180, 181 have transitions 183, 184, 185, 186 at their ends. As shown diagrammatically in a perspective view in FIG. 9, there is each time provided a stationary, pivotable gate 187, 188 as a deterring device for deterring a cow from crossing the relevant transition 183, 184. A pivotable gate 187, 188, as shown in FIG. 9, can be opened by pressure of a cow that is locked at a feeding place 156, as a result of the rotation of the feed platform 151, and subsequently pivots into the closed position, for example by spring pre-tension. It will be obvious that the invention is not limited to the embodiment of a deterring device shown in FIG. 9, but that other deterring devices may be applied as well within the scope of the invention. The deterring devices at the transitions 184, 185 may alternatively be designed as immovable ones, so that it is impossible for a cow to be present between said transitions.

Figure 10A:
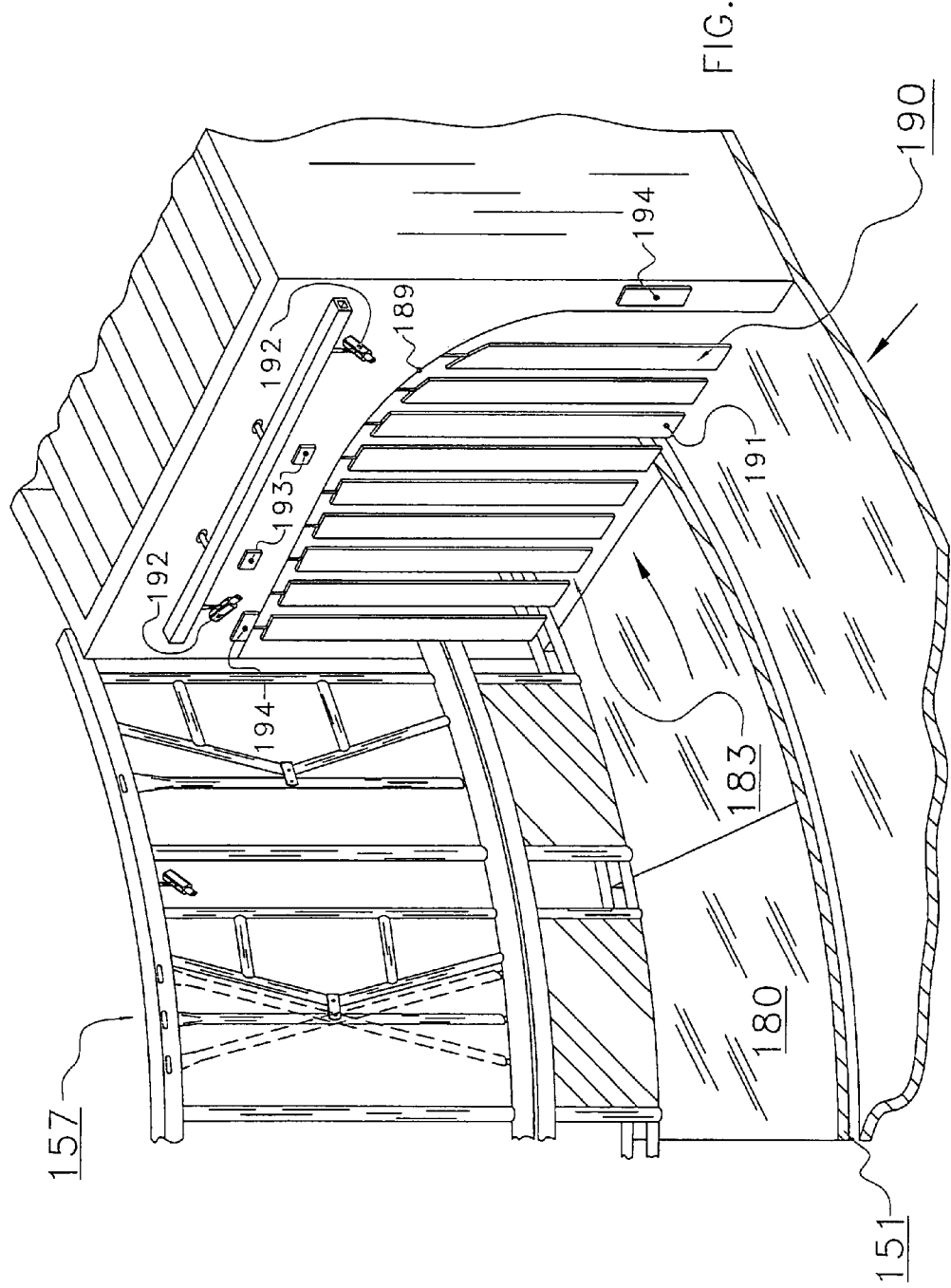
FIG. 10a is a diagrammatic, perspective view of a second embodiment of a deterring device of an assembly according to the invention.

Such an alternative deterring device is shown in a diagrammatic, perspective view in FIG. 10a. The deterring device shown here comprises a lowered ceiling 189 that is preferably somewhat higher than the height of the biggest cow of the herd. In many cases, such a lowered ceiling, in particular if the space under the ceiling is darkened, already ensures per se a sufficiently deterring effect. In the embodiment shown, a curtain 190 in the form of juxtaposed lamellas 191 is suspended from the lowered ceiling, which ensures a sufficiently deterring effect. It will be obvious that other forms of curtains, which are, moreover, suspended from a normal, i.e. not lowered, ceiling, may be applied as well within the scope of the invention. At the transition 183, cameras 192 and ultrasonic sensors 193 are suspended for monitoring the platform portion 180. Said detectors may detect for example whether a cow that crosses the transition 183 is actually locked by the locking feeding gate 157. If this is not the case, the movement of the feed platform 151 may be stopped and an alarm signal may be sent, if desired, to the operator of the assembly. To improve the safety of the cows, there are also provided pressure sensors 194 that are capable of detecting whether a cow by the movement of the feed platform 151 is unintentionally pressed against the lowered ceiling 189 or other stationary parts adjacent to the feed platform 151.

Figure 10C:
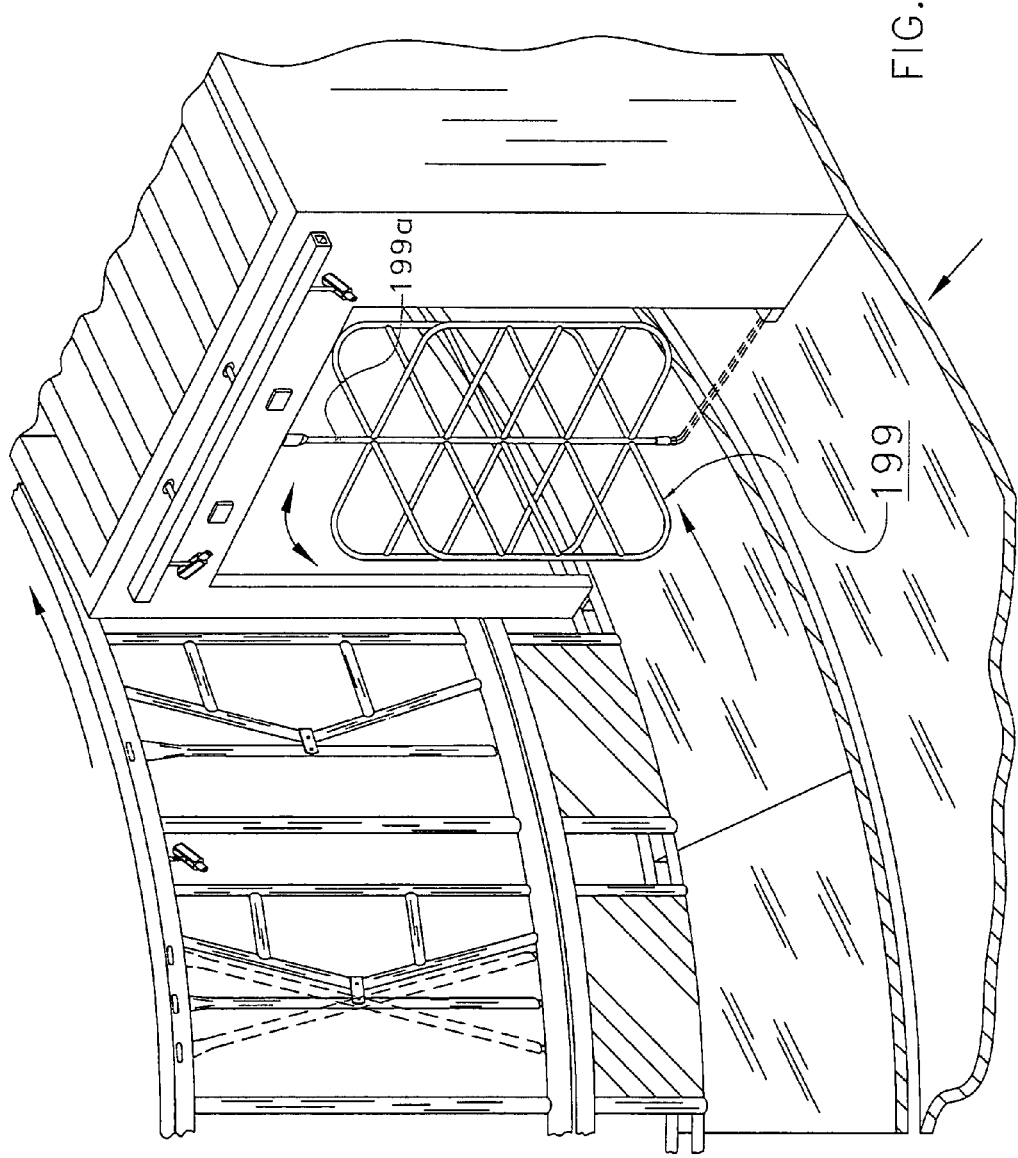
FIG. 10c is a diagrammatic, perspective view of a fourth embodiment of a deterring device of an assembly according to the invention.

A further alternative embodiment of a deterring device is shown in a diagrammatic perspective view in FIG. 10b. In this figure the deterring device comprises a closing device in the form of an operated sliding door 195, i.e. a door whose size is variable. Also in this case there are provided cameras 196, IR-detectors 197 and pressure sensors 198. In an open position the sliding door 195 is slid in completely outside the feed platform 151 and in a closed position the sliding door 195 is slid out completely over the feed platform 151. The sliding door 195 is usually closed and is only opened upon detection (with the aid of for example the cameras 196 or the IR-detectors 197) that a cow approaching the sliding door 195 is locked at the locking feeding gate 157, which may also be determined for example by the cameras 196 or by an animal-recognition unit in co-operation with a locking control unit. Consequently, the sliding door 195 will not be opened for a non-locked cow. In order to improve the safety of the cows, the pressure sensors 198 are also disposed on the relevant side of the sliding door 195. As a further alternative, FIG. 10c shows a rotatable gate 199 whose vertical bar of rotation 199a is located in the immediate vicinity of the outer edge of the feed platform 151. Alternatively, a rotatable gate (or a rotatable door) may be rotatable about a horizontally disposed bar of rotation. The gate portions or door portions extending away from the bar of rotation may be designed, if desired, so as to be slidable in or foldable in.

It will be obvious that there is provided a control unit that synchronizes a drive unit of the rotatable door with the drive unit of the feed platform.

Figure 11B:
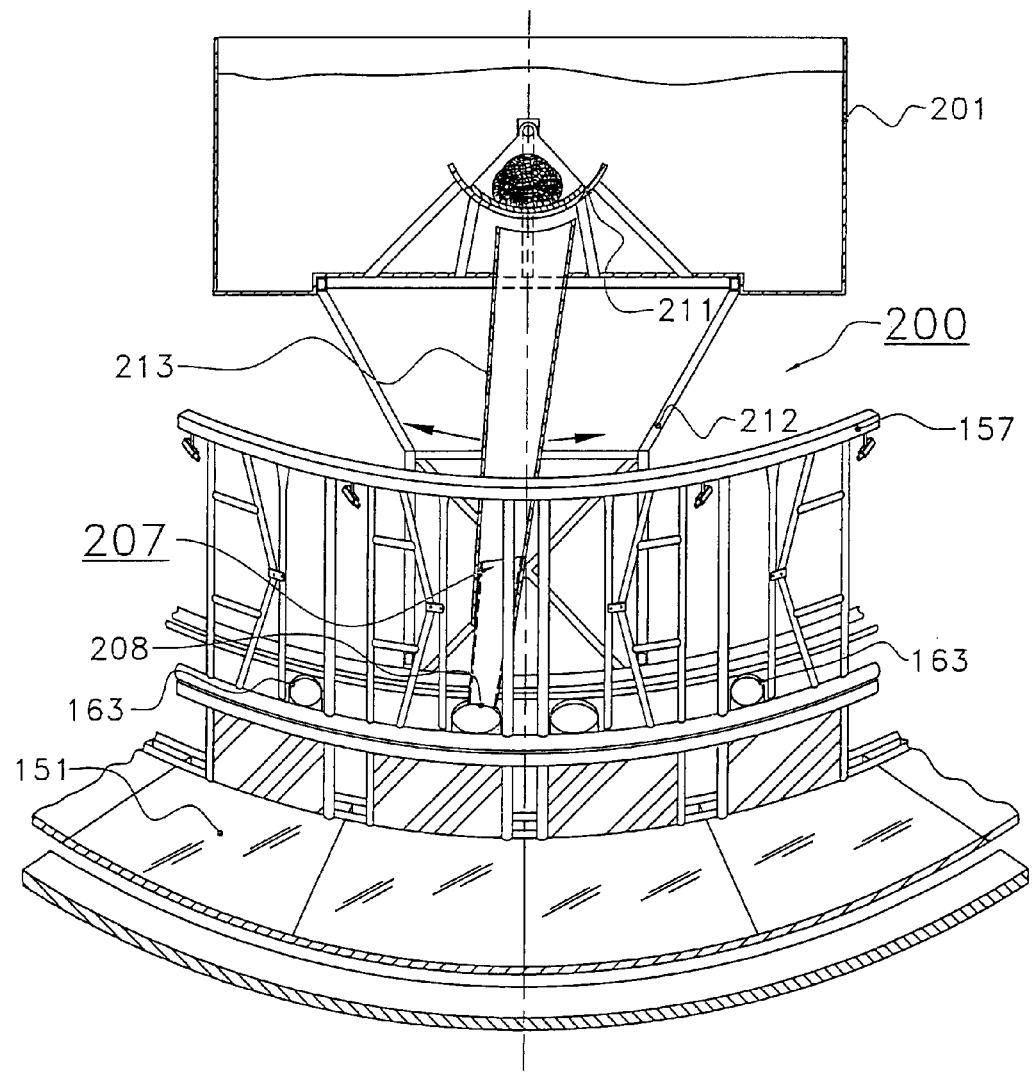

FIGS. 11a and 11b show a diagrammatic, partially cross-sectional view, respectively a diagrammatic, perspective view of a feed supply station 200 of a first embodiment of a feeding system of an assembly according to the invention. As shown in FIG. 6, said feed supply station 200 is arranged stationarily on the inner side of the annular feed platform 151, and in the present embodiment it is suitable for supplying a minimum amount of roughage to each passing feed trough 163. This means that an amount of roughage is supplied to each feed trough 163, so that a cow, when boarding the platform portion 180 (FIG. 6), will find feed in each feed trough 163, and the cows are thus enticed by the freely obtainable feed to go to the feed platform 151.

The feed supply station 200 has a feed storage container 201 in which the roughage can be replenished by means of a provisioning system 202. The feed storage container 201 is disposed on a carrier frame 212, so that the feed storage container 201 is located above the feed troughs 163, as a result of which transport of feed from the feed storage container 201 to the feed trough 163 can take place with the aid of gravitational force. The provisioning system 202 comprises a rail system 203 extending from above the feed storage container 201 to above a place where a large amount of roughage is present, which place is regularly, for example manually (or mechanically or automatically), replenished. A feed gripper 204 is movably suspended from the rail system 203, for example by means of rolls. By means of a displacing structure 205, for example an accordion-like supporting structure, the feed gripper 204 is suspended movably in height, so that the feed gripper 204 can be moved downwards for gripping feed at the storage place, and for moving the feed gripper 204 to immediately above the feed storage container 201, so that, when the feed gripper 204 is opened, the feed is conveyed to the feed storage container 201 via a small drop height. During the displacement along the rail system 203 the feed gripper 204 is preferably kept at the highest possible level. The movement of the feed gripper 204 is controlled by a controlled drive unit, which obtains for example information from an ultrasonic sensor 206 that measures the height of the roughage in the feed storage container 201. When the height in the feed storage container 201 has come below a particular, preferably pre set, threshold, the feed gripper 204 is controlled in such a way that it will take feed from the storage place. It will be obvious that the control preferably takes place by a feeding system control unit or a central control unit. Furthermore, it will be obvious that other means for determining the contents of the feed storage container may be applied as well within the scope of the invention. For example, weighing devices, cameras and the like may be applied.

The feed supply station 200 comprises a conveying device 207 for conveying the feed from the feed storage container 201 to a feed trough 163. In the embodiment shown, the conveying device 207 is capable of being synchronized by a (non-shown) drive unit with the drive unit of the feed platform 151. Said drive unit may be connectable to the control unit of the feed platform, so that the supply end 208 of the conveying device 207 moves along with the feed trough 163 during the supply of feed to the feed trough 163. When the minimum amount of feed has been supplied, the drive unit is controlled in such a way that the conveying device 207 is moved to the next feed trough 163 opposite to the direction of movement of the feed platform 151. With the aid of the data in relation to the speed of movement of the feed platform 151, the feeding system control unit is capable of determining how far the conveying device 207 has to be moved backwards to be disposed above a feed trough 163 and it controls the drive of the conveying device 207 accordingly. Depending on the magnitude of the minimum amount, in an alternative embodiment, the supply end 208 of the conveying device 207 may be designed as a stationary one. The time during which a feed trough 163 passes under the supply end 208 is sufficient for supplying the minimum amount. The synchronization of the supply moments with the moment when the feed trough 163 is present under the supply end 208 can be detected and controlled both mechanically and electromagnetically.

In the embodiment shown in FIGS. 11a and 11b, the conveying device 207 comprises a first conveyor 209, which is constituted by an auger. Alternatively, as a first conveyor, a gripper, belt conveyor or any other device known per se for conveying feed may be used. The first conveyor 209 conveys roughage from the feed storage container 201 in upward direction for obtaining a highly accurate metering. The first conveyor 209 comprises a supply end that coincides with an outlet 210 of the feed storage container 201.

From the outlet 210 of the feed storage container 201 feed falls into a receptacle 211. Therefore, the receptacle 211 is disposed under the outlet 210. The receptacle 211 is provided with a weighing device to be described hereinafter in further detail for weighing feed present in the receptacle 211 and has a bottom which is adapted to be opened. When the weighing device detects that the minimum amount of feed is present, this is transferred to the control unit that stops the drive of the first conveyor 209. When it has been established that the supply end 208 is located above a feed trough 163, then, under the control of the control unit, the bottom of the receptacle 211 is opened, so that feed is transferred to the relevant feed trough 163 via a second conveyor 213, constituted by a tube-shaped chute or a channel-shaped chute, disposed under the receptacle 211. Immediately after the bottom has been opened, it can be closed again, and the first conveyor 209 can again convey feed to the receptacle 211, so that the receptacle 211 can soon be replenished to the minimum amount.

As shown in FIG. 6, a further feed supply station 214 is located opposite the entrance 153. With the exception of the aspects to be described hereinafter, said feed supply station 214 is identical to the feed supply station 200. As described in the foregoing, the assembly as shown in FIG. 6 is provided at each feed trough 163 with a (non-shown) animal-recognition unit. When, as described in the foregoing, a cow has boarded the platform portion 180 and is eating at a feed trough 163 and is locked there, the control unit of the feed supply station 214 is controlled in such a way that a complete portion of roughage is supplied to that cow (the size of the portion being individually adaptable, if desired). Therefore, the conveying device of the feed supply station 214 is movable to be able to provide, as shown in the embodiment, five feed troughs 163 with feed. It is pointed out that the complete portion of roughage is not only dependent on the identity of a cow, and in particular her feed consumption rate, but also on the length of the resting zone that follows the entrance, as will be described hereinafter. The size of the portion is attuned in such a way that it may be expected that the cow will eat her portion at least almost completely when she is present in that first resting zone.

Although the supply end of the conveying device of the feed supply station 214 may be provided with an animal-recognition unit, partially with the aid of which the drive of the conveying device is controlled so that the supply end above the relevant feed trough 163 will supply the correct amount of roughage, in this embodiment it has been decided to dispose stationary platform position detectors 215 opposite the entrance 153 in order to supply the relevant cow with a correct amount of feed. In the embodiment shown in FIG. 6, each feed trough 163 on the feed platform 151 has a specific identification, such as a number, for example 163-01 to 163-48, as shown in the drawing. This identification is also included, for example, in the animal-recognition unit that is disposed at the relevant feed trough. Consequently, when a cow has been locked at a feed trough, it is known at which feed trough a cow is present. Since the feed platform 151 is rotating, it is not possible to know, without additional data, the spatial position of the feed trough, and consequently of the cow, relative to a stationary point. For this purpose, there are provided platform position detectors 215 that are able to establish, in co-operation with the animal-recognition units, the position of a particular feed trough. In combination with the data from the drive unit of the feed platform, this enables the feeding system control unit to know at all times the spatial position of a feed trough and a cow eating there. Said position data may not only be used for the control of the feed supply station 214, but also for later treatments.

When a cow has crossed the transition 183, she enters a first resting zone 216. In the embodiment shown, the first resting zone 216 covers four feeding places 156 and the span of time a cow spends on the feed platform 151 in the first resting zone 216 is dependent on the speed of movement of the feed platform 151. In the embodiment shown, the span of time a cow spends in the resting zone amounts to approximately 3 minutes and 20 seconds. In this span of time the cow is not milked and, in this embodiment, no treatment at all is performed on the cow.

The first resting zone 216 is followed, as shown in FIG. 6, by the milking pre-treatment zone 217 where a milking pre-treatment to be explained hereinafter in further detail may be performed on the cows. On the inner side of the annular feed platform 151 a concentrate supply station 218 is located in the milking pre-treatment zone 217. Said concentrate supply station 218 is shown diagrammatically in FIG. 12a.

Figure 12A:
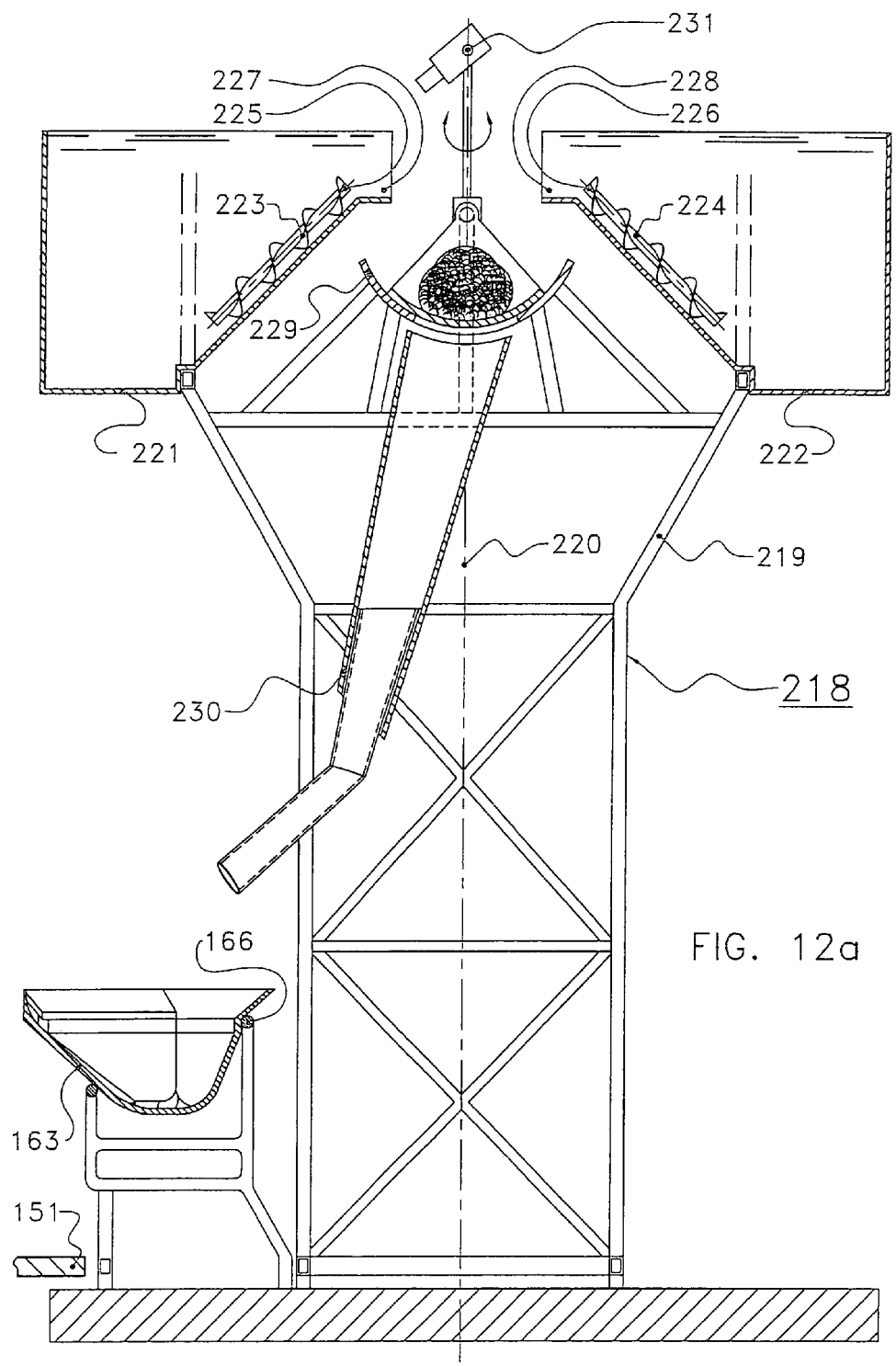
FIG. 12a is a diagrammatic, partially cross-sectional view of a part of a second embodiment of a feeding system of an assembly according to the invention.

The concentrate supply station 218 comprises a framework 219 which is disposed, in the embodiment depicted in FIG. 12a, around a central axis 220. On the upper side of the framework 219 are located five feed storage containers (two of which, 221, 222, are shown). Four of those feed storage containers contain different sorts of concentrate components, whereas the fifth feed storage container contains roughage. On the basis of the established animal identity, a milking system control unit is capable of determining whether or not a cow is to be milked. If this is the case, the concentrate supply station 218 may be controlled in such a way that the correct amount and the correct mixture of concentrate is supplied to the relevant cow. If a cow is not to be milked, the concentrate supply station 218 is controlled in such a way that roughage is supplied to the relevant cow.

For the installation of the feed storage containers 221, 222 there are made not further shown provisions on the framework 219. Each feed storage container 221, 222 is provided with a first conveyor 223, 224 for conveying feed from a feed storage container 221, 222 in upward direction, which results in a highly accurate metering. The first conveyors 223, 224 have a supply end 225, 226 that coincides with an outlet 227, 228 of the feed storage containers 221, 222. In the embodiment shown, the feed storage containers 221, 222 are disposed around the central axis 220. From the outlets 227, 228 the feed falls into a receptacle 229 for collecting and weighing the amount of feed. The receptacle 229 has a bottom which is adapted to be opened. From the receptacle 229 the feed is conveyed to the relevant feed trough via a movable tube-shaped chute 230 or channel-shaped chute. The tube-shaped chute 230 is drivable and is controlled partially with the aid of data from the feeding system control unit. In the embodiment shown, the tube-shaped chute 230 is movable across three feeding places. In the embodiment shown, the control of the provisioning system for replenishing the feed storage containers is performed with the aid of a camera 231 and associated picture-recognition software.

Figure 12B:
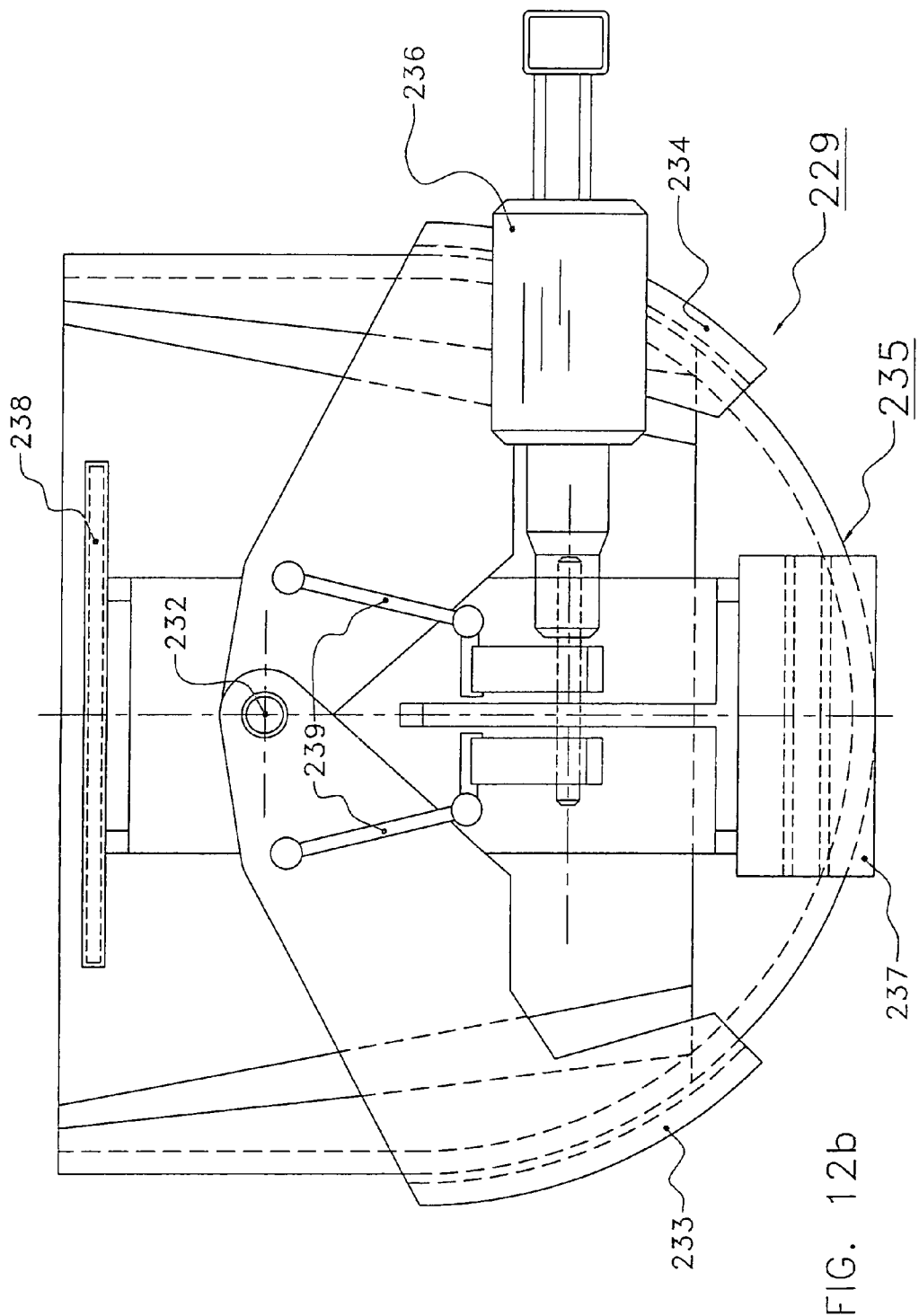
FIG. 12b is a diagrammatic view of an embodiment of a receptacle with closable bottom of a feeding system of an assembly according to the invention.

For conveying feed to the tube-shaped chute 230, the receptacle 229 has a bottom which is adapted to be opened. In the embodiment shown in FIG. 12b, this is achieved in that the bottom of the receptacle 229 is constituted by two halves 233, 234 that are pivotable about an axis 232. When the halves 233, 234 move away from each other, there is thus created a fall opening 235 through which the feed falls into the tube-shaped chute 230. A drive element 236 controls the opening of the bottom. The drive element 236 is controlled by the feeding system control unit. The receptacle 229 is provided with a weighing device 237 known per se for measuring feed present in the receptacle 229. The weighing device 237 may be a load cell on which the receptacle 229 bears via for example a leaf spring 238 and a set of bars 239.

In the milking pre-treatment zone 217 a cow to be milked is subjected to a pre-treatment. As shown diagrammatically in FIG. 6 and more in detail in FIG. 13a, for this purpose there is provided a stationary milking pre-treatment device 240 for performing a milking pre-treatment on a cow on the feed platform 151. In the embodiment shown, the milking pre-treatment is performed with the aid of cleaning cups 241 as pre-treatment equipment. The cleaning cups are capable of cleaning, massaging and/or stimulating the teats of a cow in a manner known per se. The cleaning cups 241 are carried by a pre-treatment equipment carrier 242, which is arranged stationarily beside the feed platform 151. In the embodiment shown, the sets of cleaning cups 241 are disposed at the circumference of a common, cylindrical support 243. Said support 243 constitutes a closed path and is movable by means of a non-shown drive unit in such a way that a set of cleaning cups 241 is movable into a position from which the set can be taken from the carrier 242 and be connected to the teats of a cow. A set may comprise one to four cleaning cups. The milking pre-treatment device 240 further comprises a stationarily arranged connection unit 245 which is provided with a gripping device 246 comprising a robot arm 247 whose end is provided with a gripper 248 for gripping a pre-treatment tool 241. A device 249 for determining the position of a teat of a cow is disposed on the robot arm 247. Such a device may be provided in a manner known per se with a laser, ultrasonic sensors, cameras and the like. Said device may also be used for gripping a cleaning cup 241 (or a complete set of cleaning cups) that are carried by the carrier 242. When the gripper 248 of the gripping device 246 has gripped a cleaning cup 241, the robot arm 247 is controlled in such a way by a control unit 244 that is in connection with the milking system control unit, that the cleaning cup 241 is connected to a teat of a cow and is thus brought into contact with the teat of a cow. It will be obvious that the device 249 may also be used for determining whether the teats have actually sufficiently been cleaned by the cleaning cups 241. If this is not the case, a cleaning cup 241 may be connected again to the relevant teat. When a teat has not been cleaned sufficiently after a certain number of attempts, a signal that prevents the cow from being milked will be sent to the milking system control unit. Consequently, the invention also relates to an assembly or a device for automatically milking a cow, which device is provided with means for automatically cleaning a teat, and with means for determining the degree of cleaning or the degree of contamination of a teat after the cleaning has been performed, and for supplying a cleanliness signal, the automatic milking of a cow being performed in dependence on the cleanliness signal.

Via non-shown lines for supplying cleaning fluid, the cleaning cups 241 are connected to a source of cleaning fluid that is arranged inside the support 243. For this purpose, the lines extend through the support 243. It is pointed out that other components of the cleaning device 240, such as a vacuum pump for keeping the cleaning cups connected to the teats, are also accommodated inside the support 243. Furthermore, the control unit 244 is capable of controlling the cleaning in such a way that per cow a cleaning attuned to that cow is performed.

When the relevant teats have been cleaned, the cleaning cups 241 are disconnected from the teats by removing the vacuum, and the cleaning cups 241 are withdrawn to the support 243 by withdrawing devices known per se.

Used cleaning cups 241 are cleaned and disinfected, if desired, by a cup cleaning device 250, which comprises a rotatable robot arm 251 with a spraying device 252 provided at its end. The movement of the robot arm 251 and the activation of the spraying device 252 are controlled by the milking system control unit. The robot arm 251 is provided with a device for determining the position of the cups. It will be obvious that other embodiments of pre-treatment tools, such as brushes, sprayers and the like, may be applied as well within the scope of the invention, while for the cleaning of the tools, besides spraying, other ways of performing, such as steam disinfection, immersion in disinfectant fluids and the like, while possibly heating the fluid and possibly complemented with a drying step, may be applied as well within the scope of the invention.

It is pointed out that the cleaning cups 241 are arranged separately from the feed platform 151, and that the number of sets of cleaning cups is considerably smaller than the number of feeding places 156. Furthermore, it is pointed out that, within the scope of the invention, the pre-treatment is considered as belonging to the milking.

After the cow has passed through the pre-treatment zone 217 and the teats of a cow to be milked have been cleaned, the cow enters the main milking zone 253 (FIG. 6 and FIG. 13*a*), in which an automatic device 254 for connecting teat cups 255 and a milking device 256 are disposed. It is pointed out that the invention is not limited to automatically connecting teat cups and automatically milking cows, but also relates to any other form of connecting and milking.

The teat cups 255 are arranged in sets of four separately from the feed platform 151. In the embodiment shown, the number of sets of teat cups is eight, although for the sake of clearness of the drawing only four sets are shown in FIG. 13*a*, which number is considerably smaller than the number of feeding places.

The sets of teat cups 262 are each carried by a stationarily arranged teat cup carrier 257. The teat cup carriers 257 are collectively supported by a common, cylindrical support 258. Analogously to the support 243 for the cleaning cups, said support 258 is rotatable, so that the teat cups 255 are movable into a position in which they are capable of being taken from the carrier for connection to the teats of a cow. For this purpose, a drive unit of the support 258 and consequently of the teat cup carrier 257 is controlled by the milking system control unit. On the inner side of the support 258 various components of the milking device are disposed, as will be described with reference to another embodiment of an assembly according to the invention as shown in FIG. 13*b*.

In the embodiment shown, the connection device 254 for automatically connecting a set of teat cups 262 to the teats of a cow comprises a rotatable robot arm 251 provided at its end with a gripper for gripping a teat cup 255 (alternatively a set of teat cups 262), and a device for determining the position of a teat, which device may also be used for determining the position of a teat cup 255 on the carrier 261. It is pointed out that other constructions and robot arms for automatically connecting a teat cup to a teat may be applied as well within the scope of the invention. When the milking has been finished, as may be detected for example by a milk flow meter that establishes whether the milk flow has come below a particular threshold, the teat cups 255 are disconnected and withdrawn to the support 258. The cup cleaning device 250 is used for cleaning and possibly disinfecting the teat cups after the milking has been finished.

Figure 13A:
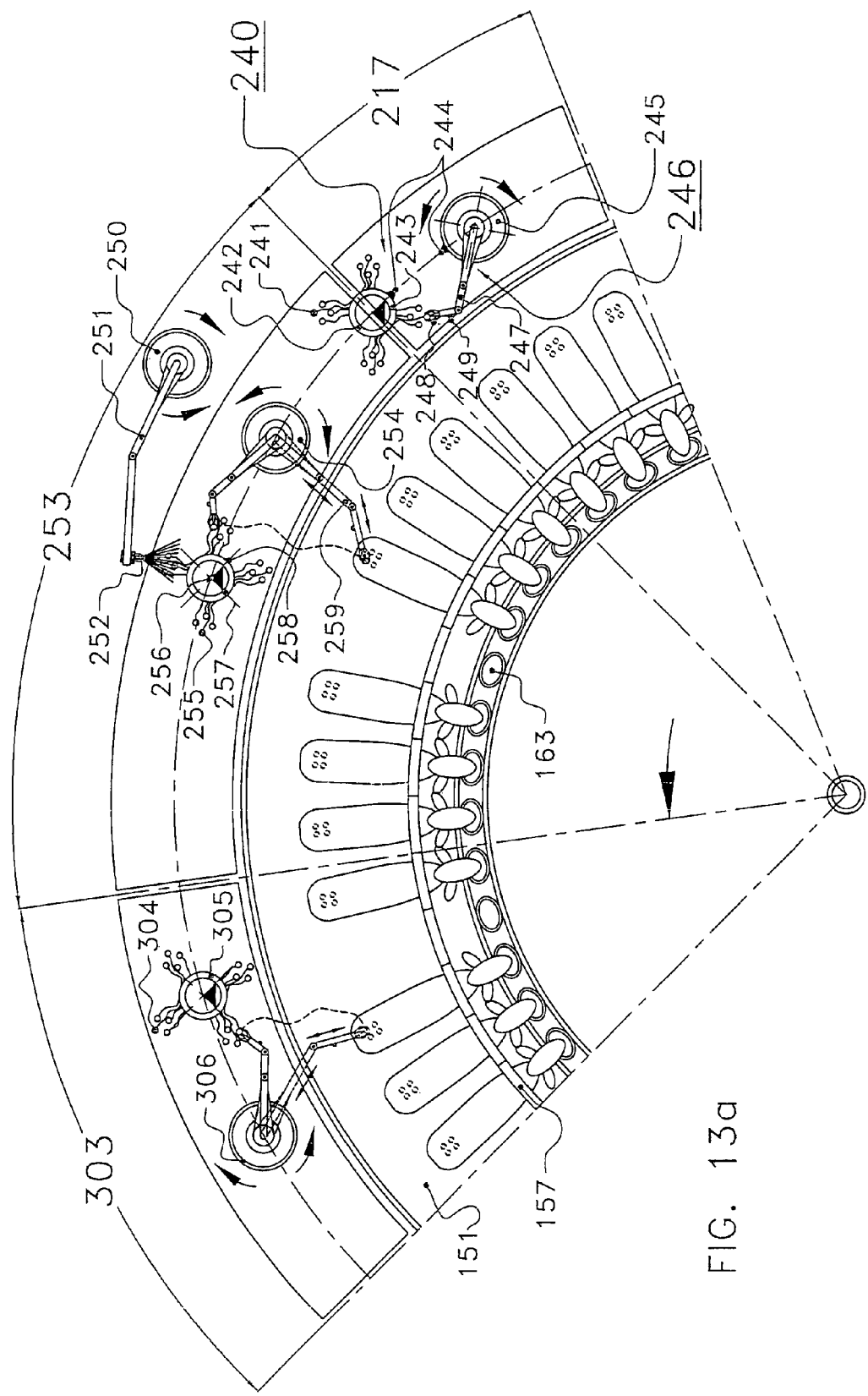
FIG. 13a is a diagrammatic plan view of a first embodiment of a milking system of an assembly according to the invention, the milking system being provided with stationary robot arms pivoting along with the platform.
Figure 13B:
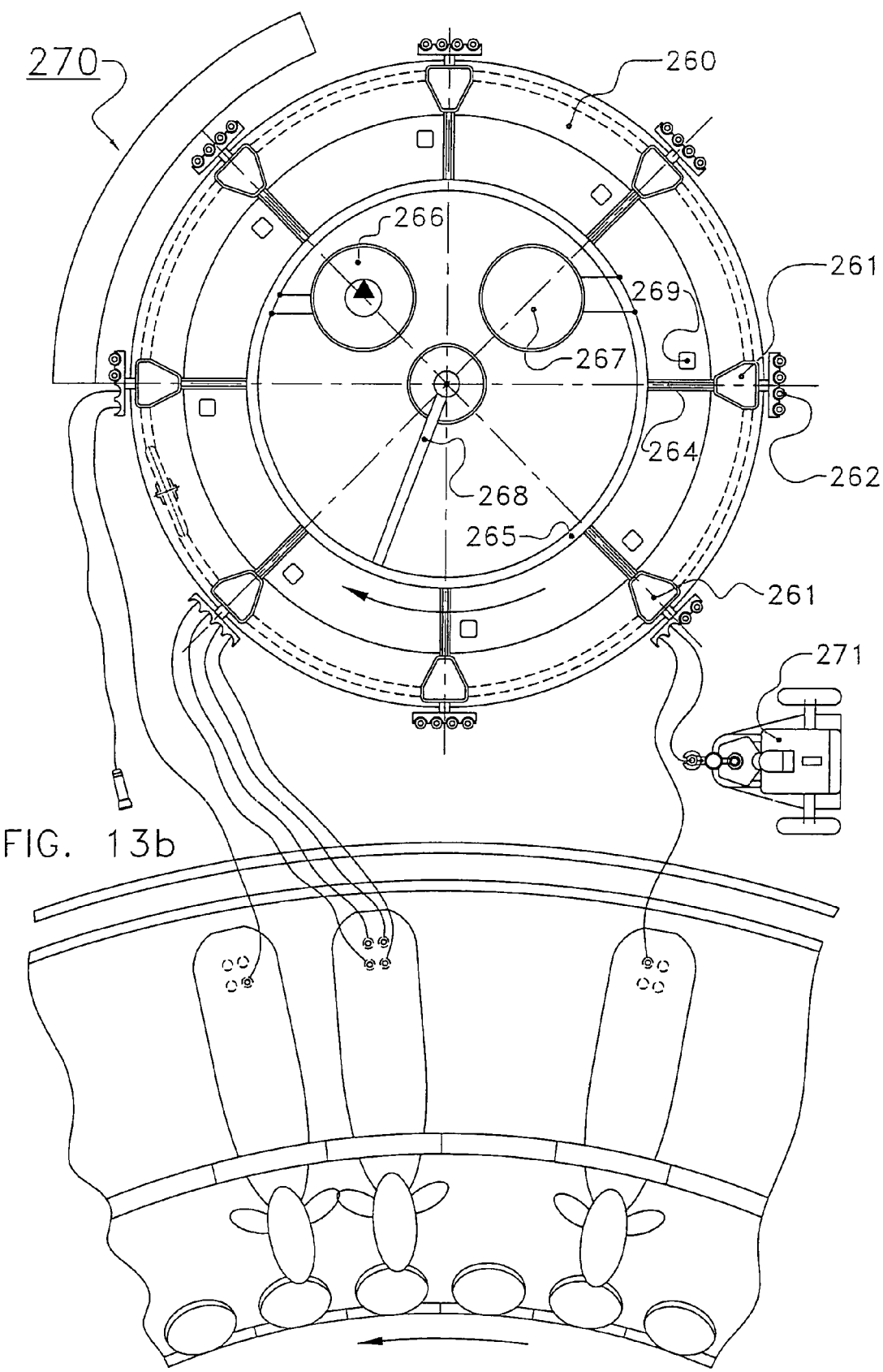
FIG. 13b is a diagrammatic plan view of a part of a second embodiment of a milking system of an assembly according to the invention, the milking system being provided with an autonomous, freely movable teat cup connecting robot.

In an alternative embodiment of a milking system of an assembly according to the invention, analogously to the embodiment as shown in FIG. 13*a*, there are used teat cup carriers 261 for carrying sets of teat cups 262 each comprising four teat cups, which teat cup carriers 261 are disposed on a common, rotatable support 260. The support 260 is supported on the ground by wheels 263 (FIG. 13*c*) which are driven by a non-shown drive unit under the control of a control unit. In the embodiment shown, each teat cup 255 is connected to a teat cup line 264 that extends towards an inner side of the support 260. Such a teat cup line 264 comprises at least one milking vacuum line and one pulsation line.

Inside the support 260 there is arranged a ring line 265 (FIG. 13b) to which the teat cup lines 264 are connectable. To the ring line 265 are also connected a milking vacuum source 266 and a pulsation vacuum source 267, which are also arranged on the inner side of the support 260. The ring line 265 is also connectable to a discharge line 268 for discharging milk to a non-shown milk tank, which discharge line 268 is also arranged inside the support 260. Before the milk reaches the ring line 265, the measuring devices 269 measure the value of milk parameters, such as for example conductivity, cell count, temperature, etc. Depending on the measurement result, the milk can be discharged to the ring line 265, or be conveyed to a container for milk that is not suitable for human consumption. For this purpose, the milking system is provided with non-shown switching devices that are known per se. Furthermore, said switching devices may be adjusted by default in such a way that foremilk is always discharged to the container or a comparable outlet. In the embodiment shown, the measuring devices 269 are also arranged inside the support 260. An alternative cleaning device for the teat cups, to be described hereinafter, is indicated diagrammatically in FIG. 13b by reference numeral 270. The drive unit of the support 260 is attuned by the relevant control units to the drive unit of the feed platform.

Figure 13C:
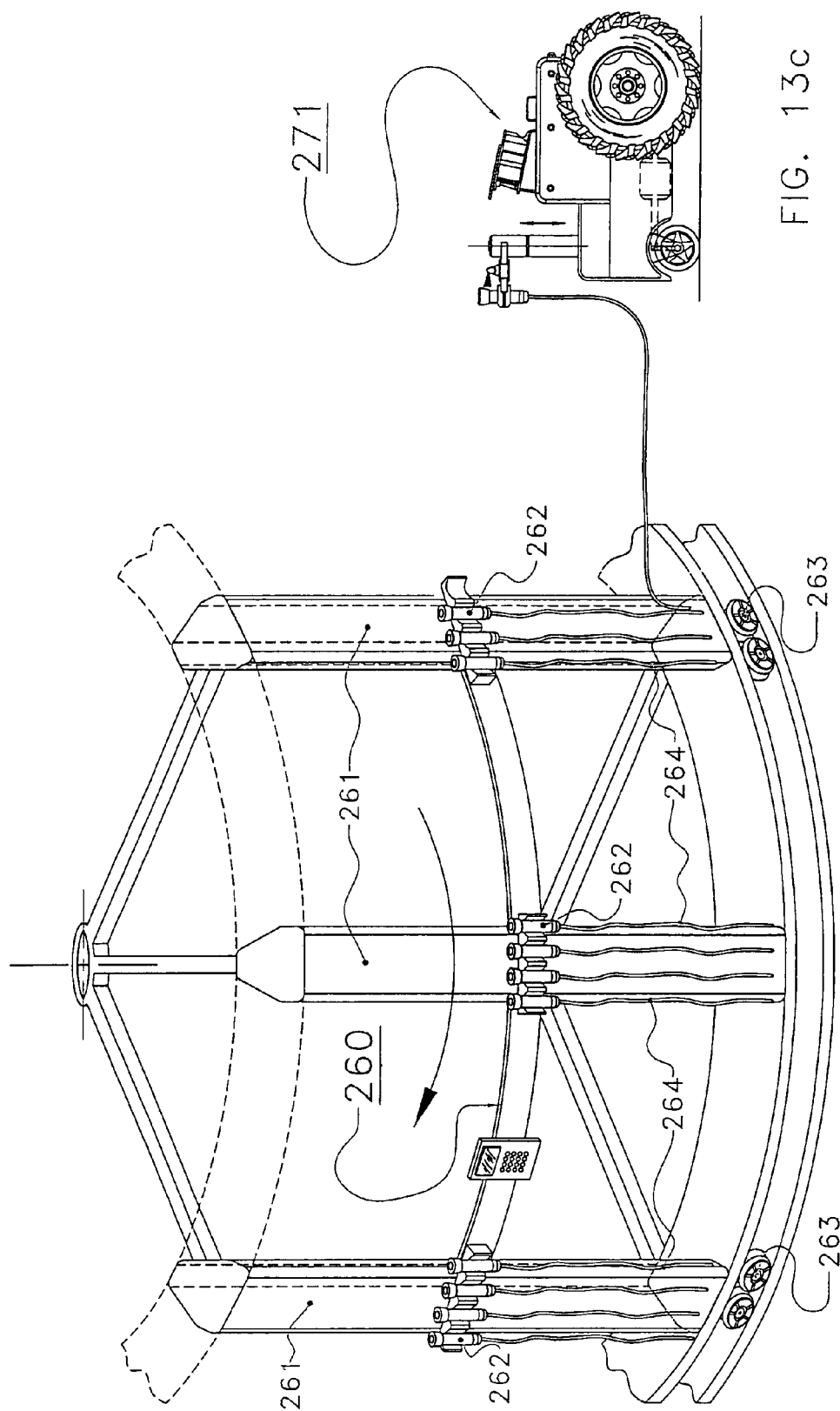
FIG. 13c shows diagrammatically a perspective partial side view of the embodiment of FIG. 13b.

In contrast with the embodiment as shown in FIG. 13a, the connection device according to the embodiment of FIG. 13c is an autonomous, mobile connecting robot 271, which will be described hereinafter in further detail. Because of the fact that the connecting robot 271 is movable in all directions, in contrast with the embodiment of FIG. 13a, a complicated robot arm for connecting the teat cups is no longer necessary. FIG. 13c shows diagrammatically the situation in which the autonomous connecting robot 271 takes a teat cup from the teat cup carrier 261.

Figure 13D:
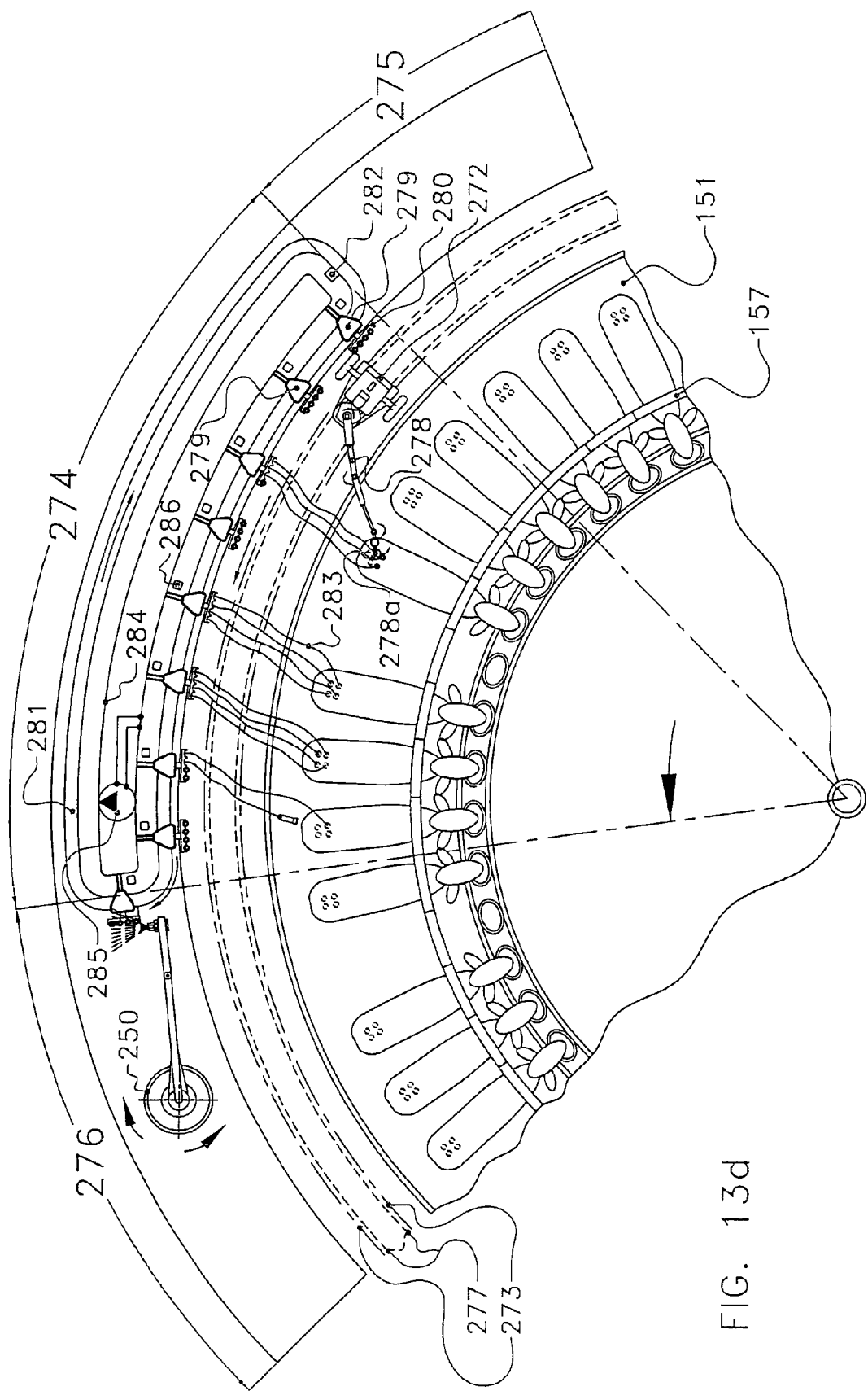
FIG. 13d shows a third embodiment of a milking system of an assembly according to the invention, the milking system being provided with a connection device that is movable along a rail and with teat cup carriers movable along a rail.

FIG. 13d shows a further embodiment of an assembly according to the invention. In this embodiment, as a connection device is used a movable connection device 272 for connecting a set of teat cups 280 to the teats of a cow. Said connection device 272 is movable in a reciprocating manner in a groove or channel 273 disposed beside the feed platform 151. The channel 273 extends at least over the area of the main milking zone 274, but, in the present embodiment, also extends over the pre-treatment zone 275 and the post-treatment zone 276, so that the connection device 272 may also be used for connecting the pre-treatment equipment and/or the post-treatment equipment.

The channel 273 extends at least substantially parallel to the outer edge of the feed platform 151 and comprises on its bottom a rail 277 along which the connection device 272 is capable of moving. Because of the fact that the connection device 272 moves via a rail 277, and consequently is not freely movable, in contrast with the embodiment as shown in FIG. 13c, there is not provided a particular navigation device for navigating and controlling the movable connection device 272. On the contrary, the movable connection device 272 does comprise a robot arm 278 carrying a gripper 278a for gripping a teat cup, but said robot arm 278 may be of a simpler construction than that in FIG. 13a because of the movability of the connection device 272 along the rail 277. The movable connection device 272 is also provided with a teat position determining device for determining the position of a teat of a cow, which device is also used for determining the position of a teat cup in the teat cup carrier 261.

In the embodiment of a milking system of an assembly according to the invention shown in FIG. 13d, analogously to the embodiment as shown in FIG. 13a, there are used movable teat cup carriers 279 for carrying sets of teat cups 280 each comprising four teat cups. In this embodiment, the movable teat cup carriers 279 are disposed movably on a rail 281 and are driven by a drive unit 282 under the control of a non-shown control unit that is connectable to a milking system control unit or a central control unit. The rail 281 forms a closed rail path extending partially at least substantially parallel to the outer edge of the feed platform 151.

In the embodiment shown, each teat cup is connected to a teat cup line 283 that extends towards the inner side of the rail path support 260. Such a teat cup line 283 comprises at least one milking vacuum line and one pulsation line. Inside the rail path there is arranged a ring line 284 to which the teat cup lines 283 are connectable. To the ring line 284 are also connected a milking vacuum source and a pulsation vacuum source, collectively indicated by reference numeral 285, which are also arranged on the inner side of the rail path. The ring line 284 is also connectable to a discharge line for discharging milk to a non-shown milk tank, which discharge line is also arranged (at least partially) inside the rail path. Before the milk enters the ring line 284, the measuring devices 286 measure the value of milk parameters, such as for example conductivity, cell count, temperature, etc. Depending on the measurement result, the milk can be discharged to the ring line 284, or be conveyed to a container for milk that is not suitable for human consumption. For this purpose, the milking system is provided with non-shown switching devices that are known per se. Furthermore, said switching devices may be adjusted by default in such a way that foremilk is always discharged to the container or a comparable outlet. In the embodiment shown, the measuring devices 286 are also arranged inside the rail path. The drive unit of the support 260 is attuned by the relevant control units to the drive unit of the feed platform 151.

The same cup cleaning device 250 as described with reference to FIG. 13a is provided for cleaning and possibly disinfecting the teat cups.

Figure 13E:
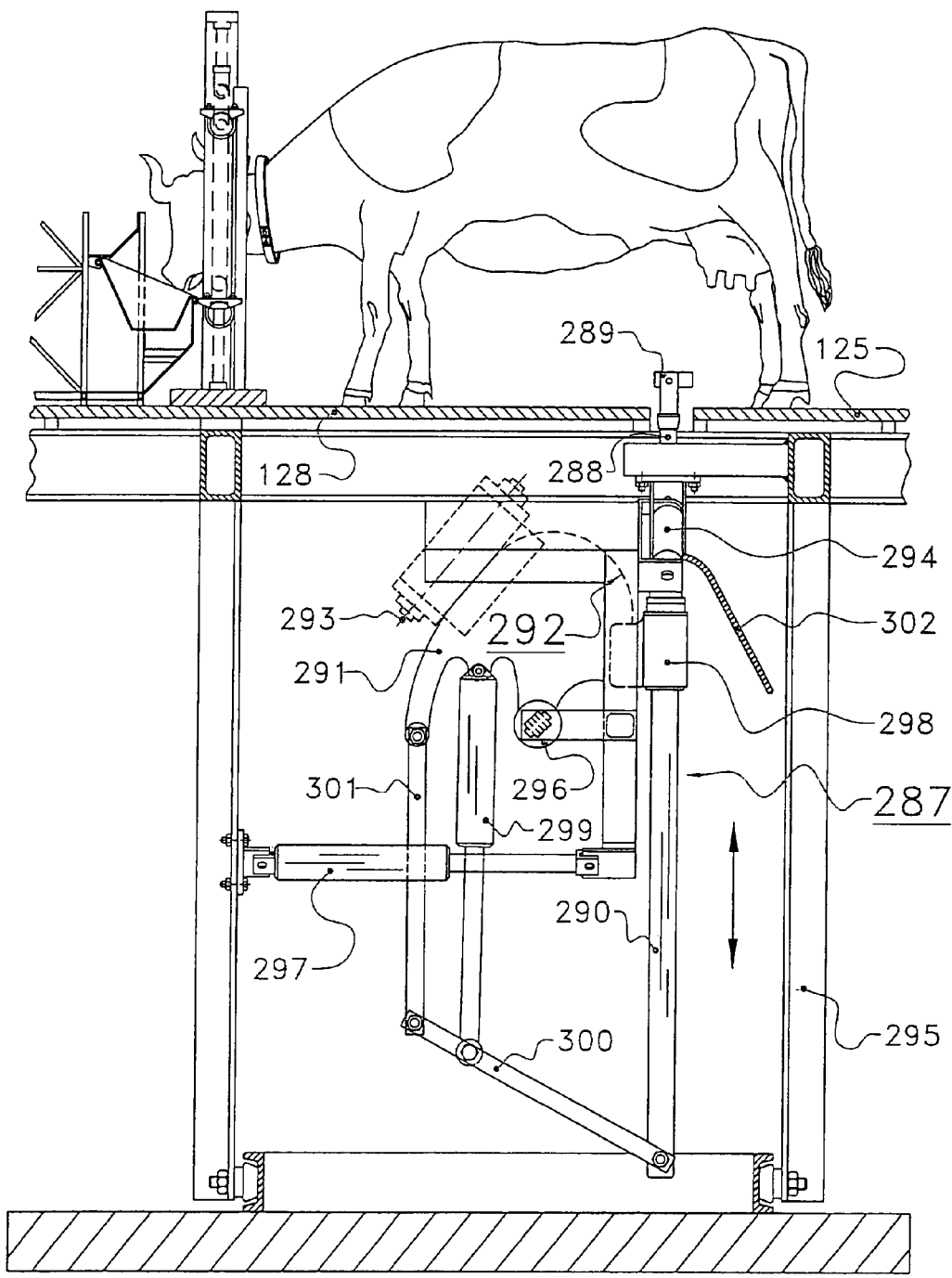
FIG. 13e shows a fourth embodiment of a milking system of an assembly according to the invention, the connection device being disposed below the feed platform.

FIG. 13e shows a part of an embodiment of an assembly according to the invention, which assembly is in particular suitable for use with a feed platform as described with reference to FIG. 5. In the embodiment shown, the movable feed platform comprises an outer annular platform unit 125 and an inner platform unit 128 that are disposed remotely from each other. The feed platform is arranged in such a way that, when a cow is eating at a feeding place, her front legs are standing on the inner platform unit 128 and her hind legs are standing on the outer platform unit 125, as shown diagrammatically. The outer platform unit 125 and the inner platform unit 128 are synchronously rotatable.

Below the feed platform there is arranged a teat cup carrier 287 that functions also as a connection device for the teat cups 288 (only one teat cup being shown for the sake of simplicity of the drawing). The teat cup carrier 287 is movable in height, so that the teat cup 288 is movable from a first lower position, in which the teat cup 288 is located below the feed platform, into a second position, in which the teat cup 288 extends to above the feed platform. A device 289 for determining the position of a teat is disposed on the upper side of the teat cup carrier 287. In the embodiment shown, the device 289 determines the position of a teat by means of an ultrasonic signal. The device 289 is disposed pivotably in two directions, so that the teats of the cow can be detected in any desired place. The teat cup 288 is supported by an axially movable support 290. The displacement of the support 290 may be controlled, so that the teat cup 288 can be brought at any desired height above the feed platform. The support 290 is fastened to a first frame 291 that is pivotably fastened to a second frame 292. The pivot axis 293 is disposed obliquely in such a way that it extends approximately through the middle between the two platform units 125, 128, which is also the case with pivot 294 by means of which the second frame 292 is fastened to a main frame 295. In this manner the support 290 is capable of pivoting in such a way that the open area between the platform units 125, 128 is always located in line with the support 290, so that when moving the teat cup 288 upwards, it can always be moved through a relatively small opening between the platform units 125, 128. The pivoting movement of the support 290 takes place by two drive elements 296, 297. The drive element 297 is fastened with one side to the main frame 295 and with its other side to the second frame 292, and the drive element 296 is fastened with one side to the second frame 292 and with its other side to the first frame 291. By controlling the length of the drive elements 296, 297, the support 290 can be pivoted in any desired direction. The support 290 can be displaced in axial direction by means of a guide element 298, the displacement being operated via drive unit 299. For this purpose, the drive unit 299 is fastened with one side to the first frame 291 and with its other side to a lever 300, which lever 300 is fastened with one side to the end of the support 290 and with its other side to the first frame 291 via an intermediate bar 301. It will be obvious that, by lengthening or shortening the drive unit 299, the support 290 will be moved in axial direction by means of the guide element 298. It is pointed out that the main frame 295 can be arranged stationarily, so that at least at the connection of the teat cups 288 the movement of the feed platform has to be stopped, but that, alternatively, the main frame 295 can move temporarily along with the feed platform.

The teat cup 288 is located on the upper side of the support 290, which teat cup 288 with the necessary lines, of which teat cup line 302 is shown, is connected to the necessary equipment. Analogously to the embodiment as described in FIGS. 1 and 2, this equipment is located below the feed platform. The necessary measuring instruments and sensors may be disposed near the teat cup 288, in order to be able to measure the milk immediately after it has left the udder. The entire teat cup carrier 287 with integrated connection device can be controlled automatically by means of a non-shown control unit, it being possible to record all measurement data and to compare them with other measurement results.

It will be obvious that, in case the feed platform is constituted by two platform units disposed remotely from each other, other components of the milking system and the feeding system, or another device such as leg-sprayers and the like, may also be arranged below the feed platform, in particular in such a way that they extend or are movable anyhow to above the feed platform. It is also possible to dispose the teat cup carriers, the support, the connection devices and the cleaning devices as described with reference to the previous embodiments, below the feed platform. In this manner it is even possible that the feed platform is provided with gripping elements for gripping the movable components, so that these components are moved forward by the feed platform itself. The gripping elements are capable of being deactivated, so that the relevant component can be detached from the feed platform. It is further possible to provide a single annular feed platform with slides that are located between the front legs and hind legs of a cow when a cow is eating at a feed trough. These slides may be operated (mechanically or otherwise) at convenient moments to provide an opening for components located below the feed platform.

As shown in FIGS. 6 and 13*a*, after the main milking zone 253, the cow enters a milking post-treatment zone 303 which, in the embodiment shown, extends over five feeding places 156. In the embodiment shown, the post-treatment is performed by disinfection cups 304 carried by disinfection cup carriers which are disposed on a common support 305 and are connected to the teats of a cow with the aid of a connection device 306. The construction of the post-treatment device is analogous to that of the pre-treatment device, so that a further description is considered as superfluous.

The post-treatment zone 303 is followed by a second resting zone 307, as shown in FIG. 6. In the embodiment shown, this second resting zone 307 extends over fourteen feeding places 156. At the transition to the second resting zone 307, inside the annular feed platform 151, there is arranged a roughage supply station 308 that supplies a portion of roughage to an occupied feeding place 156 analogously to the feed supply station 200 as described with reference to FIG. 11*b*. The portion size of the roughage is attuned to the expected eating rate of the cow (on the basis of historical data) and the expected length of stay of a cow in the second resting zone. It is pointed out that in different places along the inner circumference of the feed platform the supporting structure 166 may be designed in such a way that the weight of the feed present in a feed trough 163 can be determined. On the basis thereof the feed consumption and consequently the eating rate of a cow can be determined in a simple manner. It may also be ensured that at a transition between zones, for example the transition to the second resting zone, the concentrate present is removed from the feed trough 163 by tilting the feed trough 163 and is collected and possibly processed by a suitable device. The second resting zone 307 is dimensioned in such a way that it is expected that the orifices of the teats of a cow will close at least for the greater part. When a cow is present in the second resting zone 307, where the time required for the closing of the teat orifices (on the basis of historical data) is longer than the time required by the feed platform 151 to pass through the second resting zone 307 at a normal speed of movement, the speed of movement can be reduced temporarily. The closing of the teat orifices may be promoted, if desired, by blowing cold air on the teats, which air is for example approximately 5° C. to 10° C. colder than the ambient air. There is provided a protection that prevents spraying of too cold air, which would be harmful to the teats. Therefore, the invention also relates to a method of performing a post-treatment of the teats of a cow after the milking of a cow, which method comprises the step of blowing fresh air on the teats of a cow.

In the embodiment shown in FIG. 6, there is arranged a stationary leg-treatment device 309 at the outer circumference of the feed platform 151. Said leg-treatment device may comprise for example a stationary spraying device which is activated by default when an occupied feeding place passes the sprayer. Alternatively, the spraying device may be provided with a device for detecting the contamination of a leg of a cow or the condition of a leg, and performing a leg-treatment in dependence thereon. In this case, for example adding particular fluids or medicaments may be taken into consideration.

The second resting zone 307 is followed by the platform portion 181 where the cow can leave the feed platform 151 via the exit 182. The exit 182 is sufficiently wide to allow several cows simultaneous exit and is free from closing means.

Figure 14:
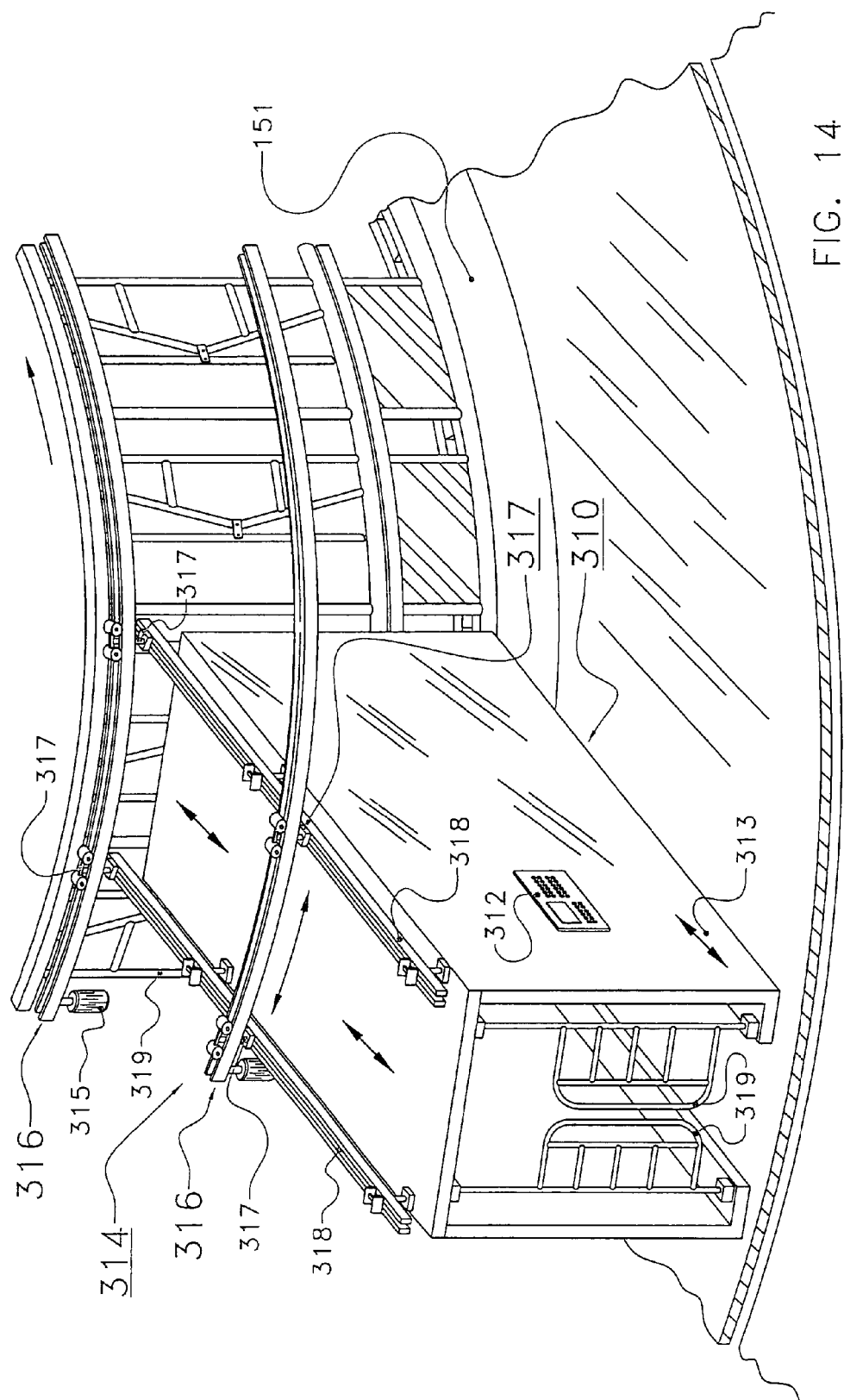
FIG. 14 shows diagrammatically in a perspective view an embodiment of a separation device for an assembly according to the invention.

In some cases it is desirable to separate a particular cow. As shown in FIG. 6, such a separation may take place on the feed platform 151 by means of a separation device 310 that separates a cow from the feed platform 151 to a separation area 311. An embodiment of such a separation device 310 is shown diagrammatically in a perspective view in FIG. 14. The separation device 310 is controlled by a separation control unit 312. This separation control unit 312 is suitable for receiving a separation signal indicating which cow is to be separated. This signal may originate from the milking system control unit, but may also be sent remotely to the separation control unit 312, for example by an operator of the assembly. For this purpose, the separation control unit 312 comprises a transmitter/receiver known per se. When a cow is present in the separation area 311, a signal may be supplied to the operator or to the milking system control unit.

The separation device 310 comprises a cage-like construction 313 and a displacing device 314 for the cage, so that the cage 313 can be placed over a cow. The displacing device 314 comprises a drive unit 315. The displacing device 314 is designed in such a way that the cage 313 is capable of being displaced both transversely to a usual direction of movement of the feed platform 151 and along with the usual direction of movement of the feed platform 151. In the embodiment shown, the displacing device 314 comprises a first rail 316 which extends above the feed platform 151 and, as shown, partially follows the same path as the feed platform 151. The cage 313 is movably suspended, transversely to the normal direction of movement of the feed platform 151, from a second rail 318 by means of a first suspension structure 317, which second rail 318 is suspended itself from the first rail 316 by means of a second suspension structure 319. The cage 313 is dimensioned in such a way that, when it has been placed over a cow, this cow has only little freedom of movement. After placement over the cow a possible locking of the cow at the feeding place 156 is discontinued. At the front side of the cage 313 there is provided an operable confining device (for example a sliding-door-like structure) for confining the cow. By moving the cage 313 to the outer side, the cow may be forced into the separation area 311, where the gate 319 at the rear side of the cage 313 is opened.

For an animal-friendly separation the drive unit 315 of the displacing device 314 is capable of being synchronized with the drive unit of the feed platform 151.

Figure 15:
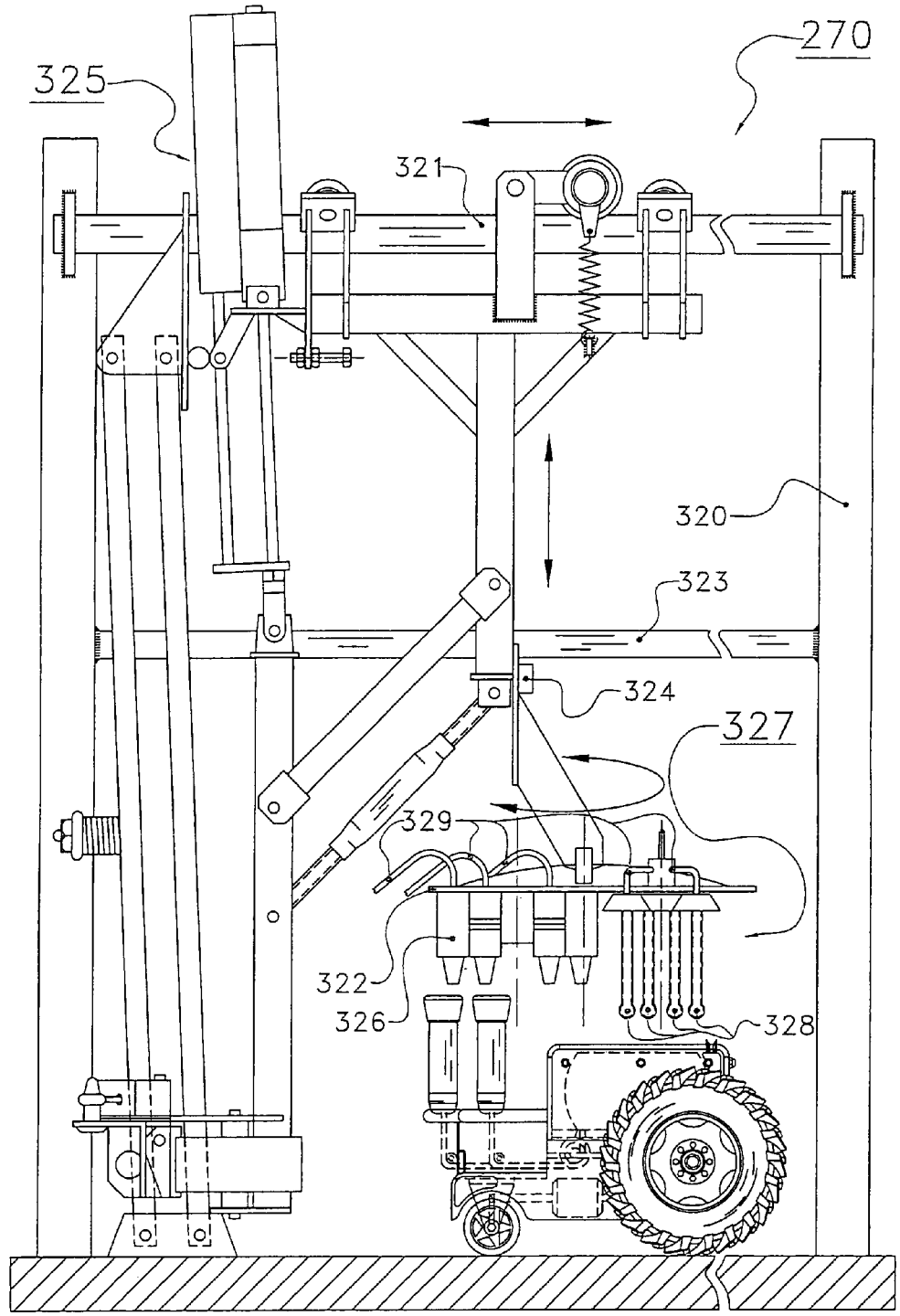
FIG. 15 shows diagrammatically in side view an alternative embodiment of a cleaning device for cleaning cups in an assembly according to the invention.

FIG. 15 shows diagrammatically in side view an alternative embodiment of a cleaning device 270 for the cleaning of cups in an assembly according to the invention. The cup cleaning device 270 comprises a carrier frame 320 for the cleaning elements. The carrier frame 320 comprises a single rail 321 (which may possibly have a curved shape) along which a carrier 322 for the cleaning elements may be moved. The carrier frame 320 comprises a beam 323 extending substantially parallel to the rail 321. A sensor 324, for example comprising a laser, is disposed on the support 322 for the cleaning elements. With the aid of this sensor 324 it is possible to determine the position of the cups to be cleaned. Furthermore, a drive unit 325 of the support 322 is preferably synchronized with the movement of the cups to be cleaned (in the case they are moving), so that the cups to be cleaned can be followed.

The cleaning elements comprise a spraying member 326 for cleaning the exterior of the teat cups and, if desired, the milk circuit connected thereto and a cleaning member 327 for cleaning only the teat space, i.e. the interior, of the teat cups. Both the spraying member 326 and the cleaning member 327 are fastened to the support 322. The cleaning device as shown in FIG. 15 is provided in a customary manner with a—non-shown—rinsing circuit. This rinsing circuit is constituted by a rinsing fluid reservoir, a rinsing fluid supply line connected thereto, which rinsing fluid supply line leads to the cleaning member 327, the rinsing circuit further being constituted by the parts of the device for automatically milking that are connected to the cleaning member 327 during rinsing, i.e. the teat cups, the milk lines connected thereto and a milk glass into which these milk lines debouch. The outlet from the milk glass is provided in a customary manner with a pump and a cock to lead the milk to a milk tank during the milking and to lead the cleaning fluid back to the rinsing fluid storage vessel during the rinsing of the teat cups, the milk lines connected thereto and the milk glass.

Through the vacuum in the milk glass and the milk lines connected to the teat cups the rinsing fluid is sucked in from the fluid storage vessel and brought into the teat cups via the cleaning member 327 and then led back to the rinsing fluid storage vessel with the aid of a pump included in the discharge line of the milk glass. In this manner known per se the teat cups and the milk lines connected thereto and the milk glass are cleaned. Each time after a cow has been milked the teat cups are cleaned in order to reduce the risk of cross-infection. The cleaning of the teat cups immediately after the milking may also take place selectively for specific cows. In particular if an increased milk conductivity value is established by milk conductivity sensors during the milking, which may be an indication of a latent mastitis, it is desirable to clean the teat cups immediately after the milking. The cleaning member 327 is used for this purpose. Said cleaning member 327 is provided with four tube-shaped elements 328. For the cleaning of a cup its position is established with the aid of the sensor 324, and the tube-shaped elements 328 are moved above the teat cups, in particular in such a way that there is provided a narrow outlet opening between the open ends of the teat cups and protecting elements that are disposed at the upper side of the tube-shaped elements 328. The tube-shaped element 328 is provided near its lower side with preferably radial outlet openings. Said outlet openings debouch into the teat space of a teat cup disposed around the tube-shaped element 328, in particular at such a distance from the open end of the teat cup that, if a teat would have been inserted into the teat cup, the insertion depth of this teat is less far than the place where the outlet openings debouch into the teat space. The lower end of the tube-shaped element 328 has such a shape that, when a vacuum is applied to the milk line connected to the teat cup, the teat liner, which is made of a flexible material, is sucked in, in particular in such a way that the outlet from the teat space to the milk line connected to the teat cup is closed below the lower end of the tube-shaped element. The tube-shaped element 328 is connected at its upper end to a cleaning fluid supply line 329. When solely the teat cup, i.e. the teat cup liner, is to be cleaned, a tube-shaped element 328 is inserted into a relevant teat cup, after which by applying a vacuum in the milk line connected to the teat cup, air is sucked off as a result of which the teat cup is closed near its lower side, i.e. below the end of the tube-shaped element 328, so that, when cleaning fluid is led via the cleaning fluid supply line 329 through the tube-shaped element 328, this fluid is pressed upwards via the outlet openings and is discharged outwards through the outlet opening via the open end of the teat cup and the relatively narrow space between the upper side of the teat cup and the protecting element. This cleaning may take place with the aid of heated water having a temperature of above 70° C. and preferably above 80° C., so that the bacteria present on the teat cup liner inside the teat cup are killed. It is also possible to use a cleaning fluid, constituted by water having a temperature between 30° C. and 50° C., to which a cleansing agent and/or a disinfectant have/has been added. In that case, after the teat cup has been cleaned with the afore-mentioned cleaning fluid, the teat cup should be rinsed with the aid of pure mains water, after which the teat cup is dried by pressing air through the line and the tube-shaped element 328. During this cleaning the cleaning elements move along with the teat cups (if the latter should move).

The spraying member 326 comprises four spraying nozzles, each of which being provided near its lower side with preferably radially orientated outlet openings, via which a cleaning fluid is directed towards the exterior of the teat cups. The spraying nozzles may be designed, if desired, as rotatable and/or controlled ones.

After the cows have left the feed platform 151 via the exit 182, the feed platform 151 is cleaned by a stationarily arranged cleaning device 330, as shown in FIG. 6. The cleaning device 330 is active in the area between the transitions 185 and 184 and cannot be boarded by a cow. Consequently, the cleaning device 330 is disposed, viewed in the direction of movement of the feed platform 151, between the exit 182 and the entrance 153. Some components of the cleaning device 330 are surrounded by a cleaning area 331 which is accessible to an operator via a door 332.

Figure 16A:
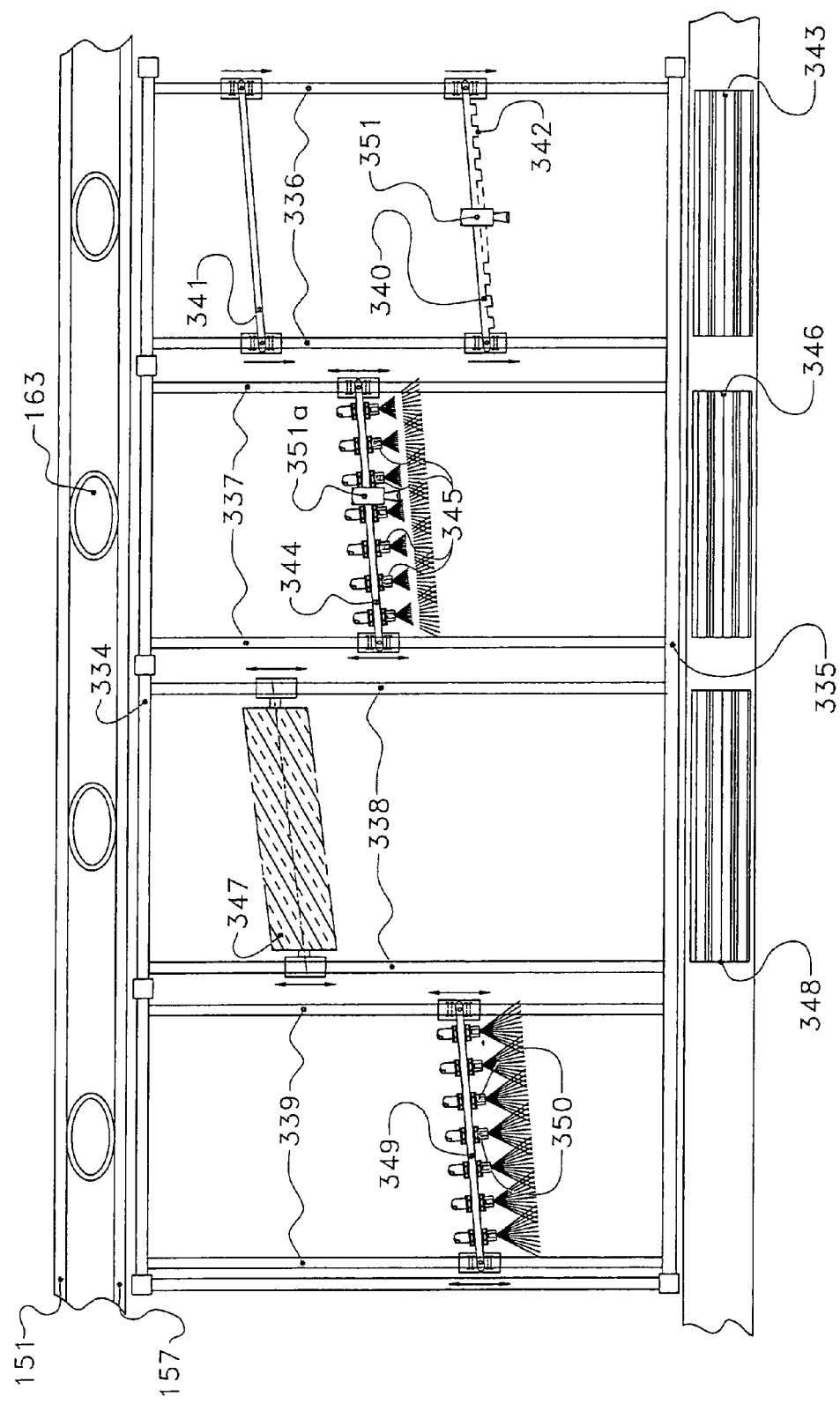
FIG. 16a shows diagrammatically in plan view an embodiment of a cleaning device for cleaning a feed platform of an assembly according to the invention.
Figure 16B:
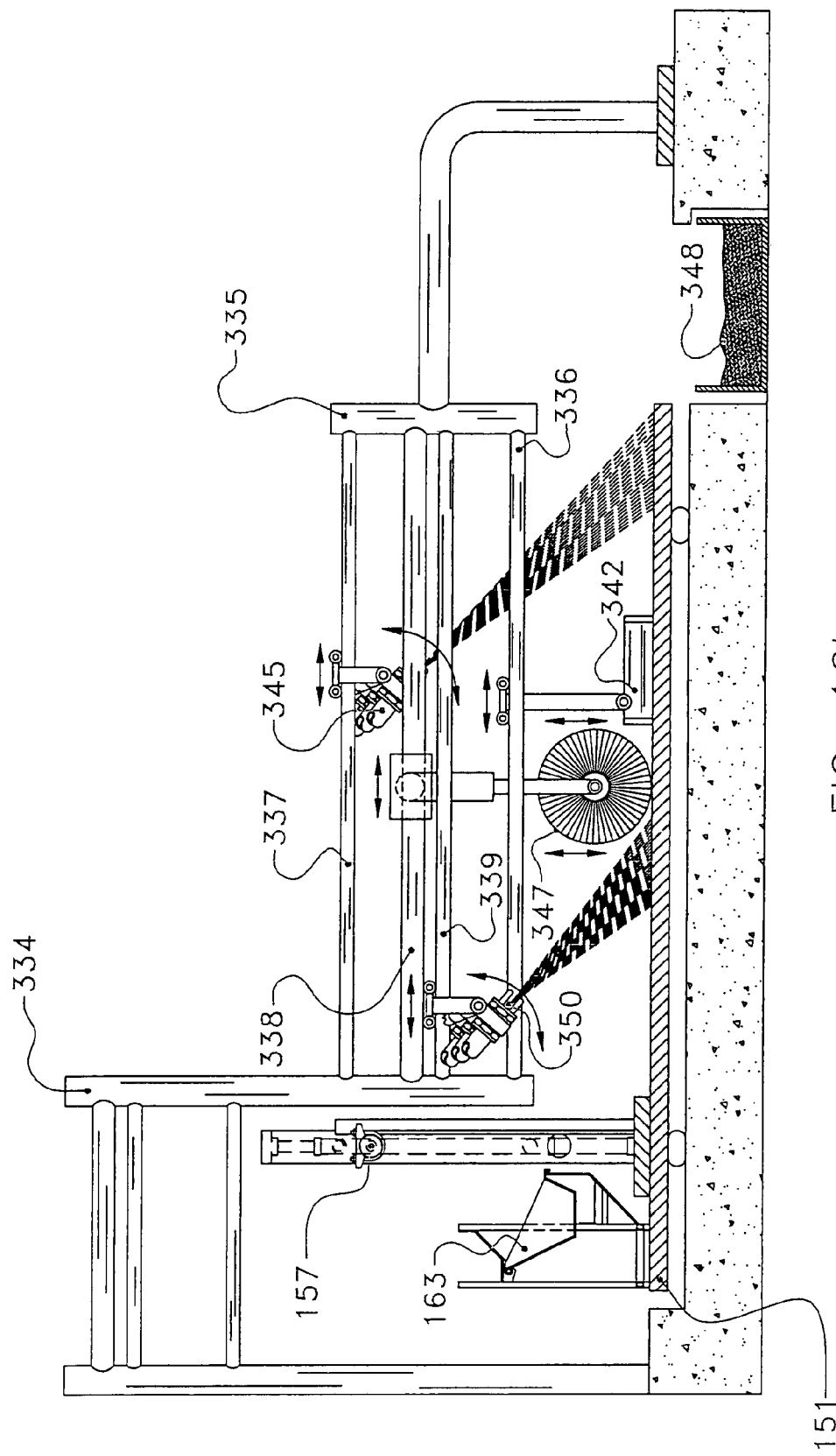

The cleaning device 330 is controlled by a cleaning control unit 333, as shown diagrammatically in FIG. 6, so that the cleaning device 330 can be active fully automatically. With reference to FIGS. 16a and 16b an embodiment of the cleaning device 330 will be explained in further detail.

The cleaning device 330 as shown in FIGS. 16a and 16b has a width of four feeding places 156. The cleaning device 330 may be suspended from a ceiling of a stable in which the assembly is located or may be arranged on the floor of the stable by means of a suitable support. In particular if the feed platform 151 is free from confining means for confining cows, the constructional design of the cleaning device 330 may be simple. In the embodiment shown, the cleaning device 330 is provided with two carrying bars 334, 335 extending at least substantially parallel to each other and parallel to the usual direction of movement of the feed platform 151. In the embodiment shown, the carrying bars 334, 335 extend as straight ones, but they may alternatively be curved. The carrying bars 334, 335 are interconnected by four pairs of sliding bars 336, 337, 338, 339 extending substantially transversely to the normal direction of movement of the feed platform 151. Two manure slides 340, 341 are disposed one behind the other between the first pair of sliding bars 336. The manure slides 340, 341 are slidable independently of each other along the sliding bars 336, and are capable of being brought into contact with the feed platform 151. The first manure slide 340 is provided with tines 342 or other projections in order to be able better to detach impurities from the feed platform 151. The manure slides 340, 341 are each arranged under an angle relative to the usual direction of movement of the feed platform 151. For the sake of simplicity of the drawing, the drive unit of the manure slides 340, 341 is not shown, but is designed in such a way that the manure slides are moved away from the feed troughs 163, so that the manure slides 340, 341 slide manure into a manure collecting device 343. When moving back the manure slides 340, 341, they are first moved upwards, so that they do not contact the feed platform 151. Furthermore, the manure slides 340, 341 are cleaned by a (non-shown) spraying device when they are located above the manure collecting device 343.

Between the second pair of sliding bars 337 there is disposed a movable spraying device 344 comprising a number of juxtaposed sprayers 345 for spraying and/or squirting a fluid on the feed platform 151. The fluid is sprayed on the feed platform 151 under high pressure by means of a non-shown pump. The fluid may be heated periodically by a heating element in order to obtain a better cleaning. The spraying device 344 is moved across the feed platform 151 by a non-shown drive unit in a direction away from the feed troughs 163, so that the fluid is sprayed in a direction of a fluid collecting device 346. In order to prevent that fluid is unintentionally moved sidewards, the sliding bars 337 are provided at their lower sides with splash guards extending as far as the feed platform 151. The fluid collecting device 346 is provided with a reuse device known per se for making the fluid suitable for reuse. It is pointed out that the cleaning control unit 333 preferably activates the sprayers 345 only when they are moved away from the feed troughs 163 and deactivates them when they are moved towards the feed troughs 163.

Between the third pair of sliding bars 338 there is disposed a movable, rotatable cleaning brush 347 which is also capable of being brought into contact with the feed platform 151. The cleaning brush 347 is also capable of being moved away from the feed troughs 163 in the direction of a residual impurities collecting device 348, and is moved from contact with the feed platform 151 before the cleaning brush 347 is moved back to the feed troughs 163. The cleaning brush 347 is arranged under an angle relative to the usual direction of movement of the feed platform 151.

Between the fourth pair of sliding bars 339 there is provided a movable drying device 349 comprising juxtaposed blow nozzles 350 for drying the feed platform 151. The drying device 349 is movable across the feed platform 151 in a direction transversely to the normal direction of movement, and is disposed under an angle relative to said direction of movement. The air blown through the blow nozzles 350 may be pre-heated under the control of the control unit 333. It will be obvious that other drying devices, such as heat radiating devices and the like, may be applied as well within the scope of the invention.

It is pointed out that each of the collecting devices is provided with an outlet for discharging impurities. Furthermore, in the embodiment shown, there are provided some cameras 351, 351a for determining the degree of contamination of the platform. The contamination detected by the cameras 351, 351a may be used by the cleaning control unit 333 for controlling the functioning of the cleaning device 330.

Figure 17:
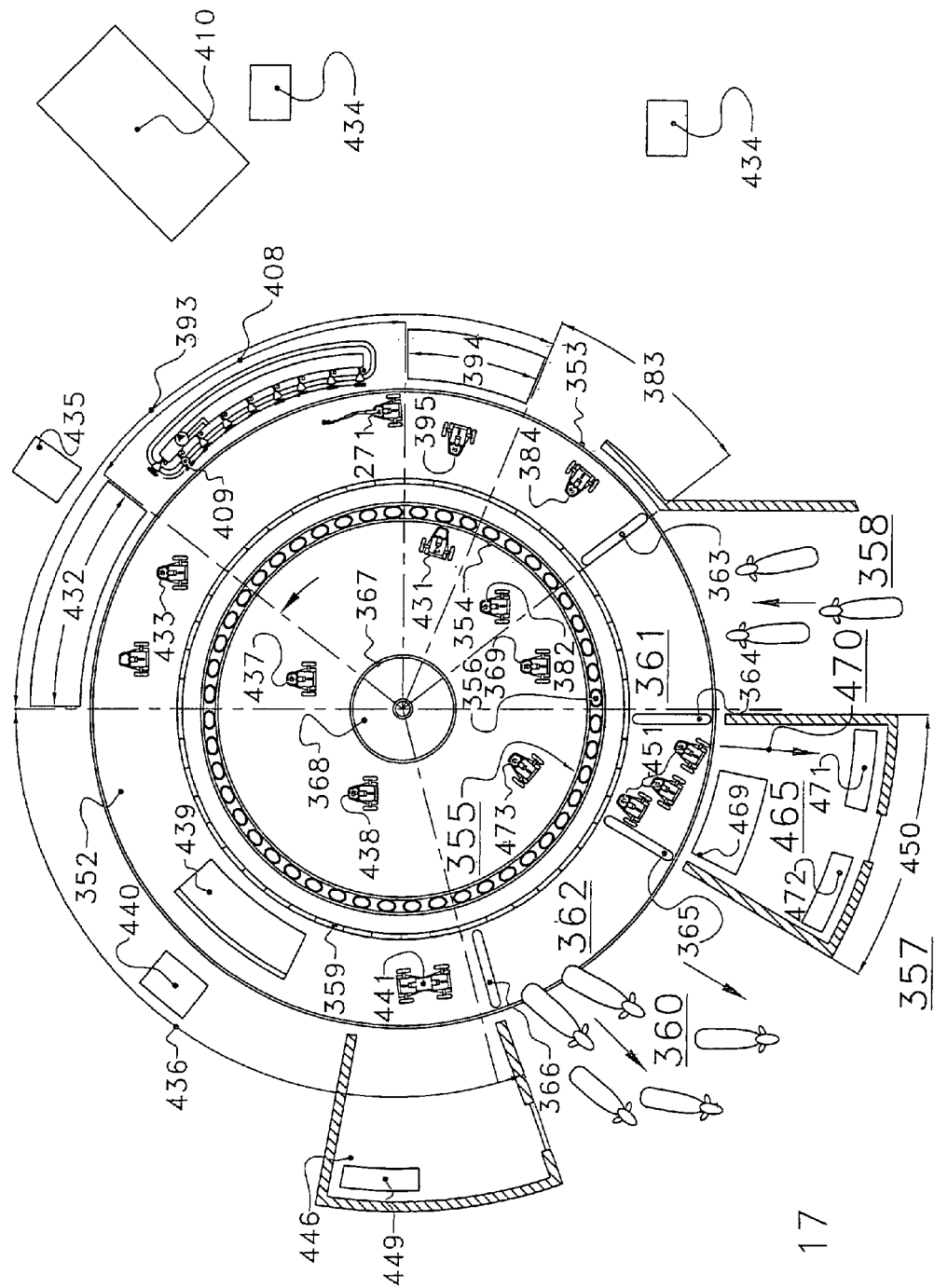
FIG. 17 shows diagrammatically in plan view a further embodiment of an assembly according to the invention, in which the feed platform co-operates with inter alia freely movable teat cup carriers.

FIG. 17 shows diagrammatically in plan view a further embodiment of an assembly according to the invention, in which an annular feed platform 352 co-operates with inter alia freely movable teat cup carriers, as will be explained hereinafter in further detail. The movable feed platform 352 has an outer edge 353 and an inner edge 354. The feed platform 352 comprises feeding places 355 with feed troughs 356 located at the inner edge 354 of the feed platform 352. The feed platform 352 is free from confining means for confining cows.

In an area 357 the cows are allowed to move freely. Via an entrance 358 the cows are allowed to walk from the area 357 to the feed platform 352. The entrance 358 has a width that is sufficiently large to enable simultaneous access of several cows to the feed platform 352, and is free from a closing device. The feed platform 352 is free from sets of teat cups.

In the embodiment shown in FIG. 17 there is provided a locking feeding gate 359 for locking a cow at a feeding place 355. Although the locking feeding gate 359 may be a self-closing locking feeding gate known per se, the locking feeding gate 359 according to this embodiment is controlled by a locking control unit 158 (see FIG. 7b) for controlling the locking feeding gate 359. The locking function of the locking feeding gate 359 is capable of being activated and deactivated by the locking control unit 158. The locking control unit 158 obtains data from cameras 159 (see FIG. 7a) which detect whether a cow is eating at a feed trough 356. Alternatively, the locking control unit may obtain information for activating the locking function from animal-recognition units which are disposed per feed trough and which are capable of determining whether a cow is present at a feed trough. Furthermore, a weighing device for weighing feed in the feed trough, which weighing device is capable of supplying information about whether or not feed is consumed from a feed trough, may be applicable within the scope of the invention for supplying information to the locking control unit. It will be obvious that within the scope of the invention other forms of locking a cow at a feeding place may be applied as well, a neck-locking being in particular preferable for the purpose.

The constructional design of the feeding places 355 is equal to that described with reference to FIGS. 8a to 8g. As shown in FIG. 17, the feed platform 352 has platform portions 361, 362 that are each time adjacent to the entrance 358 or the exit 360. Said platform portions 361, 362 are no fixed portions on the feed platform 352, but are those portions of the feed platform 352 that are adjacent to the entrance 358 and the exit 360. Viewed in the direction of rotation of the feed platform 352 and opposite to the direction of rotation of the feed platform 352, said platform portions 361, 362 have transitions 363, 364, 365, 366 at their ends. Analogously to the embodiment as described with reference to FIG. 6, each transition is provided with a deterring device for deterring a cow from crossing a relevant transition.

Figure 18:
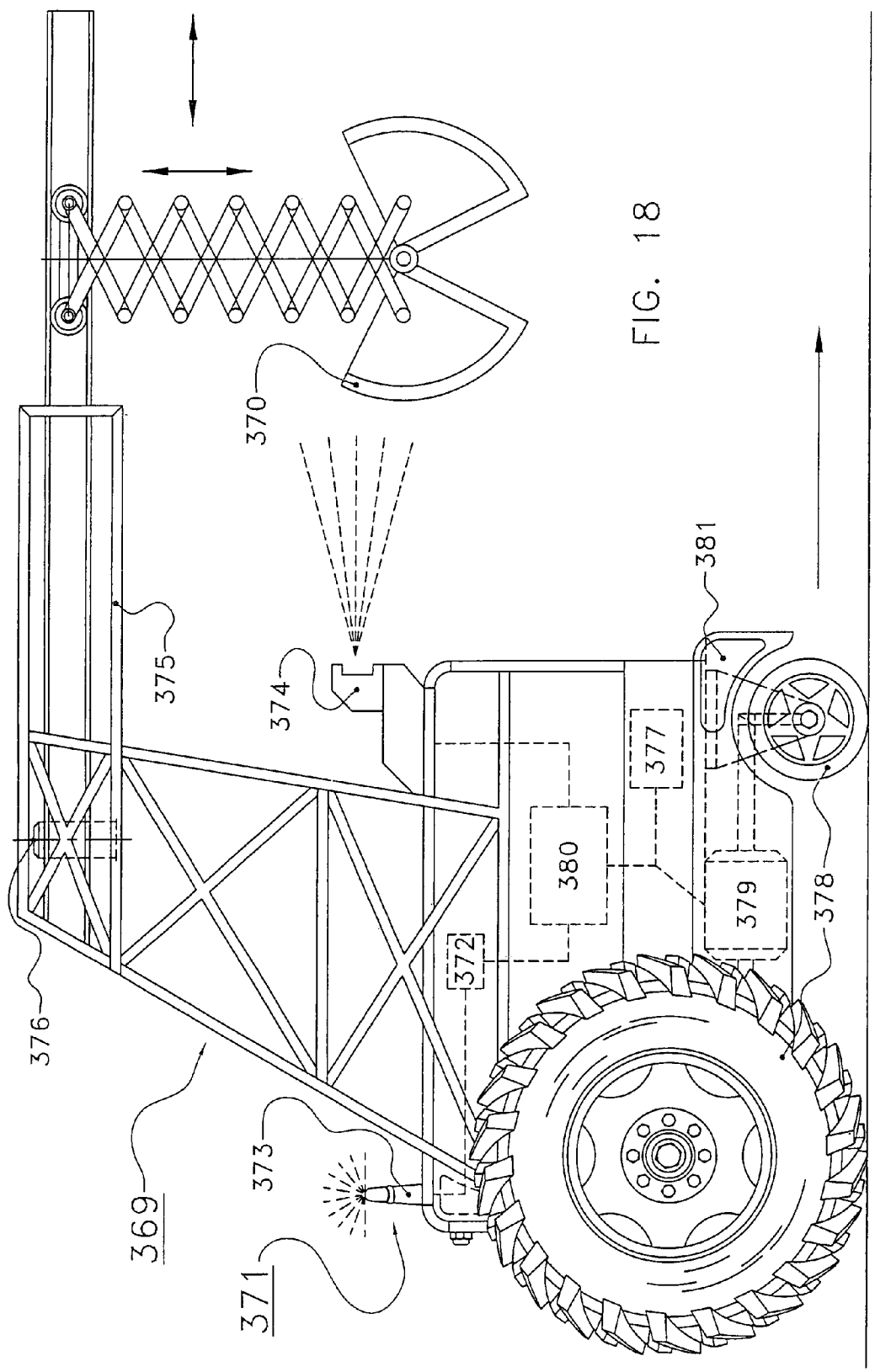
FIG. 18 shows diagrammatically in side view an autonomous feed supplying robot.

Centrally inside the annular feed platform 352 there is arranged a feed silo 367 comprising several feed storage containers 368 disposed around a central axis. Each feed storage container 368 may contain a different sort of feed. Each feed trough 356 is provided by a feed supply station 369 with a minimum amount of roughage before the feed trough 356 is located opposite the entrance 358. In the embodiment shown, the feed supply station 369 comprises a self-propelled (autonomous) mobile feed supplying robot 369, as will be explained in further detail with reference to FIG. 18.

The feed supplying robot 369 is suitable for gripping, with the aid of a movable feed gripper 370, a particular amount of feed from a feed storage container 368 and for conveying it to a feed trough 356. According to the invention, the mobile feed supplying robot 369 is a self-propelled (i.e. autonomous) robot, which means that the robot has the possibility of choosing freely in which direction it is going to move. This implies that the robot is not only capable of moving in a reciprocating manner via rails or the like. For moving and controlling the mobile feed supplying robot 369 there is provided a (non-shown) feeding system control unit. This control unit receives information from navigation means that are partially disposed in the feed supplying robot 369. These navigation means comprise position determining means 371 for determining the position of the mobile feed supplying robot 369 in the assembly. Such position determining means 371 are known per se and are not described in further detail for the sake of simplicity. There is only depicted an aerial 373, which is connected to an internal control unit 372. The mobile feed supplying robot 369 further comprises an orientation device 374 in the form of an ultrasonic sensor for monitoring the environment immediately in front of the robot 369. Under the control of the feeding system control unit the feed supplying robot 369 is moved to a relevant feed trough and, by opening the feed gripper 370, drops the minimum portion of roughage into said feed trough. In order to be able to supply the feed more correctly, a carrying arm 375 for the feed gripper 370 is rotatably disposed about an axis of rotation 376, the rotation being synchronized with the movement of the feed platform.

Furthermore, the mobile feed supplying robot 369 is provided with its own energy supply 377, in particular a rechargeable energy supply, which will be explained hereinafter in further detail. In the embodiment shown, the mobile feed supplying robot 369 is provided with wheels 378 that are driven by an electric motor 379 which is driven under the control of a microprocessor 380 that receives data from the position determining means 371 and the orientation device 374.

In order to prevent damage caused by collisions, the mobile feed supplying robot 369 is provided with a proximity detector, in the embodiment shown constituted by the orientation device 374, for detecting the proximity of an object. When an object comes too near and a collision threatens to take place, then a protecting device 381 for protecting at least a part of the robot 369 can be brought from an inactive position into an active protecting position. In this case inflatable or shiftable protecting means may be used. Bringing a protecting device from an inactive position into an active protecting position is controlled with the aid of data from the proximity detector 374. Such a proximity detector is known per se and may alternatively comprise a camera, an approach sensor or the like.

The mobile feed supplying robot 369 is further provided with a malfunction detector (known per se and not shown in the drawing) for detecting an internal malfunction. In case of an occurring or expected malfunction, an alarm-signal-issuing device can issue an alarm signal.

As will be described hereinafter in further detail with reference to FIG. 25, the assembly comprises cameras (or comparable following means) for monitoring the assembly and following mobile units (in particular cows and mobile robots) in the assembly. Such cameras with associated software in the computer system can be used for monitoring the assembly, and for identification, orientation and position determination of the mobile units in the assembly.

Analogously to the embodiment as shown in FIG. 6, each feed trough 356 is provided with a (non-shown) animal-recognition unit. When, as described in the foregoing, a cow has boarded the platform portion 361 and is eating at a feed trough 356 and is locked there, a further mobile feed supplying robot 382 (or, if available, feed supplying robot 369) is controlled in such a way that a complete portion of roughage is supplied to that cow (the size of the portion being individually adaptable, if desired). It is pointed out that the complete portion of roughage is not only dependent on the identity of a cow, and in particular her feed consumption rate, but also on the length of the first resting zone that follows the entrance, as will be described hereinafter. The size of the portion is attuned in such a way that it may be expected that the cow will eat her portion at least almost completely when she is present in that first resting zone.

When a cow has crossed the transition 363, she enters a first resting zone 383. In the embodiment shown, the first resting zone 383 covers four feeding places 355, and the span of time a cow spends on the feed platform 352 in the first resting zone 383 is dependent on the speed of movement of the feed platform 352. In the embodiment shown, the span of time in which a cow passes through the resting zone amounts to approximately 3 minutes and 20 seconds. In this span of time the cow is not milked and, in this embodiment, there is only performed a soaking treatment on the udder and the teats by means of an autonomous, freely moving soaking robot 384, which will be described in further detail with reference to FIG. 19. Near the first resting zone 383, beside the feed platform 352, there is arranged a recharging and storage station 434 towards which the soaking robot 384 moves for recharging the energy supply 377 and for replenishing the stock of soaking fluid.

Figure 19:
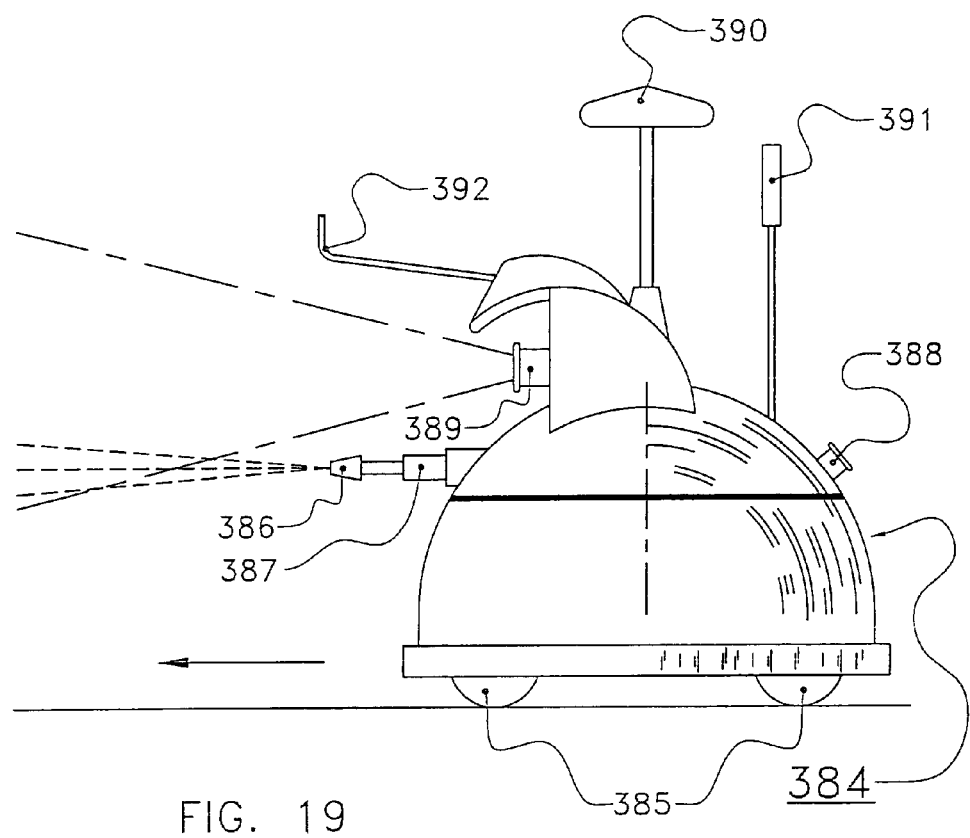
FIG. 19 shows diagrammatically in side view an embodiment of a mobile soaking robot of a milking system of an assembly according to the invention.

FIG. 19 is a side view of the unmanned, autonomous soaking robot 384, which is provided with wheels 385. The wheels 385 are driven by a (non-shown) drive unit, such as an electric motor. In the present embodiment, the soaking device of the soaking robot 384 comprises a sprayer 386 disposed for example on a telescopic carrier 387. The sprayer 386 is connected to a container (not shown in FIG. 19) for containing soaking fluid, which container is located in the soaking robot 384. The soaking robot 384 is also provided with a filling connection 388, or another connection device, by means of which the container in the soaking robot 384 can be connected to an external source of soaking fluid. Furthermore, means 389 for determining the position of the teats and/or the udder of a cow are not described in further detail because they belong to the state of the art, for example the position determining means as used with milking robots for connecting the teat cups to the teats. The soaking robot 384 comprises an identification system, i.e. an animal-recognition unit, 390 known per se for identifying a cow. The information obtained by the identification system may be used for designating those cows whose teats and/or udder are to be treated with soaking fluid. The soaking robot 384 is provided with a position determining device 391, which may be a radar, a GPS-system component or the like. This makes it possible to determine the momentary position of the soaking robot 384. In order to move quickly to the location of a cow whose teats and/or udder are to be treated with soaking fluid, the feeding system control unit comprises a (non-shown) transmitting device for transmitting location data to the soaking robot 384. The soaking robot 384 is provided with a receiving device which, in the embodiment shown, is integrated in the position determining device 391 for receiving the location data, which data are used for (roughly) moving the soaking robot 384 to the location. A further description of the control of the mobile vehicle is omitted here for the sake of simplicity, the more as self-propelled mobile vehicles are known per se in the state of the art. It is pointed out that, besides wheels, other propelling means, such as caterpillar tracks and the like, may be applied as well within the scope of the invention.

When the soaking robot 384 has arrived at a cow whose teats and/or udder are to be treated with soaking fluid, the soaking robot 384 first determines the position of the teats and/or udder. In the embodiment shown, for this purpose the soaking robot 384 comprises accurate teat position determining means 389 in the form of picture-recognition equipment. If there is not provided a locking feeding gate, this picture-recognition equipment may be used, if desired, for verifying whether a cow is standing or lying. If a cow appears to be lying, it is possible to stimulate the cow, for example by means of a stimulation device 392, to stand up, so that the teats and/or the udder become accessible to treatment.

When the position of the teats and/or the udder has been determined, the sprayer 386 may be directed to the teats and/or the udder and be put into operation. Directing the sprayer 386 may take place by correctly operating the wheels 385 or by moving the sprayer 386.

The position determining means 389 with the picture-recognition equipment may also be used to check whether soaking fluid has been applied to the teats and/or the udder of the cow. If it appears that no or not sufficient soaking fluid has been applied, a signal may be issued, so that the sprayer 386 is put into operation again. Besides a camera for picture recognition, an infrared camera may also be used as a checking device. In order to bring the checking device close to the teats and/or the udder, said device is preferably disposed on a telescopic carrier (not shown in the figures).

If the points of time when the teats and/or the udders of cows have been soaked and the identity of the relevant cows are stored in a memory, these historical data may be used partially for determining the point of time when the next soaking step is to be carried out on a particular cow. These data may also be used for determining the cow whose teats and/or udder have to be soaked first. The animal-recognition unit may also be used for applying a soaking fluid in dependence on the cow. For this purpose, the soaking robot 384 comprises several soaking fluid containers.

After having passed through the first resting zone 383 (FIG. 17) the cow enters the first zone of the milking zone 393, which first zone is called the pre-treatment zone 394. In the embodiment shown, said pre-treatment zone 394 covers three feeding places 355. In said milking pre-treatment zone 394 concentrate attuned to the cow is supplied, under the control of the feeding system control unit, to the relevant feed trough 356 by means of the feed supplying robots 431 that are analogous to the feed supplying robot 382. In said pre-treatment zone 394 a cow is subjected to a pre-treatment. Such a pre-treatment is known per se and comprises cleaning and/or massaging and/or stimulating the teats of a cow. In the embodiment shown diagrammatically in side view in FIG. 20, a mobile pre-treatment robot 395 comprises a first brush 396 and a second brush 397 that are each rotatable about an at least substantially horizontal axis 398, 399. The pre-treatment robot 395 is provided with wheels 400. The wheels 400 are driven by a drive unit 400a, such as an electric motor. The pair of brushes 396, 397 is movable in height by means of a lifting device 401 comprising a cylinder 402. Moreover, the pair of brushes 396, 397 is rotatable about a vertical axis 403 for the purpose of being positioned in a correct position relative to a teat of a cow. The pre-treatment robot 395 comprises a fluid container 404, a pump 405 and a line 406 for spraying, if desired or if necessary, a fluid on the teats of a cow. In the embodiment shown, the line 406 ends below and between the brushes. The fluid container 404 is provided with a non-shown filling connection by means of which the container 404 is capable of being connected to an external source of fluid. Furthermore, means 407 for determining the position of the teats and/or the udder of a cow are not described in further detail, since they belong to the state of the art, for example the position determining means as used with milking robots for connecting the teat cups to the teats. The pre-treatment robot 395 comprises a non-shown animal-recognition unit, known per se, for identifying a cow. The information obtained by the animal-recognition unit may be used to designate those cows that are to be milked and whose teats and/or udder are to be pre-treated. Analogously to the soaking robot 384 of FIG. 19, the pre-treatment robot 395 is provided with a (non-shown) position determining device, which may be a radar, a GPS-system component or the like. This makes it possible to determine the momentary position of the pre-treatment robot 395. In order to move quickly to the location of a cow whose teats and/or udder are to be pre-treated, the milking system control unit comprises a (non-shown) transmitting device for transmitting location data to the pre-treatment robot 395.

When the pre-treatment robot 395 has arrived at a cow to be pre-treated, the position of the teats and/or the udder is determined by the teat position determining means 407. When the position of the teats and/or the udder has been determined, the pair of brushes can be set in rotation and be moved upwards to the teats and/or the udder, so that the teats are cleaned and stimulated between the brushes. If desired, a fluid may be applied to the teats in dependence on the cow. The position determining means 407 may also be used to check whether the pre-treatment has been performed correctly. If this appears not to be the case, there may be supplied a signal so that the pre-treatment is performed again. It is pointed out that the milking pre-treatment robot is capable of moving to the recharging and storage station 434 that is arranged near the first resting zone 383. This station is also provided with a stock of fluid for the pre-treatment, in order to be able to replenish the robot container.

Figure 21A:
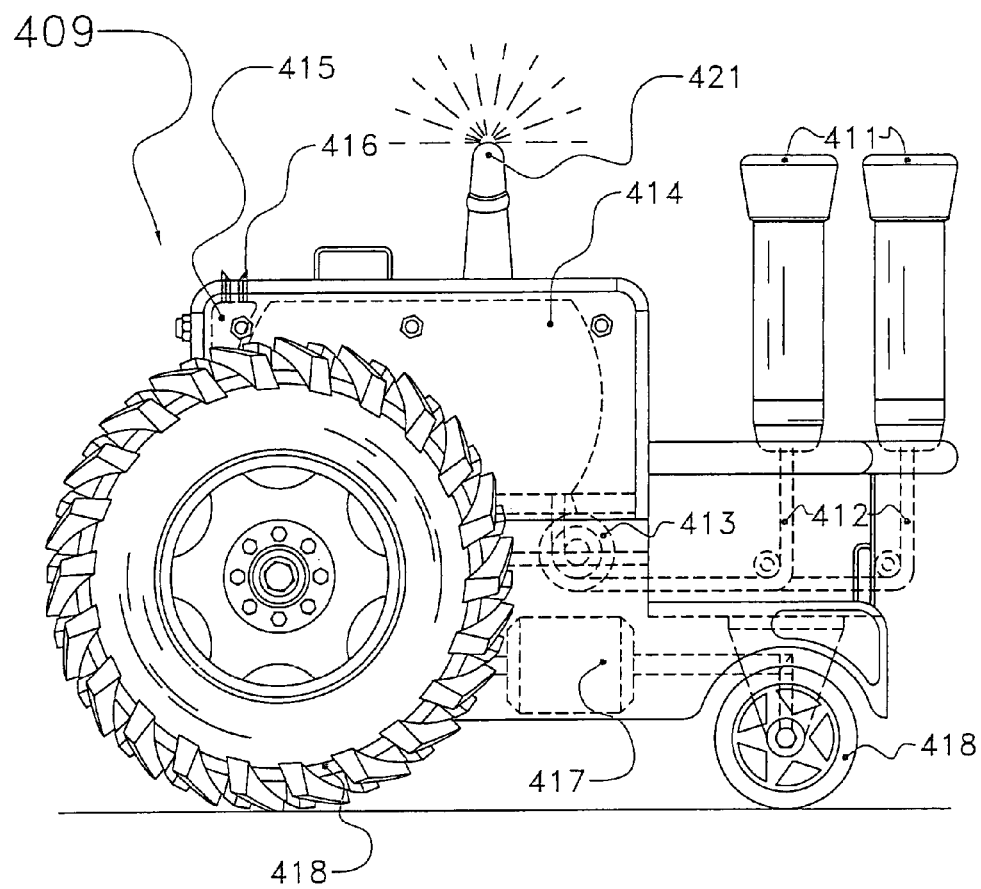
FIG. 21a shows diagrammatically in side view an embodiment of an autonomous, mobile teat cup carrying robot of a milking system of an assembly according to the invention.

After having passed through the pre-treatment zone 394, the cow enters the main milking zone 408 (FIG. 17) where teat cups that are arranged separately from the feed platform are connected to the teats of the cow. In the embodiment shown, the main milking zone 408 covers seven feeding places 355. In the embodiment explained in further detail in FIG. 21*a*, the teat cups are carried by an autonomous, mobile teat cup carrying robot 409. A number, four in the embodiment shown in FIG. 17, of these teat cup carrying robots 409 are capable of moving freely beside the feed platform 352. The path shown in FIG. 17 is only an indication of the optimum route for connecting the teat cups to be followed by the teat cup carrying robots 409. If necessary, the teat cup carrying robots 409 are also capable of moving to a multifunctional station 410 comprising inter alia a teat cup cleaning unit where the teat cups can be cleaned, a milk tank for collecting the milk obtained, and a recharging station for recharging, via a charging port 416, a rechargeable energy supply 415 of the teat cup carrying robot 409. The teat cup carrying robot 409 is shown in side view in FIG. 21*a*. In the embodiment shown, the mobile teat cup carrying robot 409 carries four teat cups 411, two of which are visible in the figure. The teat cups 411 are each connected via a teat cup line 412 to a milk storage vessel 414 to which the milk is conveyed with the aid of a vacuum pump system 413. The teat cup carrying robot 409 is provided with wheels 418. The wheels 418 are driven by a drive unit 417, such as an electric motor. The milk storage vessel 414 is provided at its lower side with a non-shown milk outlet through which the milk can be conveyed to a milk tank. Analogously to the soaking robot of FIG. 19, the teat cup carrying robot 409 is provided with a (non-shown) position determining device, which may be a radar, a GPS-system component or the like. This makes it possible to determine the momentary position of the teat cup carrying robot 409. The teat cup carrying robot 409 comprises a transmitting/receiving device 421 for transmitting and receiving location data and control commands, as will be explained hereinafter in further detail.

Figure 20:
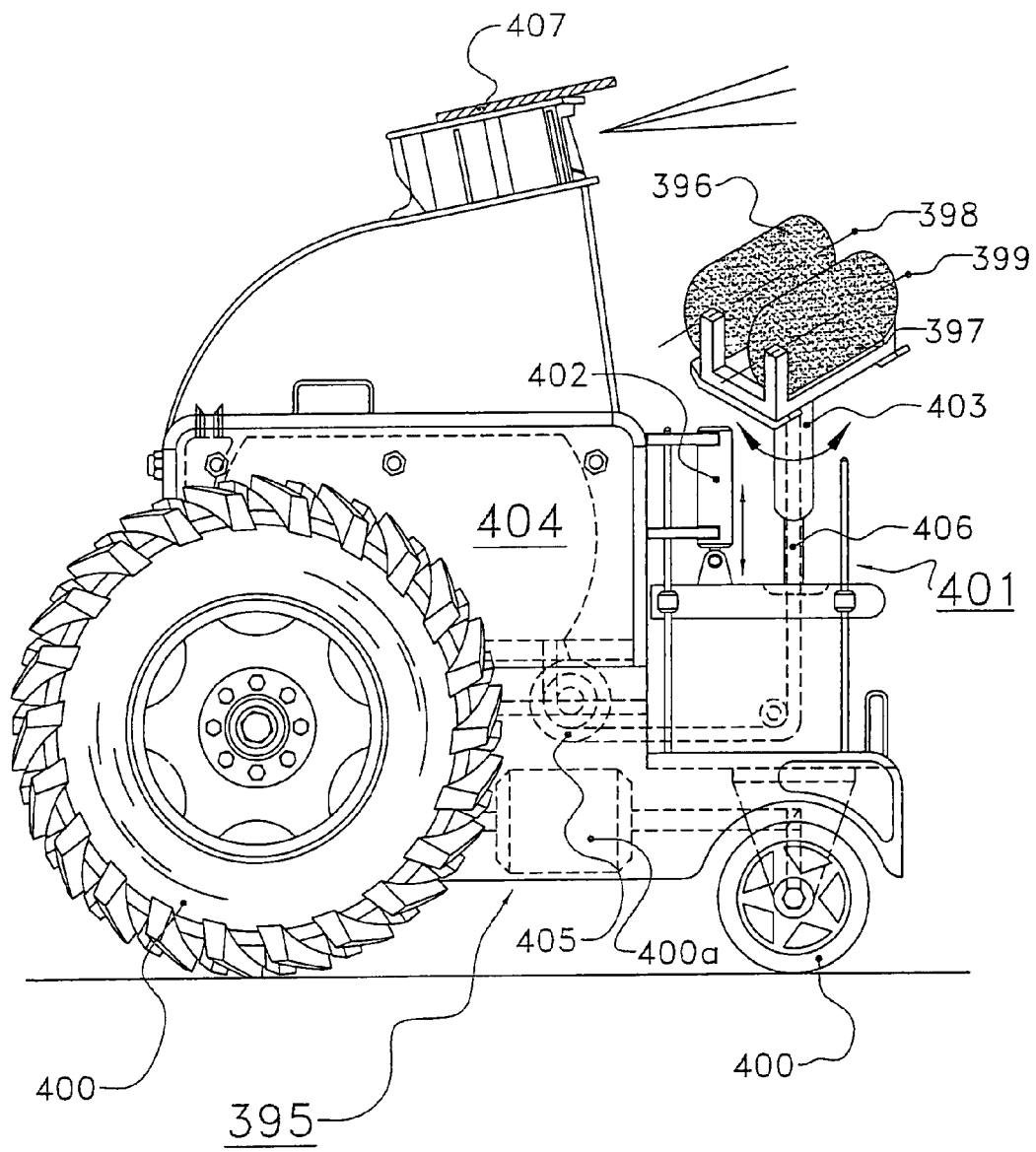
FIG. 20 shows diagrammatically in side view a first embodiment of a mobile pre-treatment robot of a milking system of an assembly according to the invention.
Figure 21B:
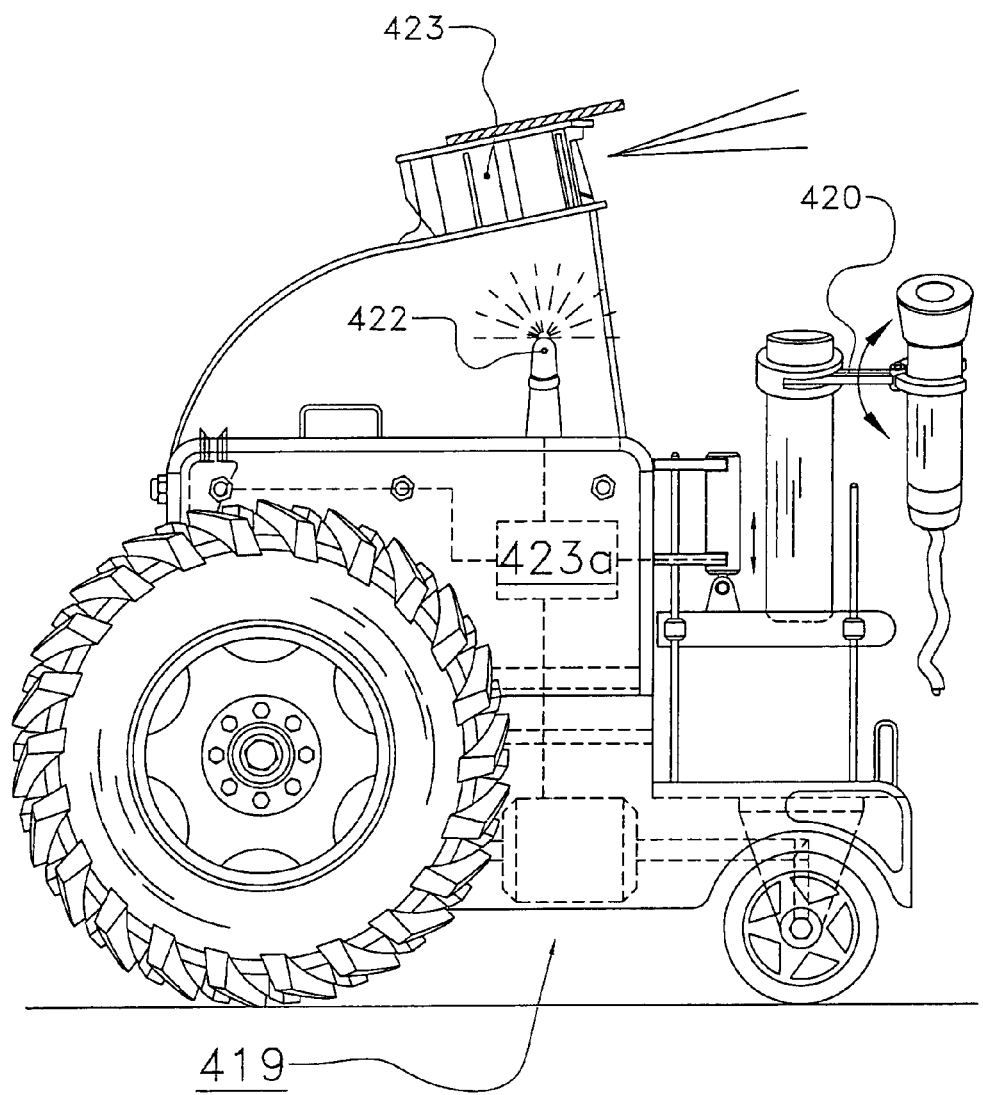
FIG. 21b shows diagrammatically in side view an embodiment of an autonomous, mobile teat cup connecting robot of a milking system of an assembly according to the invention.

As indicated in FIG. 17, in the embodiment shown, the milking system also comprises a mobile, autonomous teat cup connecting robot 419 which is shown in further detail in FIG. 21*b*. The teat cup connecting robot 419 is analogous to the pre-treatment robot 395 as shown in FIG. 20, but comprises, instead of a pair of brushes, an upwardly movable teat cup gripper 420. Furthermore, the teat cup connecting robot 419 does not comprise a milk storage vessel. A transmitting/receiving device 422 is suitable for receiving data from the milking system control unit and is connected to a control unit 423*a*, which does not only ensure the control of the displacement of the mobile teat cup connecting robot 419, but also controls the functioning of the teat cup gripper 420. With the aid of the transmitting/receiving devices 421, 422 the teat cup connecting robot 419 and the teat cup carrying robot 409 are able to co-operate. The teat cup connecting robot 419 is moved to the position of a cow to be milked. This is possible by displacement across the feed platform 352 or beside the feed platform 352. At the same time the teat cup carrying robot 409 is moved to a position near the teat cup connecting robot, so that the teat cup gripper 420 of the teat cup connecting robot 419 is able to grip the teat cups 411 carried by the teat cup carrying robot 409. For this purpose there is made use of the position determining means 423 that detect the position of the teat cups 411 on the teat cup carrying robot 409 and move the teat cup gripper 420 in such a way that the teat cups are gripped. The teat cup carrying robot 409 and the teat cup gripper are then moved in such a way that a teat cup is located under a teat, after which, by moving the teat cup gripper 420 upwards, the teat cup is connected to the teat through vacuum. During the connection, the teat cup carrying robot 409 and the teat cup connecting robot 419 continue to move synchronously with each other and with the feed platform 352, which is achieved by the mutual communication by means of the transmitting/receiving devices 421, 422. When all the teat cups have been connected, it is possible for the teat cup connecting robot 419 to move to the next cow to be milked, while the teat cup carrying robot 409 continues to move synchronously with the feed platform 352 until the milking has been finished, which can take place in a customary manner, for example by flow measurement. Although in the embodiment shown the co-operation between the teat cup carrying robot 409 and the teat cup connecting robot 419 takes place directly, it is also possible that the teat cup carrying robot 409 co-operates with the feed platform 352 and moves synchronously with the feed platform 352, for example under the control of a feeding system control unit, and that the teat cup connecting robot 419 grips the teat cups from the teat cup carrying robot 409 by means of the position determining means. In this case, the freely moving, mobile teat cup carrying robot 409 co-operates with the feed platform 352.

Figure 21D:
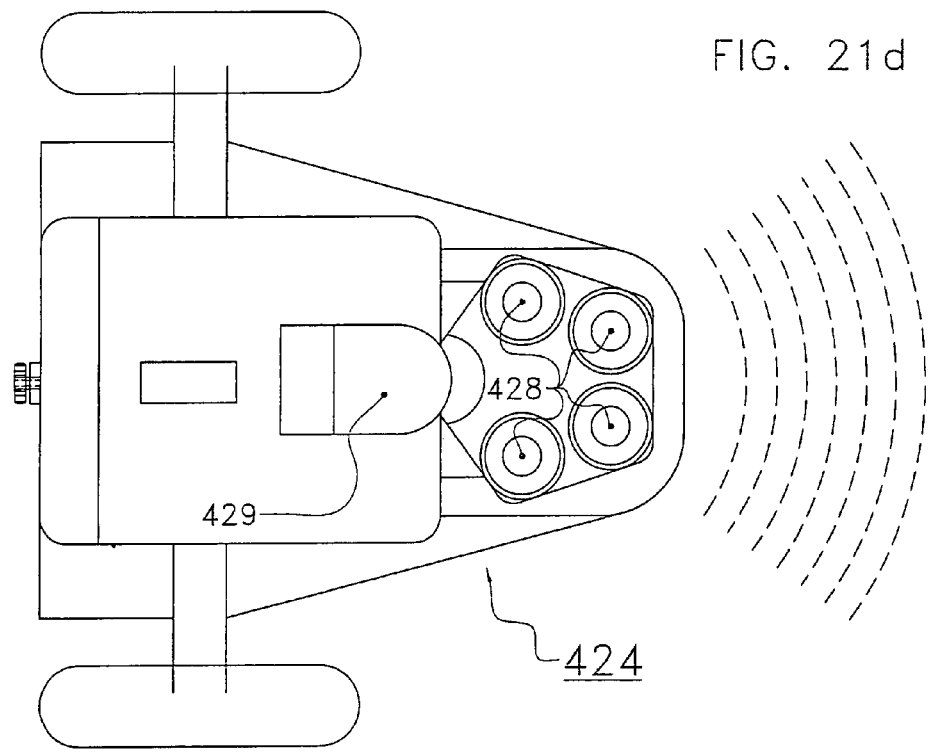
FIG. 21d shows diagrammatically in plan view the mobile, autonomous teat cup carrying robot according to FIG. 21c.
Figure 21C:
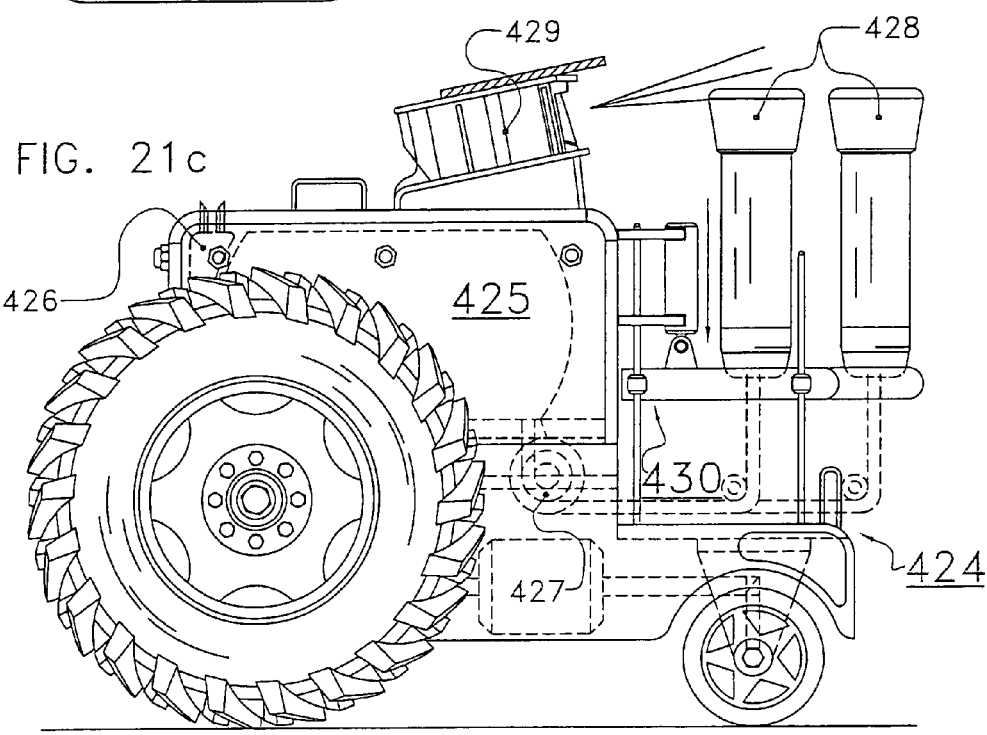
FIG. 21c shows diagrammatically in side view a mobile, autonomous teat cup carrying robot with integrated connection device for automatically connecting teat cups.

As an alternative for a separate teat cup carrying robot and a separate teat cup connecting robot, FIGS. 21*c* and 21*d* show diagrammatically a mobile, autonomous teat cup carrying robot 424 with an integrated teat cup connecting device. The robot 424 is provided with a milk storage vessel 425, with energy supply means 426 for the robot and the relevant components, with an underpressure and/or overpressure system 427 for teat cups 428, with (non-shown) milk analysing means, and with (non-shown) navigation means and a control unit for controlling the robot and the relevant components. There is also disposed a position determining device 429 for determining the position of a teat of a cow. Under the control of the milking system control unit, analogously to the control of the soaking robot and the milking pre-treatment robot, the robot 424 is moved to a cow to be milked, where the teat cups are connected to the relevant teats. The position of the teat relative to the teat cup 428 is then determined by the position determining device 429, such as a laser sensor for detecting the position of the teats of the animal to be milked. A lifting device 430 for the teat cup 428 makes it possible for the teat cup 428 to be connected, by means of a substantially vertical movement, to the teat of the cow.

After the teat cups have been disconnected and the main milking has been finished, the cow enters the post-treatment zone 432 (FIG. 17). Here, a post-treatment is performed on the cow, in particular on the teats of said cow, by means of a milking post-treatment robot 433. In the embodiment shown, the post-treatment zone 432 covers five feeding places 355. The milking post-treatment robot used in this embodiment is identical to the milking pre-treatment robot and will, consequently, not be described again. Near the milking post-treatment zone 432 there is also arranged a recharging and storage station 435 which is analogous to the station 434.

The milking post-treatment zone 432 is followed by the second resting zone 436 in which the cow receives roughage by means of one of the feed supplying robots 437, 438. In the embodiment shown, the second resting zone 436 covers fourteen feeding places 355. In this second resting zone 436 there is also performed a leg-treatment by means of a leg-treatment robot 439, which is analogous to the soaking robot 384 with the exception that instead of a soaking fluid a leg-treatment fluid is used. Furthermore, the position determining means are programmed in such a way that they are capable of determining the position of a leg and also the degree of contamination of the legs, in order that a leg-treatment is performed depending on the degree of contamination. Furthermore, a recharging and storage station 440, which is analogous to the station 434, is arranged near the second resting zone 436.

Analogously to the embodiment as shown with reference to FIG. 6, in the embodiment of FIG. 17 it is possible to separate a cow. This takes place by means of a separation robot 441, which is shown diagrammatically in FIGS. 22a, 22b and 22c.

Figure 22A:
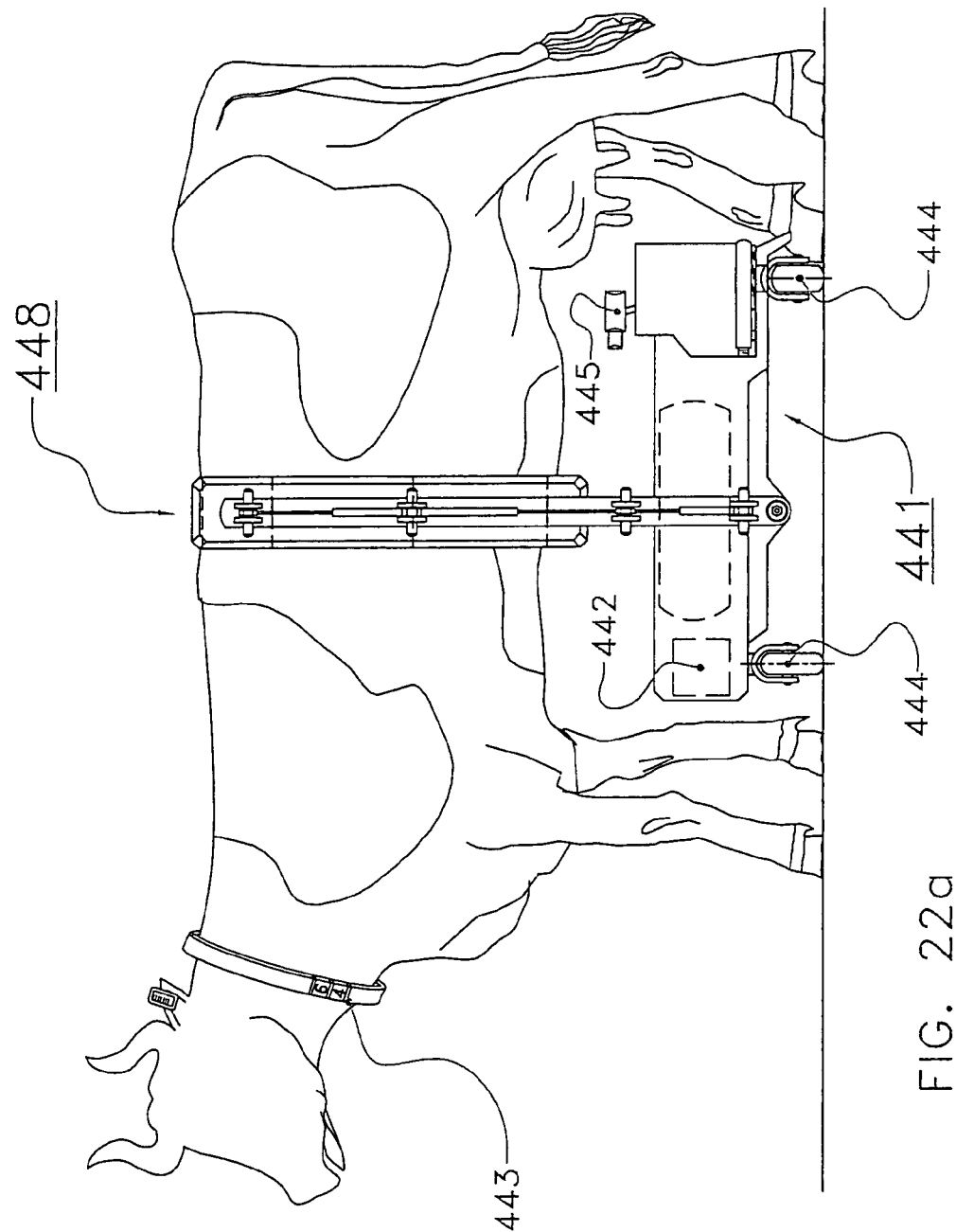
FIG. 22a shows diagrammatically in side view an embodiment of an animal gripping robot of an assembly according to the invention.

FIG. 22a is a schematic side view of a cow with an embodiment of a separation robot 441 according to the invention. The separation robot 441 is provided with an animal-recognition unit 442 known per se, which is suitable for co-operating with identification means 443 integrated in a collar of the cow. The separation robot 441 is provided with its own propelling means comprising drive means, such as a motor, and steering means, such as swivelling wheels 444. Of course, the device may also be provided with one swivelling wheel and a number of non-swivelling wheels, and/or be provided with rollers and/or caterpillar tracks and/or an air cushion construction. With the aid of the drive means and the steering means, the device is suitable for moving across the ground in a rolling and/or a hovering manner. The propelling means comprise navigation means which are suitable for determining a route to be followed for the separation robot 441 and which are suitable for making the separation robot 441 follow a certain route with the aid of the propelling means. The navigation means known per se may comprise a possibly remotely controllable computer with an input member and GPS or DGPS. In this manner the separation robot 441 is accurately controllable.

The separation robot 441 comprises position determining means 445 for localising a selected cow (which means may possibly be suitable for co-operating with position determining means provided near, on or in the animal, such as transmitting and receiving equipment known per se or GPS or DGPS), and is adapted to approach the selected cow on the basis of the data from said position determining means and the data supplied by the animal-recognition unit 442. It is pointed out here that, as described in the foregoing, upon boarding the feed platform it is registered at which feeding place a particular cow is standing and at the same time in what spatial position the feeding place is located. On the basis of the current position of the separation robot 441 (for example a standard non-operative position in the separation area 446; see FIG. 17) and the current position of the selected cow, the central control unit is capable of establishing a route to be followed and of controlling the propelling means in such a way that the separation robot 441 follows the established route. In this manner the cow to be separated can be found and approached automatically by the separation robot 441.

The separation robot 441 is provided with a coupling device 447 for coupling the separation robot 441 to the cow to be separated. Said coupling device 447 comprises a pair of gripping arms 448, capable of being folded and unfolded or being slid in and out, which are able to grip the cow on either side of her trunk when the separation robot 441 has reached a position under the cow (see also FIG. 22b). In another, non-shown embodiment, the gripping arm may be suitable for gripping at least one leg of the cow. When the coupling device 447 has locked the cow, the locking of the cow by the locking feeding gate is discontinued. When the cow is present beside the separation area 446, the separation robot 441 is controlled in such a way that the cow will enter the separation area 446 backwards. Hereafter the gripping arms 448 are swung or slid aside, so that the cow is able to move freely in the separation area. Moreover, it is signalled to the farmer or the operator of the assembly that the cow has been separated successfully. The separation robot 441 can then move to a next cow to be separated. It is pointed out that in an alternative, non-shown embodiment, the separation area is located on the inside of the feed platform 352, so that the cow is driven into the separation area in forward direction.

This is illustrated in FIG. 22b which shows diagrammatically a rear view of the cow in the arrangement of FIG. 22a, FIG. 22c showing a rear view of the arrangement of FIG. 22a without a cow being present therein. It is pointed out that in the separation area 446 there is arranged a recharging station 449 (FIG. 17) for the rechargeable energy supply of the separation robot 441.

In order to stimulate the cows to leave the feed platform 352, the feed is removed from the feed troughs 356 after the locking of a cow at a feeding place 355 has been discontinued. As described in the foregoing, this could be take place by tilting the feed trough, but in the embodiment shown in FIG. 17 this is achieved by a feed supplying robot which is programmed in such a way that it removes remaining feed from the feed troughs 356. By means of the deterring device disposed at the transition 365 cows are further stimulated to leave the feed platform definitively.

After the cows have left the feed platform 352 (FIG. 17) via the exit 360, the feed platform 352 is cleaned in the cleaning zone 450. For this purpose, in the embodiment as shown in FIG. 17, an assembly according to the invention comprises three feed platform cleaning robots 451 which will be explained in further detail with reference to FIG. 23. It will be obvious that any other number of feed platform cleaning robots may be applied as well within the scope of the invention.

Figure 23:
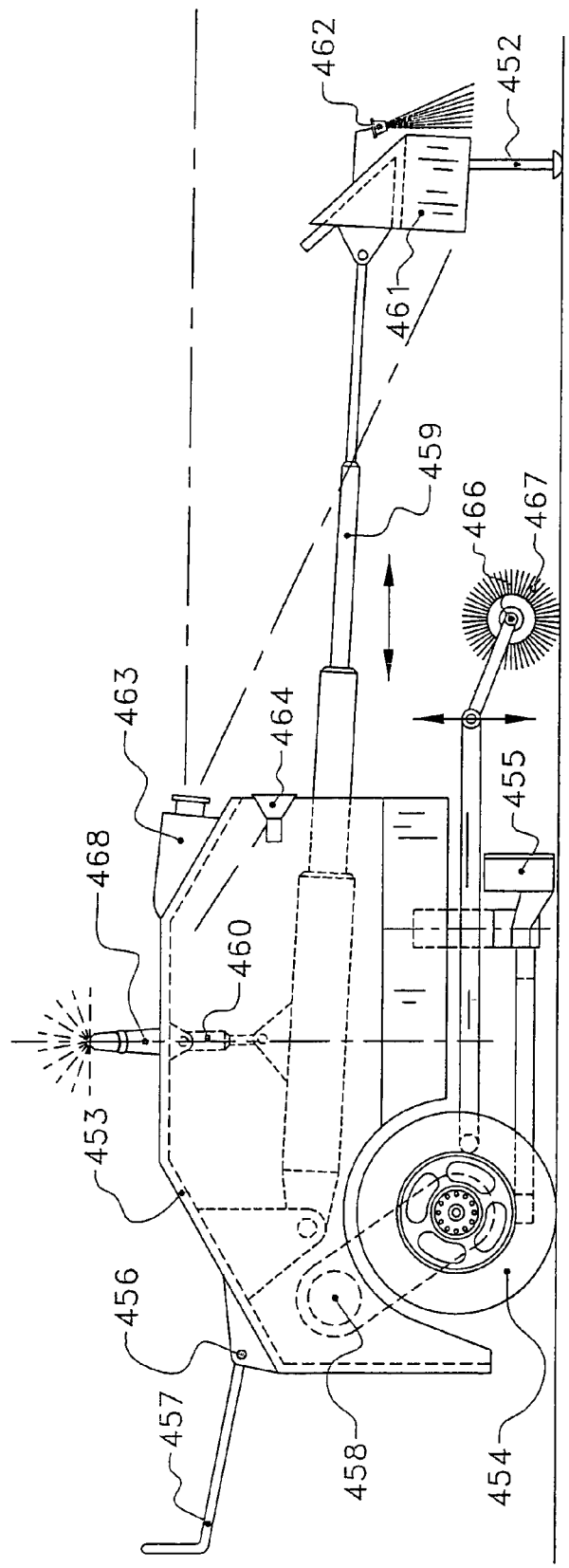
FIG. 23 shows diagrammatically in side view an embodiment of an autonomous, mobile feed platform cleaning robot of an assembly according to the invention.

FIG. 23 shows diagrammatically in side view an embodiment of an autonomous, mobile feed platform cleaning robot 451 of an assembly according to the invention. The feed platform cleaning robot 451 is provided with a manure slide 452 for sliding manure and other impurities from the feed platform 352. The feed platform cleaning robot 451 comprises a housing 453 with a chassis that is provided with wheels 454 constituting the first supporting point for the chassis, and a further manure displacing device 455 constituting a second supporting point for the chassis. In the embodiment shown, the further manure displacing device 455 is also designed as a manure slide. The feed platform cleaning robot 451 is further provided with a protective bracket 457 that is rotatable about an axis 456. Each of the wheels 454 is driven individually by a motor 458. Driving the wheels 454 at different speeds makes it possible to steer the feed platform cleaning robot 451. The first manure slide 452 comprises a telescopic carrier 459 that is disposed in the housing 453 of the feed platform cleaning robot 451 in such a way that one of its ends is pivotable. Furthermore, in the housing 453 there are disposed pressure adjusting means 460, one end of which is connected to the housing 453 and whose other end is connected to the telescopic carrier 459. In the embodiment shown, the pressure adjusting means 460 comprise a cylinder. With the aid of the cylinder it is possible to adjust the force with which the manure slide 452 is pressed on the feed platform 352. In order to increase the pressure of the manure slide 452 on the feed platform 352, a weight 461 is disposed above the manure slide 452. Furthermore, near the manure slide 452 there are disposed spraying means 462 by means of which fluid is sprayed (possibly under high pressure) on the feed platform 352. If desired, a disinfectant may be added to the fluid for disinfecting the feed platform 352.

The feed platform cleaning robot 451 is further provided with detection means 463 with the aid of which contaminated parts of the feed platform 352 can be detected and with the aid of which it is possible to move the feed platform cleaning robot 451 correctly across the feed platform 352. In the embodiment shown, the detection means 463 comprise a camera. The feed platform cleaning robot 451 is further provided with signal-issuing means 464 that issue an acoustic (and possibly an optical) signal in order that the attention of personnel possibly present in the cleaning area 465 is drawn to the presence of the feed platform cleaning robot 451. It is pointed out that such signal-issuing means may also be disposed on the other robots.

The feed platform cleaning robot 451 is further provided with a brush 467 that is rotatable about an at least substantially horizontal axis 466. Analogously to the above-described robots, the feed platform cleaning robot 451 also comprises navigation means for controlling the feed platform cleaning robot 451, which navigation means comprise, in the embodiment shown, an aerial 468 for receiving and transmitting signals.

The robots may further comprise other components that have not been described in further detail in the foregoing. In this case a proximity detector for detecting the proximity of an object may be taken into account, the proximity detector being possibly constituted by position determining means or by a separate detector, for example an ultrasonic sensor or an approach sensor. The data from said detector may be used for the navigation of the relevant robot. A mobile robot may also be provided with a protecting device 474 (see FIG. 24) for protecting at least a part of the mobile robot, the protecting device 474 being capable of being brought from an inactive position into an active protecting position. As a protecting device may be applied for example an airbag or a telescopic bumper or cap or the like. In this case, it is advantageous for safety reasons if the protecting device is capable of being brought from an inactive position into an active protecting position with the aid of data from the proximity detector. The signal-issuing device 464 is preferably capable of being activated with the aid of data from the proximity detector.

In the embodiment shown in FIG. 17, the control of the feed platform cleaning robot 451 is such that the feed platform cleaning robot 451 moves transversely to the normal direction of movement of the feed platform 352, so that manure and other impurities, if any, are displaced away from the feed troughs 356 to a manure collecting pit 469. When being displaced in the direction of a feed trough 356, the manure slide 452 is lifted by the pressure adjusting means 460 to a level at some distance above the feed platform 352. Beside the manure collecting pit 469, there is provided a path 470 along which the feed platform cleaning robots 451 are capable of moving into the cleaning area 465 to a recharging station 471 for recharging the rechargeable energy supply of the feed platform cleaning robots 451 and for replenishing, if necessary, the fluid stock. In the cleaning area 465 there is also arranged a cleaning station 472 for cleaning (the exterior and, if necessary, the interior of) the feed platform cleaning robots 451. It is pointed out that the pressure adjusting means 460 are partially controlled on the basis of data from the detection means 463, so that, for example in the case of a large amount of detected manure, the pressure exerted by the manure slide 452 on the feed platform 352 may be increased to achieve a better effect. The detection means 463 are also used to check whether impurities have been removed satisfactorily.

It is pointed out that, in an alternative, non-shown embodiment, the mobile cleaning robot may comprise a storage container for impurities. The cleaning robot is then capable of conveying the impurities stored to the manure collecting pit or to an other suitable storage place and/or an outlet for impurities. In this case the assembly is provided with a conveying device for conveying impurities from the storage container to the storage place and/or outlet for impurities. The storage container is in particular provided with an outlet for impurities.

Figure 24:
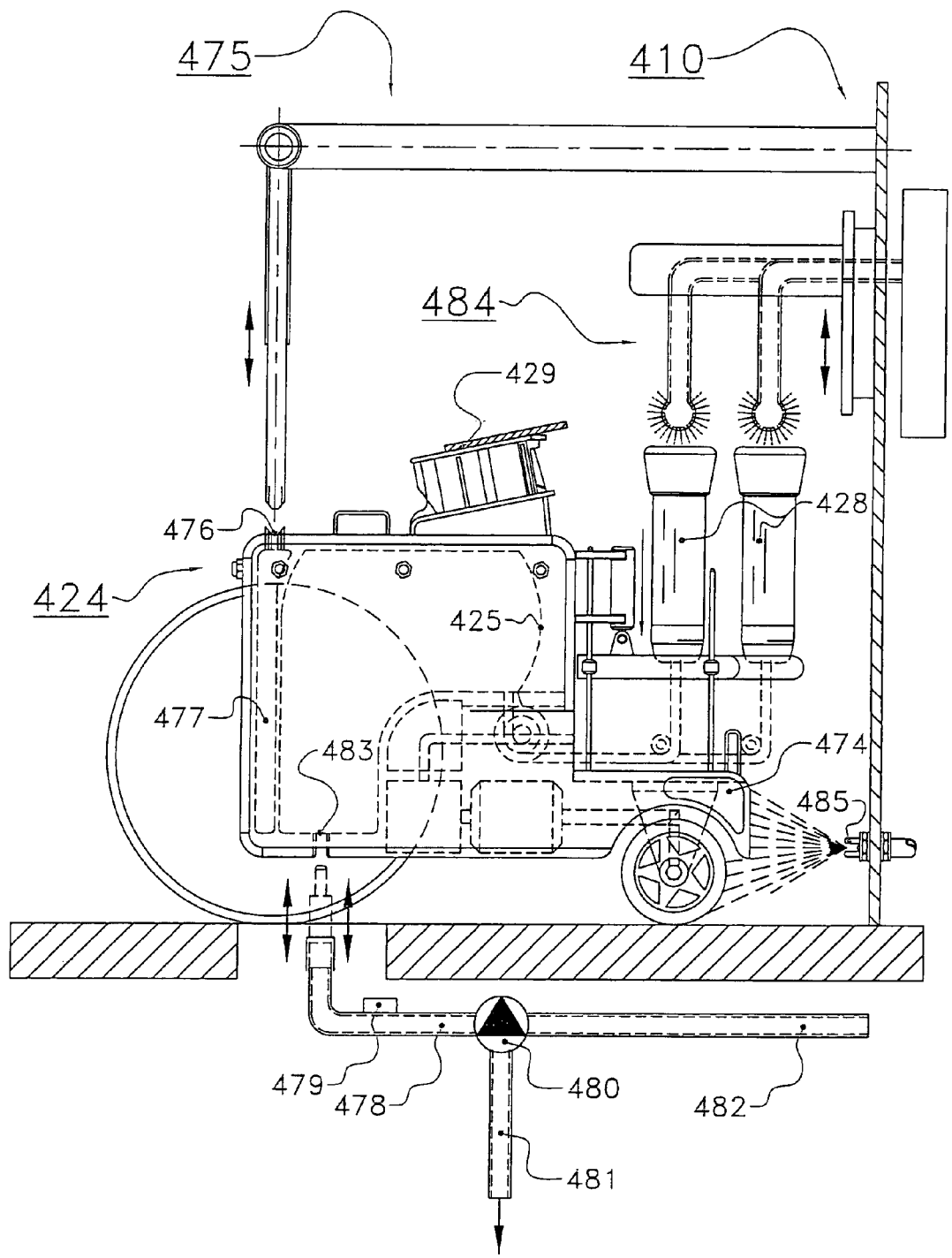
FIG. 24 shows diagrammatically a partially cross-sectional side view of a mobile robot coupled to a multifunctional robot-treatment station.

FIG. 24 shows diagrammatically a partially cross-sectional side view of a mobile robot, in the embodiment shown the teat cup carrying robot 424 with an integrated teat cup connecting device, coupled to a multifunctional robot-treatment station 410. After having milked a cow, the robot 424 moves automatically to the multifunctional robot-treatment station 410. In this case there is made use of the position determining means 429. The multifunctional robot-treatment station 410 comprises a recharging device 475 that is capable of being coupled automatically to the charging port 476 of the rechargeable energy supply 477 of the robot 424. There is provided a coupling detector which, upon detection of coupling of the recharging device 475 to the charging port 476, activates the recharging.

The multifunctional robot-treatment station 410 also comprises a milk discharge line 478 for discharging milk from the milk storage vessel 425 of the robot 424. The milk discharge line 478 comprises a sensor 479 for measuring the quality of the milk and for controlling a valve 480, in order to discharge milk that is suitable for human consumption to a milk tank via the milk tank discharge line 481, or alternatively to discharge milk via another discharge line 482 to another storage container. The milk discharge line 478 is capable of being coupled automatically to the outlet 483 of the milk storage vessel 425. Also in this case there is provided a coupling detector for discharging the milk from the milk storage vessel 425 after a successful coupling has been detected. In the case of another robot, such as for example the soaking robot 384, it is possible to replenish in a similar manner the fluid container of the robot, the fluid then flowing, of course, in the direction towards the fluid container, possibly supported by a pump.

After the milk has been discharged from the milk storage vessel 425, a teat cup cleaning device 484 comprising downwardly directed thorns having fluid outlet openings at their ends is brought into the teat cups 428. The valve 480 is controlled in such a way that cleaning fluid can be discharged via the other discharge line 482.

The multifunctional robot-treatment station 410 further comprises a robot cleaning device 485 comprising in the embodiment shown a sprayer for cleaning the robot.

It will be obvious that, depending on the robot, the multifunctional robot-treatment station may comprise other components for the maintenance and cleaning of the robot.

Figure 25:
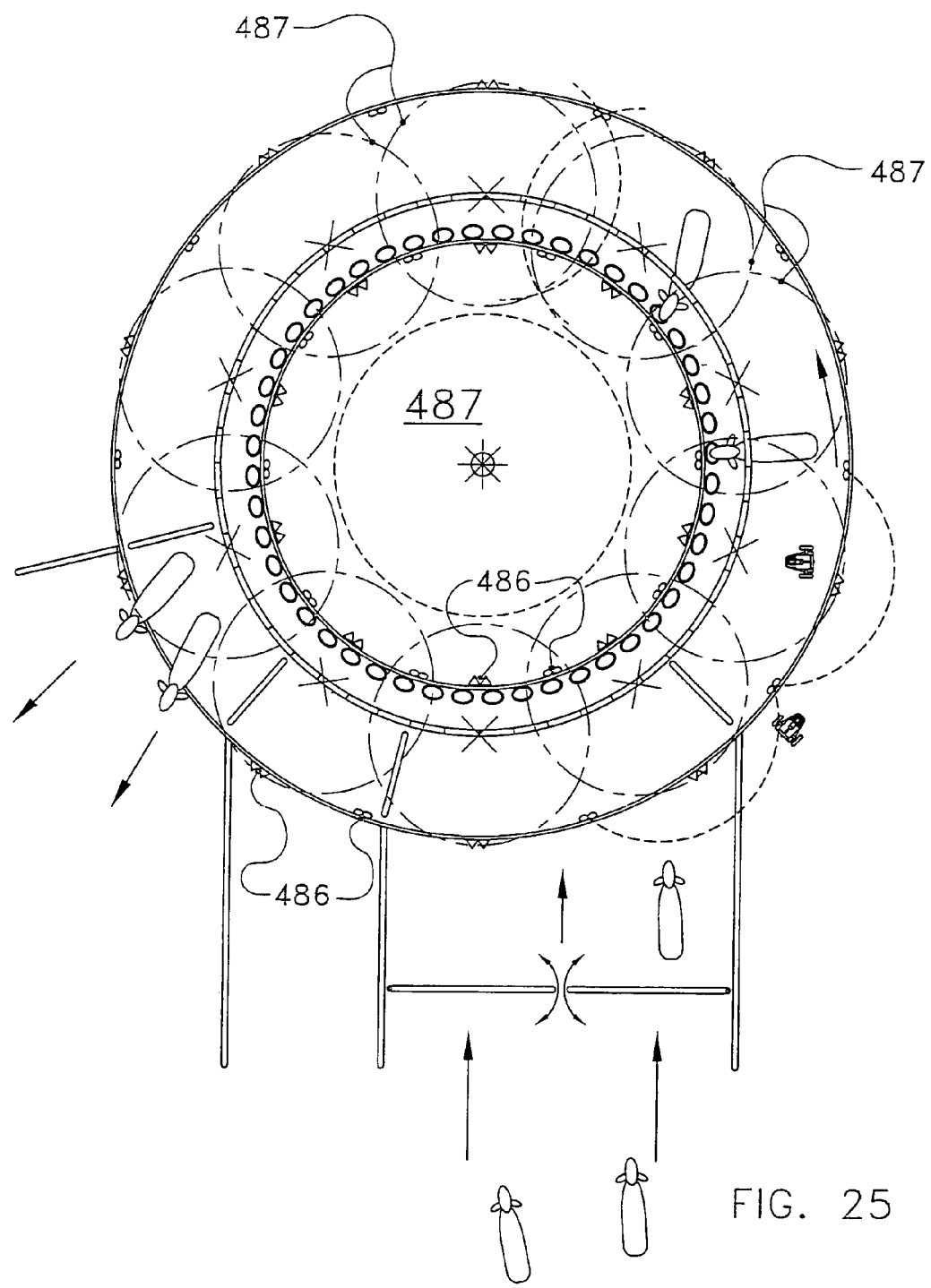
FIG. 25 shows diagrammatically in plan view a camera monitoring system for a feed platform with position marks according to an embodiment of an assembly according to the invention.

FIG. 25 shows diagrammatically in plan view a camera monitoring system for a feed platform with position marks 486 according to an embodiment of an assembly according to the invention. The position marks 486 serve as position beacons, so that the camera monitoring system is capable of exactly determining the rotational position of the feed platform relative to the stationary world. The camera monitoring system comprises cameras which are disposed above the feed platform and have a field of vision that is shown in the figure by means of circles 487. The fields of vision overlap one another and cover the entire feed platform, the area on the inside of the feed platform and a strip on the outside beside the feed platform. The camera monitoring system is used to determine and check the exact position of the robots, if any, and to determine the position of an animal on the feed platform. The data from the camera monitoring system may also be used for operating and checking the feeding system and/or the milking system.

According to the invention, there is thus provided a method of milking a cow in which an assembly with a movable feed platform as described above is used. In this method, the movable feed platform is set in motion and the cow is allowed access to the feed platform, in order that the cow will spend a particular period of time on the feed platform, after which the cow is allowed exit from the feed platform. The speed of movement of the feed platform is selected in such a way that it is possible for a cow, during her stay on the feed platform, to consume a portion of feed whose size corresponds to the portion size that is usually consumed by the cow during a feeding session. Since each cow has her own feed consumption rate, the speed of movement of the feed platform is preferably controlled on the basis of the determined animal identity, in order that also the cows having a slow feed consumption rate will have sufficient time to consume their usual portion. In this case, the speed of movement of the feed platform is controlled on the basis of the cow having the slowest feed consumption rate present on the feed platform.

According to the invention, for example in dependence on a milking criterion, not every cow present on the feed platform needs to be milked. If a cow on the feed platform is indeed milked during a milking period, then, according to the invention, there is provided a span of time on the feed platform in which the cow is not milked, in other words is not subjected to a treatment that is customarily associated with milking. This span of time has a length amounting to at least approximately half the milking period. In this manner, the cow will have, besides the milking which is sometimes experienced as unpleasant, a certain period of rest on the feed platform, which may cause the cow to experience her stay on the feed platform even as pleasant. This span of time may be selected in dependence on the identity of the cow, the time needed for the feed consumption being taken into account as well.

If the movable feed platform is moved continuously, the adaptation of the speed of movement of the feed platform may take place continuously after a cow has boarded the feed platform. The adaptation may take place by accelerating or decelerating the feed platform to the new speed of movement determined on the basis of the cows present on the feed platform.

If the movable platform is set in motion intermittently, the span of time may also be influenced by altering the length of the period of time the feed platform is immobile. The treatments may also be performed on the cow when the feed platform is immobile.

As described in the foregoing, it is in particular important that the magnitude of the part of the span of time after the milking is selected in such a way that the orifice of at least one teat of the animal will be closed after the span of time has elapsed.

It will be obvious that it is not only possible to determine whether or not a cow is to be milked on the basis of a milking criterion, but that it is also possible within the scope of the invention to decide with the aid of a computer which other treatment(s) a cow will or will not undergo on the basis of the determined identity of the cow.

According to the invention, the modular construction of the assembly and in particular the modular construction of the feeding system and the milking system, makes is possible to interchange the various modules, i.e. the components of the assembly. For example, the feed platform according to the invention may only be used for feeding animals. When leaving the feed platform via the exit, animals may be led to a milking parlor comprising a milking robot for automatically connecting teat cups. Therefore, the invention is not limited to the above-described exemplary embodiments, but also relates to all other possible combinations of the different components.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method of milking an animal using a movable feed platform, the method comprising:
    setting the movable feed platform in motion;
    allowing the animal free access to board the feed platform;
    connecting a teat cup to a teat of the animal, the teat cup being arranged separately from the feed platform
    milking the animal on the feed platform during a milking period;
    providing the animal a span of time on the feed platform in which the animal is not milked, said span of time having a magnitude amounting to at least approximately half the milking period; and
    subsequently allowing the animal exit from the feed platform.

2. The method as claimed in claim 1, wherein the span of time has a magnitude lying between approximately one time the milking period and approximately five times the milking period.

3. The method as claimed in claim 1 wherein the feed platform comprises a number of feeding places, the method further comprising allowing an animal boarding the feed platform to walk freely to a selected number of feeding places.

4. The method as claimed in claim 3, wherein the selected number comprises all of the feeding places.

5. The method as claimed in claim 3, wherein the selected number comprises those feeding places located in an entrance region of the feed platform.

6. The method as claimed in claim 1, wherein the feed platform is moved continuously.

7. The method as claimed in claim 1, wherein the feed platform is moved intermittently.

8. The method as claimed in claim 7, wherein the feed platform is immobile during the span of time in which the animal is not milked.

9. The method as claimed in claim 7, wherein the feed platform is immobile during the milking of the animal on the feed platform.

10. The method as claimed in claim 1, wherein the magnitude of the span of time after the milking is sufficient that an orifice of at least one teat of the animal will be closed after the span of time has elapsed.

11. The method as claimed in claim 10, further comprising preventing the animal from lying down during the span of time after the milking during which the orifice closes.

12. The method as claimed in claim 1, further comprising performing a leg-treatment on the animal during the span of time after the milking.

13. The method as claimed in claim 1, further comprising establishing an identity of the animal.

14. The method as claimed in claim 13, further comprising deciding with the aid of a computer, on the basis of the established identity, a treatment that the animal will undergo and treating the identified animal on the feed platform.

15. The method as claimed in claim 13, further comprising selecting a speed of movement of the feed platform at least partially on the basis of the established animal identity.

16. The method as claimed in claim 13, further comprising supplying feed to the animal on the feed platform on the basis of the established animal identity.

17. The method as claimed in claim 16, further comprising selecting a speed of movement of the feed platform at least partially on the basis of an expected feed consumption duration of an animal present on the feed platform.

* * * * *